(12) United States Patent
Kukita et al.

(10) Patent No.: US 10,540,848 B2
(45) Date of Patent: Jan. 21, 2020

(54) GAME SYSTEM, PLAYER TRACKING DEVICE, GAMING MACHINE, AND PROGRAM

(71) Applicant: Universal Entertainment Corporation, Tokyo (JP)

(72) Inventors: Noritoshi Kukita, Tokyo (JP); Yuya Konno, Tokyo (JP); Jun Haishima, Tokyo (JP); Shigehiko Kitagawa, Tokyo (JP)

(73) Assignee: UNIVERSAL ENTERTAINMENT CORPORATION, Tokyo (JP)

(*) Notice: Subject to any disclaimer, the term of this patent is extended or adjusted under 35 U.S.C. 154(b) by 144 days.

(21) Appl. No.: 15/506,321

(22) PCT Filed: Aug. 17, 2015

(86) PCT No.: PCT/JP2015/073037
§ 371 (c)(1),
(2) Date: Feb. 24, 2017

(87) PCT Pub. No.: WO2016/031608
PCT Pub. Date: Mar. 3, 2016

(65) Prior Publication Data
US 2017/0278350 A1    Sep. 28, 2017

(30) Foreign Application Priority Data

Aug. 28, 2014 (JP) ................. 2014-174505

(51) Int. Cl.
*A63F 13/30* (2014.01)
*G07F 17/32* (2006.01)

(52) U.S. Cl.
CPC .......... *G07F 17/3251* (2013.01); *A63F 13/30* (2014.09); *G07F 17/3227* (2013.01); *G07F 17/3258* (2013.01)

(58) Field of Classification Search
CPC ............................. G07F 17/3227; A63F 13/12
See application file for complete search history.

(56) References Cited

U.S. PATENT DOCUMENTS 7,562,873 B1* 7/2009 Luciano, Jr. ............ G07F 17/32
                                                          273/139
8,403,745 B2* 3/2013 Boyd ...................... G07F 17/32
                                                          463/25

(Continued)

FOREIGN PATENT DOCUMENTS

AU        2007216941      10/2008
JP        2003-144611      5/2003

(Continued)

*Primary Examiner* — David L Lewis
*Assistant Examiner* — Robert E Mosser
(74) *Attorney, Agent, or Firm* — Lex IP Meister, PLLC

(57) ABSTRACT

Provided is a game system in which when a bonus game or the like is conducted, linkage presentation using player tracking devices (PTS terminals) is performed over a plurality of gaming machines. Upon the occurrence of winning in the bonus game, a bonus server 11 transmits a bonus winning notification to a gaming machine in a bank in which a gaming machine having won therein is included. A PTS terminal of the gaming machine which has received the bonus winning notification transmits a linkage presentation start request to a gaming machine which operates as a presentation control server in the bank. The PTS terminal of the gaming machine which has received the linkage presentation start request broadcasts a linkage presentation execution request to a network segment of the bank. When respectively receiving the linkage presentation execution request, in response to the request, PTS terminals of gaming machines which operate as presentation execution clients perform presentation such as light emitting and sound outputting in a manner linked with one another in said bank.

12 Claims, 33 Drawing Sheets

(56) References Cited

U.S. PATENT DOCUMENTS

2005/0130732 A1* 6/2005 Rothschild .............. G07F 17/32
                                                                           463/20
2007/0167210 A1* 7/2007 Kelly ...................... G07F 17/32
                                                                           463/16
2013/0184078 A1* 7/2013 Brunell ............... G07F 17/3202
                                                                           463/40

FOREIGN PATENT DOCUMENTS

| JP | 2003-250962 | 9/2003 |
| JP | 2008-000246 | 1/2008 |
| JP | 2009-072589 | 4/2009 |
| JP | 2011-056003 | 3/2011 |

* cited by examiner

FIG.9

SYMBOL COMBINATION TABLE

| SYMBOL COMBINATION | | | | | PAYOUT NUMBER | WINNING COMBINATION |
|---|---|---|---|---|---|---|
| 1st VIDEO REEL | 2nd VIDEO REEL | 3rd VIDEO REEL | 4th VIDEO REEL | 5th VIDEO REEL | | |
| RED | RED | RED | RED | RED | 15 | RED |
| APPLE | APPLE | APPLE | APPLE | APPLE | 12 | APPLE |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE3 |
| CHERRY | CHERRY | CHERRY | (ANY) | (ANY) | 2 | CHERRY2 |
| ORANGE | ORANGE | ORANGE | (ANY) | (ANY) | 2 | ORANGE2 |
| CHERRY | (ANY) | (ANY) | (ANY) | (ANY) | 1 | CHERRY1 |
| ORANGE | (ANY) | (ANY) | (ANY) | (ANY) | 1 | ORANGE1 |

BONUS TARGET SETTING TABLE

FIG.16A

| AREA | ZONE | BANK | NOTIFICATION DESTINATION |
|---|---|---|---|
| A-1 | Z-1 | B-1 | GM-3 |
| A-1 | Z-1 | B-2 | GM-5 |
| A-1 | Z-2 | B-1 | GM-9 |
| A-1 | Z-2 | B-2 | GM-13 |
| A-1 | Z-3 | B-1 | GM-17 |
| A-1 | Z-3 | B-2 | GM-21 |
| A-1 | Z-4 | B-1 | GM-25 |
| A-1 | Z-4 | B-2 | GM-29 |
| A-2 | Z-1 | B-1 | GM-33 |
| ... | ... | ... | ... |

GAMING MACHINE SETTING TABLE

FIG.16B

| GAMING MACHINE IDENTIFIER | AREA | ZONE | BANK |
|---|---|---|---|
| GM-1 | A-1 | Z-1 | B-1 |
| GM-2 | A-1 | Z-1 | B-1 |
| GM-3 | A-1 | Z-1 | B-1 |
| GM-4 | A-1 | Z-1 | B-1 |
| GM-5 | A-1 | Z-1 | B-2 |
| GM-6 | A-1 | Z-1 | B-2 |
| GM-7 | A-1 | Z-1 | B-2 |
| GM-8 | A-1 | Z-1 | B-2 |
| GM-9 | A-1 | Z-2 | B-1 |
| GM-10 | A-1 | Z-2 | B-1 |
| ... | ... | ... | ... |
| GM-33 | A-2 | Z-1 | B-1 |
| ... | ... | ... | ... |

PATTERN SETTING TABLE

FIG.16C

| PATTERN NO. | CONTENTS OF LINKAGE PRESENTATION |
|---|---|
| P001 | LIGHT EMITTING PLATES CONCURRENTLY BLINK IN CONJUNCTION WITH MUSIC. |
| P002 | THROUGH LIGHT EMITTING OF THE LIGHT EMITTING PLATES, EMITTING OF LIGHT IN RED IS SHIFTED AT A HIGH SPEED ON GAMING MACHINES IN A BANK. |
| P003 | THROUGH LIGHT EMITTING OF THE LIGHT EMITTING PLATES, BLINKING IN THE SAME COLOR IN PERFORMED SEQUENTLY ON THE GAMING MACHINES ON A ONE-BY-ONE BASIS. |
| P004 | THROUGH LIGHT EMITTING OF THE LIGHT EMITTING PLATES, EMITTING OF LIGHT FROM UPPER AND LOWER LIGHT EMITTING PLATES IS SHIFTED SEQUENTIALLY ON THE GAMING MACHINE IN A REVERSE DIRECTION. |
| ... | ... |

FIG.30
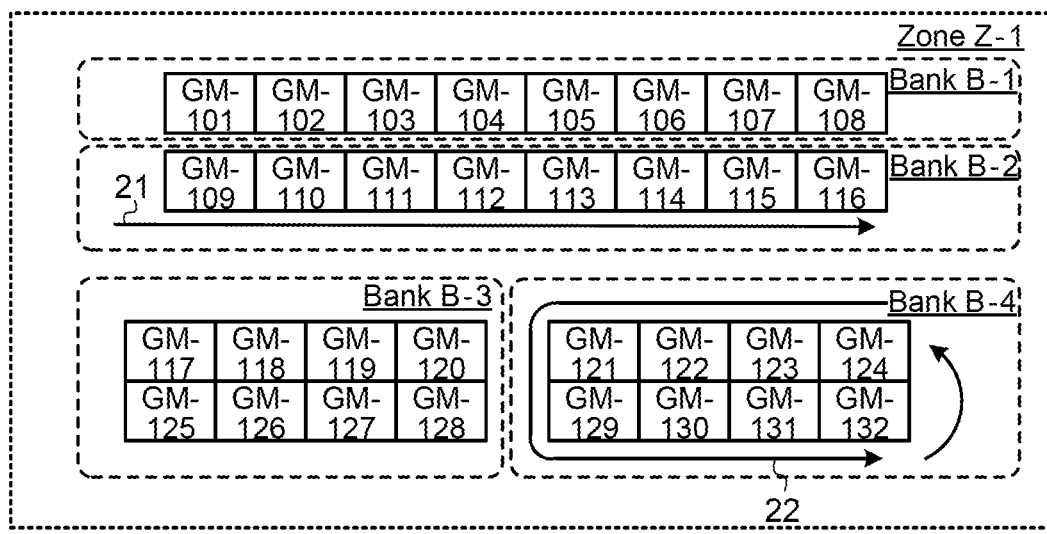
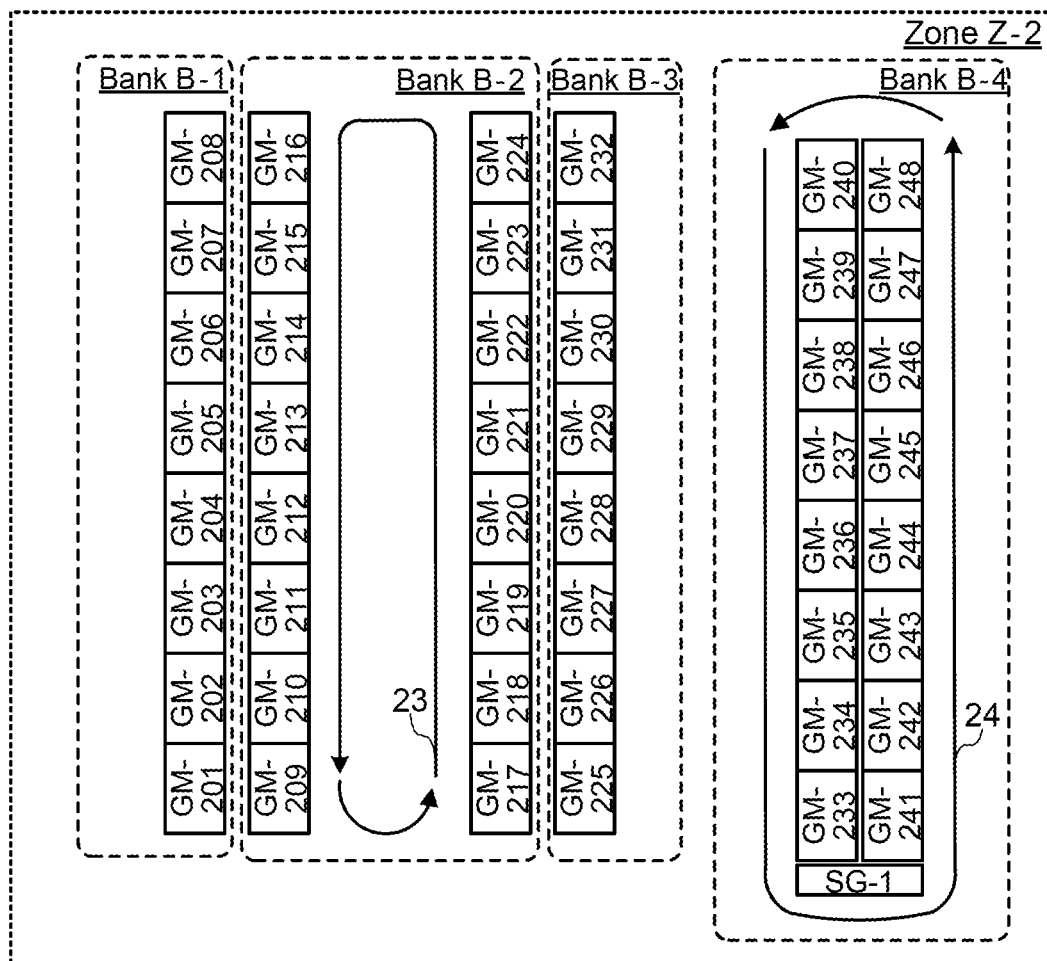

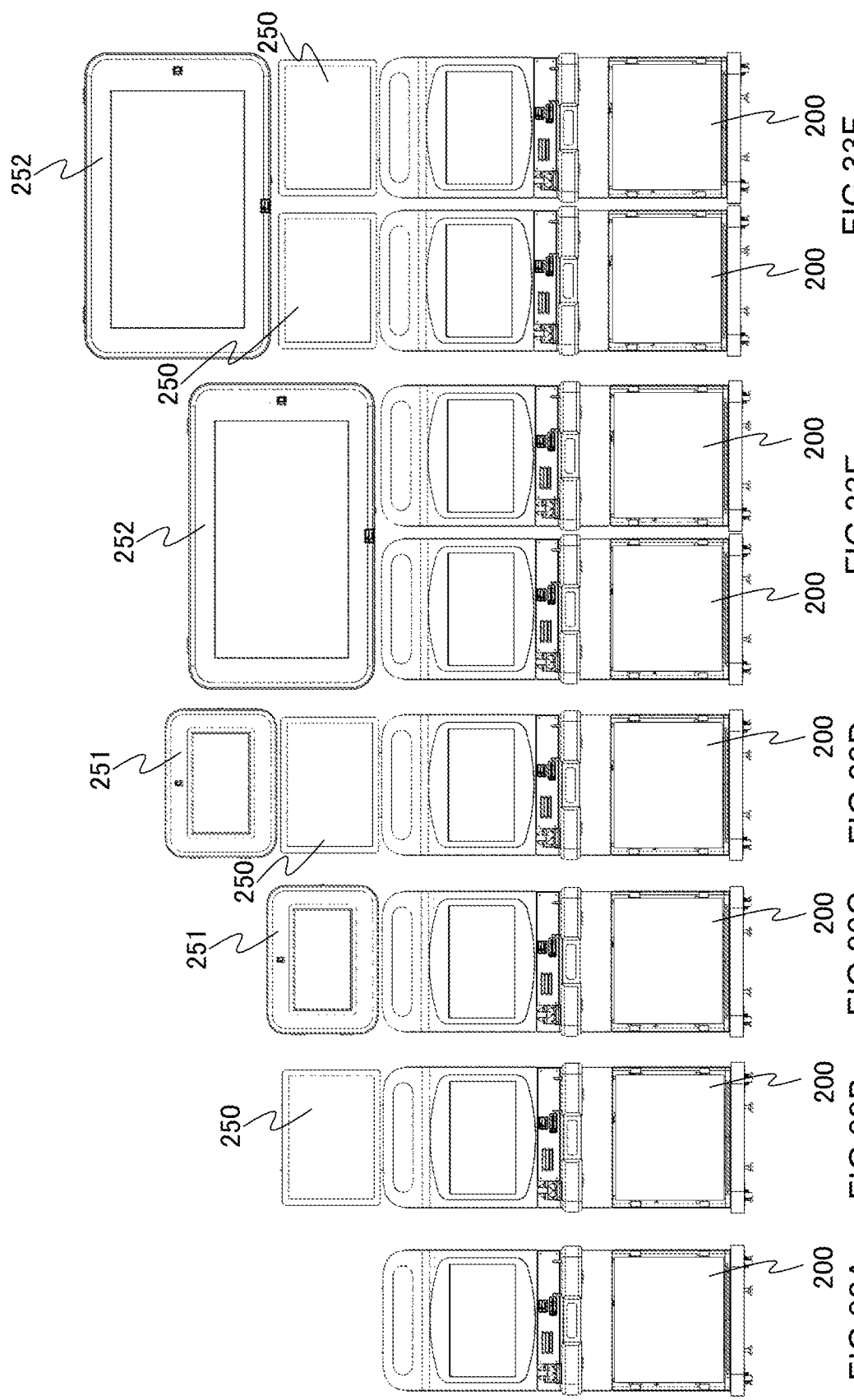

GAME SYSTEM, PLAYER TRACKING DEVICE, GAMING MACHINE, AND PROGRAM

TECHNICAL FIELD

The present invention relates to a game system having a plurality of gaming machines.

BACKGROUND ART

Conventionally, there has been proposed a gaming system which includes: player tracking devices, each of which receives information for identifying a player and provides information pertinent to contents and the like (a bonus game and the like) for the identified player; a plurality of gaming machines, each of which has the player tracking device; and a player server which identifies a player at each of the gaming machines based on player identification information from each player tracking device (refer to Patent Literature 1).

Here, the above-mentioned player tracking device is integrally mounted on each of the gaming machines and realizes a player tracking system (PTS). Main purposes of the player tracking device is to identify and manage a player playing on each of the gaming machines for each of the gaming machines and to provide individual information, point service, a game play which is different from those played on each of the gaming machines, and the like for each player.

CITATION LIST

Patent Literature

Patent Literature 1: U.S. Pat. No. 8,403,745 Specification

SUMMARY OF THE INVENTION

Technical Problem

As described above, the player tracking device is integrally mounted on each of the gaming machines, identifies a player for each of the gaming machines, manages behavior of each player, and provides individual information, point service, a game play which is different from those played on each of the gaming machines, and the like for each player. In the game system as disclosed in Patent Literature 2, contents such as a bonus game are provided for each player by the player tracking device and the player server.

However, in recent years, expansion of functions and applications is required of such a player tracking device.

Solution to Problem

The present invention provides a game system, a player tracking device, a gaming machine, and a program, as described below.

In view of the above-described regard, the present invention has been made. Objects of the present invention are to provide a game system, a player tracking device, a gaming machine, and a program, which allow functions and applications of the player tracking device which is provided for each gaming machine to be expanded.

The game system according to a first aspect of the present invention has the below-described configuration.

The game system includes:
a player tracking device (for example, a PTS terminal 1700 shown in FIG. 8) having an input part (for example, a card unit 1741 shown in FIG. 8) and an output part (for example, full-color LEDs 1721*a* and 1721*b* controlled by a light emitting part LED driving part 1761 and speakers 1707 and 1709 controlled by a DSP 1765 shown in FIG. 8), information for identifying a player being inputted to the input part, information being outputted from the output part;
a plurality of gaming machines (for example, slot machines 1010 shown in FIG. 4) each including the player tracking device and each providing a game play for the identified player; and
an external server (for example, a bonus server 11 shown in FIG. 15) being connected to a plurality of the player tracking devices via a network, and
with a request from the external server as a starting point, information is outputted by causing the output parts of the plurality of the player tracking devices to operate in a manner linked with one another, irrespective of the game play being conducted on each of the plurality of gaming machines.

By employing the above-described configuration, since the plurality of player tracking devices included respectively in the gaming machines output the information to the output parts in the manner linked with one another, the functions and the applications of the player tracking devices can be expanded. For example, the outputting of the information can be expanded in an integrated manner over the gaming machines other than a gaming machine on which a player plays, and the outputting of the information can be expanded for a person other than players in a floor. In addition, through arranging the installation of the player tracking devices, the operation thereof in the manner linked with one another, and the like, representation of the outputting of the information can be expanded.

In the first aspect, the game system according to a second aspect of the present invention further has the below-described configuration.

the plurality of gaming machines are grouped into a plurality of groups (for example, a bank B-1 and a bank B-2 shown in FIG. 15), and
a controller (for example, a controller 1750) of each of the player tracking devices enables the outputting of the information by causing the output parts of the plurality of the player tracking devices to operate in the manner linked with one another, by executing processes described below:
a process (A) in which when the player tracking device in each of the groups of the gaming machines operates as a server which controls the output parts to output the information (for example, a gaming machine GM-1 in the bank B1 shown in FIG. 15), in response to the request from the external server, a linkage presentation execution request to cause the output parts to output the information is transmitted; and
a process (B) in which when the player tracking devices in each of the groups of the gaming machines operate as clients which output the information to the output parts (for example, the gaming machines GM-1 to GM-4 in the bank B1 shown in FIG. 15), in response to reception of the linkage presentation execution request, the information is controlled to be outputted to the output parts.

By employing the above-described configuration, when the controller of the player tracking device operates as the server which controls (controls the information to be outputted to the output parts) the linkage presentation in the group of the gaming machines, in response to the request from the external server, the controller thereof transmits the linkage presentation execution request for executing the linkage presentation. When the controllers of the player tracking devices operate as the clients which execute (output the information to the output parts) the linkage presentation in the above-mentioned group, in response to the reception of the linkage presentation execution request, the controllers thereof control at least one of the light emitting and the sound outputting to be performed, thereby executing the linkage presentation. Therefore, in the predetermined group, the linkage presentation by the gaming machines is enabled, and on the gaming machines, the linkage presentation is controlled by the player tracking device which operates as the server, thereby allowing a reduction in a network load and a processing load to be realized.

In the second aspect, the game system according to a third aspect of the present invention further has the below-described configuration.

The gaming machines are connected to network segments (for example, network segments S1 and S2 shown in FIG. 15), each of the groups being connected to each of the network segments being different from one another, respectively, and the process (A) includes a process (A-1) in which the linkage presentation execution request is transmitted as a broadcast message (for example, a message transmitted by a protocol such as UDP/IP) to each of the network segments.

By employing the above-described configuration, in the game system, the gaming machines in each of the groups are divided for each of the network segments, and the linkage presentation execution request is broadcasted to each of the network segments. Therefore, the broadcast message is not delivered to the other network segment or segments, thereby reducing the network load and effectively utilizing a bandwidth.

In the second aspect, the game system according to a fourth aspect of the present invention further has the below-described configuration.

The input part of each of the player tracking devices includes an information card device (for example, the card unit 1741 shown in FIG. 8) for reading information (for example, an identification code) stored in an information card (for example, an IC card 1500) of a player, and the controller of each of the player tracking devices executes processes described below:

a process (C) in which based on the information read from the information card, whether or not the player is a member is determined; and a process (D) in which when the player tracking devices in each of the groups of the gaming machines operate as the clients which output the information to the output parts, based on a result of the determination, whether or not the information is outputted to the output parts is determined.

By employing the above-described configuration, in the game system, based on the information read from the information card, whether or not the player is a member is determined, and when the player tracking devices in each of the groups of the gaming machines operate as the clients which output the information to the output parts, based on the result of the determination, whether or not the linkage presentation is executed is determined. Therefore, it is made clear that a benefit related to the linkage presentation is provided only for members, entry into membership by players of the gaming machines can be promoted.

A player tracking device according to fifth aspect of the present invention has the below-described configuration.

A player tracking device has an input part and an output part, information for identifying a player being inputted to the input part, information being outputted from the output part, the player tracking device is integrated into a gaming machine which provides a game play for the identified player, the player tracking device is connected via a network to an external server, and with a request from the external server as a starting point, irrespective of the game play on the gaming machine, linkage presentation performed over a plurality of the gaming machines is executed individually by outputting the information to the output parts.

By employing the above-described configuration, since the player tracking devices output the information to the output parts in the manner linked with one another, the functions and the applications of the player tracking device can be expanded. For example, the outputting of the information can be expanded in an integrated manner over gaming machines other than a gaming machine on which a player plays, and the outputting of the information can be expanded for a person other than players in a floor. In addition, through arranging the installation of the player tracking devices, the operation thereof in the manner linked with one another, and the like, representation of the outputting of the information can be expanded.

A gaming machine according to a sixth aspect of the present invention has the below-described configuration.

The gaming machine on which based on rearranged symbols (for example, symbols 1501 of the pseudo reels 1151 to 1155), a payout is awarded, includes:

a display device (for example, a lower image display panel 1141) for displaying a plurality of reels (for example, pseudo reels 1151 to 1155), each of the reels having a plurality of symbols depicted on an external surface;

a cabinet (for example, a cabinet 1011) for internally housing the display device;

a controller (for example, a controller 1100) for rotating and stopping the plurality of reels and controlling the symbols depicted on the plurality of reels to be rearranged; and the player tracking device according to the fifth aspect which is incorporated into the cabinet.

By employing the above-described configuration, since on the plurality of gaming machines each including the player tracking devices, the player tracking devices output the information to the output parts in the manner linked with one another, the functions and the applications of the player tracking device can be expanded. For example, the outputting of the information can be expanded in an integrated manner over gaming machines other than a gaming machine on which a player plays, and the outputting of the information can be expanded for a person other than players in a floor. In addition, through arranging the installation of the player tracking devices, the operation thereof in the manner linked with one another, and the like, representation of the outputting of the information can be expanded.

A program according to a seventh aspect of the present invention has the below-described configuration.

The program is executed on a player tracking device, the player tracking device having an input part and an output part, information for identifying a player being inputted to the input part, information being outputted from the output part, the player tracking device being integrated into a gaming machine which provides a game play for the identified player, the player tracking device being connected via a network to an external server, and the program performs control such that with a request from the external server as a starting point, irrespective of the game play on the gaming machine, linkage presentation performed over a plurality of gaming machines is executed individually by outputting the information to the output parts.

By employing the above-described configuration, since the program operating on the player tracking devices controls such that the plurality of player tracking devices output the information to the output parts in the manner linked with one another, the functions and the applications of the player tracking device can be expanded. For example, the outputting of the information can be expanded in an integrated manner over gaming machines other than a gaming machine on which a player plays, and the outputting of the information can be expanded for a person other than players in a floor. In addition, through arranging the installation of the player tracking devices, the operation thereof in the manner linked with one another, and the like, representation of the outputting of the information can be expanded.

Effects of the Invention

By employing the configuration of the game system according to the present invention, since the plurality of player tracking devices output the information to the output parts in the manner linked with one another, the functions and the applications of the player tracking device can be expanded. For example, the outputting of the information can be expanded in an integrated manner over gaming machines other than a gaming machine on which a player plays, and the outputting of the information can be expanded for a person other than players in a floor. In addition, through arranging the installation of the player tracking devices, the operation thereof in the manner linked with one another, and the like, representation of the outputting of the information can be expanded.

BRIEF DESCRIPTION OF THE DRAWINGS

FIG. 9 is a diagram showing an example of a symbol combination table which the slot machine according to the one embodiment of the present invention includes.

FIGS. 16A to 16C are block diagrams showing examples of setting tables used in the game system according to the one embodiment of the present invention.

FIG. 30 is a diagram showing a layout of a hall in which the game system according to the one embodiment of the present invention is introduced.

FIGS. 33A to 33F are diagrams illustrating examples of a variety of housing specifications which include kiosk terminals according to the one embodiment of the present invention.

DESCRIPTION OF EMBODIMENTS

A first embodiment of the present invention will be described with reference to the accompanying drawings.

[Description of Outline of Game System]

Figure 1:
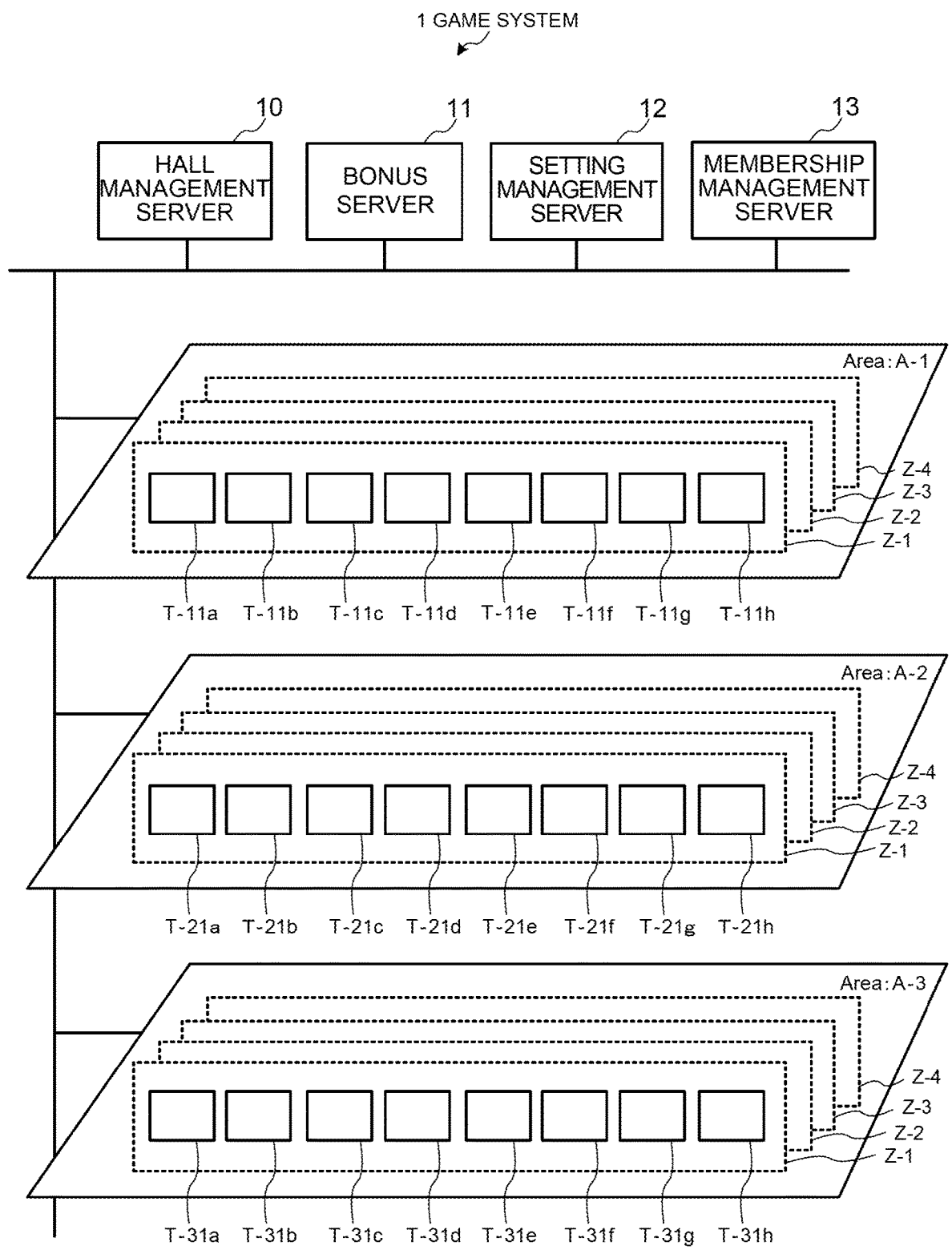
FIG. 1 is a diagram schematically illustrating a game system according to one embodiment of the present invention.

First, with reference to FIG. 1, an outline of a game system will be described. FIG. 1 is a schematic diagram schematically illustrating an overview of the game system 1 according to the first embodiment of the present invention.

The game system 1 includes: a hall management server 10, a bonus server 11, a setting management server 12, a membership management server 13, and a plurality of gaming machines.

The hall management server 10 totalizes and manages a flow of money within a hall (game facility), prepares a balance sheet and the like, and manages the other servers. In addition, the hall management server 10 obtains, from the respective gaming machines, accounting information which includes timing at which each of the gaming machines starts a unit game; timing at which each of the gaming machines terminates the unit game; a drawing result in the unit game; and the like and accumulates the accounting information.

The bonus server 11 controls a bonus drawing in a bonus game and linkage presentation conducted in association with the bonus drawing. In addition, the bonus server 11, for example, manages an accumulated value for providing a bonus (for example, credits accumulated for a progressive bonus). The setting management server 12 stores and manages setting related to gaming machines, on each of which the bonus drawing is conducted, and setting related to the linkage presentation. It is to be noted that although in the present embodiment, the description is given by taking the bonus game as an example, other kinds of games may be conducted.

The membership management server 13 is a server which stores and manages personal information of members, membership card (IC card) information, the past game outcomes of the members, and the like. Issuance of membership cards (IC cards) is made by, for example, a membership card issuing terminal. The personal information of the members, inputted upon member registration, is stored on the membership management server 13 together with identification codes of the membership cards. In addition, the membership card issuing terminal is provided with a camera which allows also shooting of a face of a player for which an IC card is issued upon issuing of a membership card. The shot image is stored on the membership management server 13 so as to be associated with an identification code.

As shown in FIG. 1, the gaming machines are installed in a plurality of areas (for example, as shown in FIG. 1, A-1 to A-3). Here, the areas correspond to, for example, one floor of a hall or areas within the floor. In this example, although the areas from A-1 to A-3 are shown, this is merely one example.

Further, the gaming machines are installed in each zone (for example, as shown in FIG. 1, in Z-1 to Z-4) within each of the areas. Here, each of the zones corresponds to specific space within each of the areas. In this example, although the four zones (Z-1 to Z-4) are provided in each of the areas, respectively, this is also merely one example. In addition, in this example, although eight gaming machines are installed in each one of the zones, respectively, this is also merely one example, and various numbers of the gaming machines can be installed.

As shown in FIG. 1, in the zone Z-1 of the area A-1, eight gaming machines of T-11a to T-11h are installed; similarly, in the zone Z-2 of the area A-1, eight gaming machines of T-12a to T-12h are installed (thereinafter, not shown); in the zone Z-3 of the area A-1, eight gaming machines of T-13a to T-13h are installed; and in the zone Z-4 of the area A-1, eight gaming machines of T-14a to T-14h are installed.

Further, as shown in FIG. 1, in the zone Z-1 of the area A-2, eight gaming machines of T-21a to T-21h are installed; similarly, in the zone Z-2 of the area A-2, eight gaming machines of T-21a to T-22h are installed (thereinafter, not shown); in the zone Z-3 of the area A-2, eight gaming machines of T-23a to T-23h are installed; and in the zone Z-4 of the area A-2, eight gaming machines of T-24a to T-24h are installed. In addition, in the zone Z-1 of the area A-3, eight gaming machines of T-31a to T-31h are installed; similarly, in the zone Z-2 of the area A-3, eight gaming machines of T-32a to T-32h are installed (thereinafter, not shown); in the zone Z-3 of the area A-3, eight gaming machines of T-33a to T-33h are installed; and in the zone Z-4 of the area A-3, eight gaming machines of T-34a to T-34h are installed.

It is to be noted that although it is schematically shown that the respective gaming machines are connected to the hall management server 10 and the bonus server 11 via a LAN connection by Ethernet (a registered trademark), the more detailed connection form will be described later.

In addition, each of the gaming machines is provided with a unique identifier, and the hall management server 10 or the like identifies transmission sources of data transmitted from the respective gaming machines by using the identifiers. In addition, also in a case where the hall management server 10 or the like transmits data to the gaming machines, based on the identifiers, transmission destinations are specified. Although as the identifiers, for example, network addresses such as IP addresses can be used, identifiers other than the network addresses may be provided, thereby allowing the individual gaming machines to be managed.

It is to be noted that the game system 1 may be constructed within one hall (game facility) where various games can be conducted or may be constructed over a plurality of game facilities. In addition, when the game system 1 is constructed in a single game facility, the game system 1 may be constructed in each floor or section of the game facility. A communication line for connecting the servers and the gaming machines may be a wired or wireless line and can adopt a dedicated line, an exchange line, or the like.

[Description of Outline of Gaming Machine]

Figure 2:
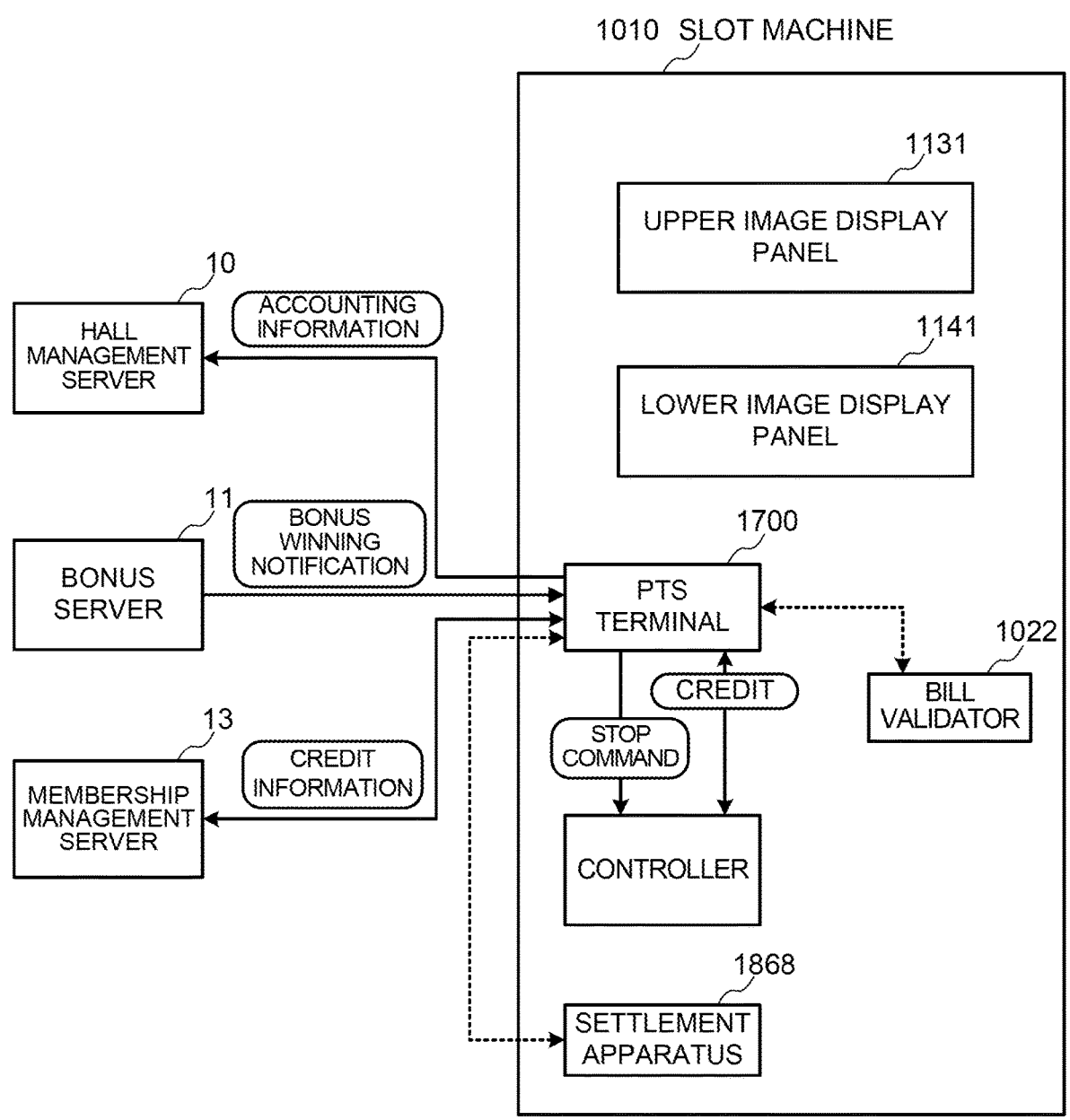
FIG. 2 is a diagram schematically illustrating a slot machine according to the one embodiment of the present invention.

Next, with reference to FIG. 2, an outline of a gaming machine according to the embodiment of the present invention will be described. In FIG. 2, a configuration of a slot machine 1010 which is a gaming machine configured integrally with a player tracking device (Player Tracking Device) is conceptually shown. It is to be noted that the player tracking device is a terminal for realizing a player tracking system (Player Tracking System) and in the present specification, hereinafter, this device is referred to as a PTS terminal. It is to be noted that although in the below description, a case where the slot machine is used as the gaming machine will be described, the present invention is not limited to the case of the slot machine and is applicable to a gaming machine which conducts a variety of games.

As shown in FIG. 2, the slot machine 1010 has the PTS terminal 1700 mounted therein and further includes a settlement apparatus 1868. The slot machine 1010 is connected via the PTS terminal 1700 to the hall management server 10, the bonus server 11, and the like via a network. In the present embodiment, one slot machine 1010 is provided with one PTS terminal 1700 mounted in one part of a housing thereof.

In the present embodiment, the PTS terminal 1700 is connected to a bill validator 1022 via a communication line (or the slot machine 1010).

In addition, based on a predetermined protocol, the PTS terminal 1700 conducts transmission and reception of data to and from a controller (the later-described controller 1100 of the slot machine 1010) and conducts data communication with the hall management server 10, the bonus server 11, and the like connected via the network. For example, from the PTS terminal 1700 to the controller, information pertinent to a credit required to start a game, a stop command to instruct to stop a unit game upon linkage presentation, and the like can be transmitted, and from the gaming controller to the PTS terminal 1700, information pertinent to a credit as a game outcome, start notification of the unit game, and termination notification thereof can be transmitted.

In addition, from the PTS terminal 1700 to the hall management server 10, the start notification and the termination notification of the unit game, accounting information including a drawing result or the like, and the like are transmitted. From the bonus server 11 to the PTS terminal 1700 (of a predetermined slot machine 1010), bonus winning notification is transmitted. Further, between the PTS terminal 1700 and the membership management server 13, information pertinent to credits of members or the like is communicated.

Here, an outline of a game flow in a case of members is as described below. First, member registration is conducted by using the membership card issuing terminal, and at this time, a membership card (IC card) is issued. Thereafter, a player inserts the membership card into the PTS terminal 1700 of the slot machine 1010 and inputs cash there. When a bill or bills have been inputted, the bill validator 1022 identifies a currency kind and a money amount and transmits currency kind data and money amount data as an identification result to the PTS terminal 1700. The PTS terminal 1700 calculates a credit for a game from the currency kind data and the money amount data and transmits the calculated credit to the controller.

Based on the credit transmitted from the PTS terminal 1700, the controller executes the game. A credit in accordance with a game outcome is transmitted from the controller to the PTS terminal 1700, calculation for paying-out based on the game outcome is performed on the PTS terminal 1700, and a money amount to be paid out to a player is determined. On the PTS terminal 1700, the determined money amount is written onto the membership card as it is, and the membership card is ejected. In addition, in accordance with the execution or the like of the game, predetermined points are provided for the membership card.

In a case where a player who is a member plays a game next, the PTS terminal 1700 reads the inserted membership card and then reads out the money amount stored in the membership card. The read-out money amount is converted to a credit and the converted credit is transmitted to the controller. A credit in accordance with a game outcome is transmitted from the controller to the PTS terminal 1700 as mentioned above, calculation for paying-out based on the game outcome is performed on the PTS terminal 1700, and a money amount to be paid out to a player is determined. At this time, the money amount obtained as the game outcome is added to the money amount of the membership card, thereby updating this.

Further, at this time, the PTS terminal 1700 transmits an identification code (or a member ID) read out from the membership card and the updated money amount to the membership management server 13, and the membership management server 13 adds the money amount transmitted from the PTS terminal 1700 to a money amount of a member identified by the above-mentioned identification code and stores said money amount. By conducting this processing, the money amount which the member holds is invariably managed.

Thereafter, if needed, a player who is a member can make settlement at a cashier counter or the like, based on the money amount stored on the membership card. In addition, as in the above-described slot machine 1010, in a case where the settlement apparatus 1868 is included therein, on said slot machine 1010, the settlement can be made by using the membership card.

On the other hand, an outline of a game flow in a case where a player is a non-member is as described below. A player inputs cash to the PTS terminal 1700 of the slot machine 1010. When the bill or bills have been inputted, the bill validator 1022 identifies a currency kind and a money amount and transmits currency kind data and money amount data as an identification result to the PTS terminal 1700. The PTS terminal 1700 calculates a credit for a game from the currency kind data and the money amount data and transmits the calculated credit to the controller.

Based on the credit transmitted from the PTS terminal 1700, the controller executes the game. A credit in accordance with a game outcome is transmitted from the controller to the PTS terminal 1700, calculation for paying-out based on the game outcome is performed on the PTS terminal 1700, and a money amount to be paid out to a player is determined. On the PTS terminal 1700, this determined money amount is written onto a new IC card stocked in the slot machine 1010, and the IC card is ejected. Here, the non-member gets the IC card for the first time.

Thereafter, if needed, a player who is the non-member can make settlement at a cashier counter or the like based on the money amount stored on the IC card. In addition, as in the above-described slot machine 1010, in a case where the settlement apparatus 1868 is included therein, on said slot machine 1010, the settlement can be made by using the IC card.

[Description of Function Flow Diagram]

Figure 3:
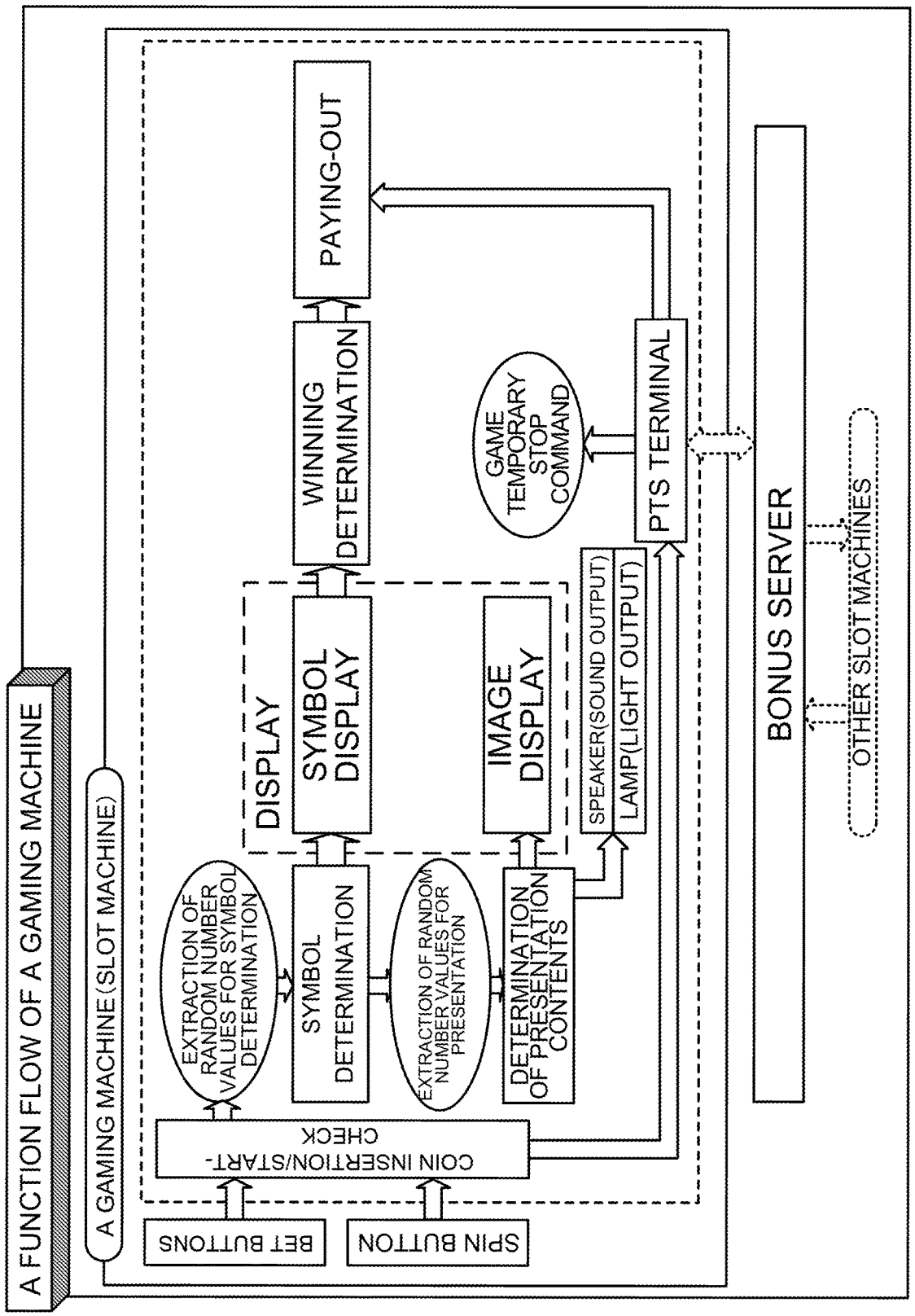
FIG. 3 is a diagram showing basic functions of the slot machine according to the one embodiment of the present invention.

With reference to FIG. 3, basic functions of a slot machine according to one embodiment of the present invention will be described. As shown in FIG. 3, the slot machine 1010 is connected to an external control device (for example, a bonus server 11) so as to allow data communication, and the external control device is connected to a plurality of other slot machines 1010 installed in a hall so as to allow data communication.

<Coin-Insertion/Start-Check>

First, the slot machine 1010 checks whether or not a BET button has been pressed by a player and subsequently checks whether or not a spin button has been pressed by a player.

<Symbol Determination>

Next, when the spin button has been pressed by a player, the slot machine 1010 extracts random number values for symbol determination and determines symbols to be displayed to a player with respect to a plurality of video reels displayed on a display at the time of stopping scrolling of symbol arrays.

<Symbol Display>

Next, the slot machine 1010 starts scrolling of the symbol array of each of the video reels and then stops the scrolling such that the determined symbols are displayed to a player.

<Winning Determination>

Next, when the scrolling of each of the video reels has been stopped, the slot machine 1010 determines whether or not a combination of symbols displayed to a player is a combination related to winning.

<Paying-Out>

Next, when the symbols displayed to a player is the combination related to the winning, the slot machine 1010 provides a benefit according to the combination for a player. For example, when a combination of symbols related to paying-out of coins has been displayed, the slot machine 1010 pays out to a player a number of coins corresponding to the combination of symbols.

In addition, on the slot machine 1010, in a case where the spin button has been pressed by a player and a unit game has been thereby started and in a case where the unit game has been terminated, in response thereto, a drawing for a bonus game is conducted on the bonus server 11. When as an outcome of the drawing for the bonus game, winning has occurred on any of the slot machines 1010, linkage presentation is conducted on the PTS terminals 1700. Here, the unit game refers to a series of operations conducted from when the acceptance of betting is started to when winning is likely to be established.

On any of the slot machines 1010 which has won in the bonus game, paying-out is conducted from the bonus server 11 via the PTS terminal 1700. In addition, the bonus server 11 accumulates, for example, one part of a credit consumed by a player on each of the slot machines 1010 as a credit, for example, for a progressive bonus and when any of the slot machines 1010 has won in the bonus game, pays out one part of the progressive bonus to that slot machine 1010.

<Determination of Presentation>

The slot machine 1010 conducts presentation through displaying of images by a display, outputting of light by a lamp, and outputting of sound by a speaker. The slot machine 1010 extracts a random number value for the presentation and determines presentation contents based on symbols or the like determined by a drawing.

In addition, upon the drawing for the bonus game, the linkage presentation is conducted over the plurality of gaming machines by display devices, light emitting parts, and speakers of the PTS terminals 1700.

[Overall Structure of Slot Machine]

Figure 4:
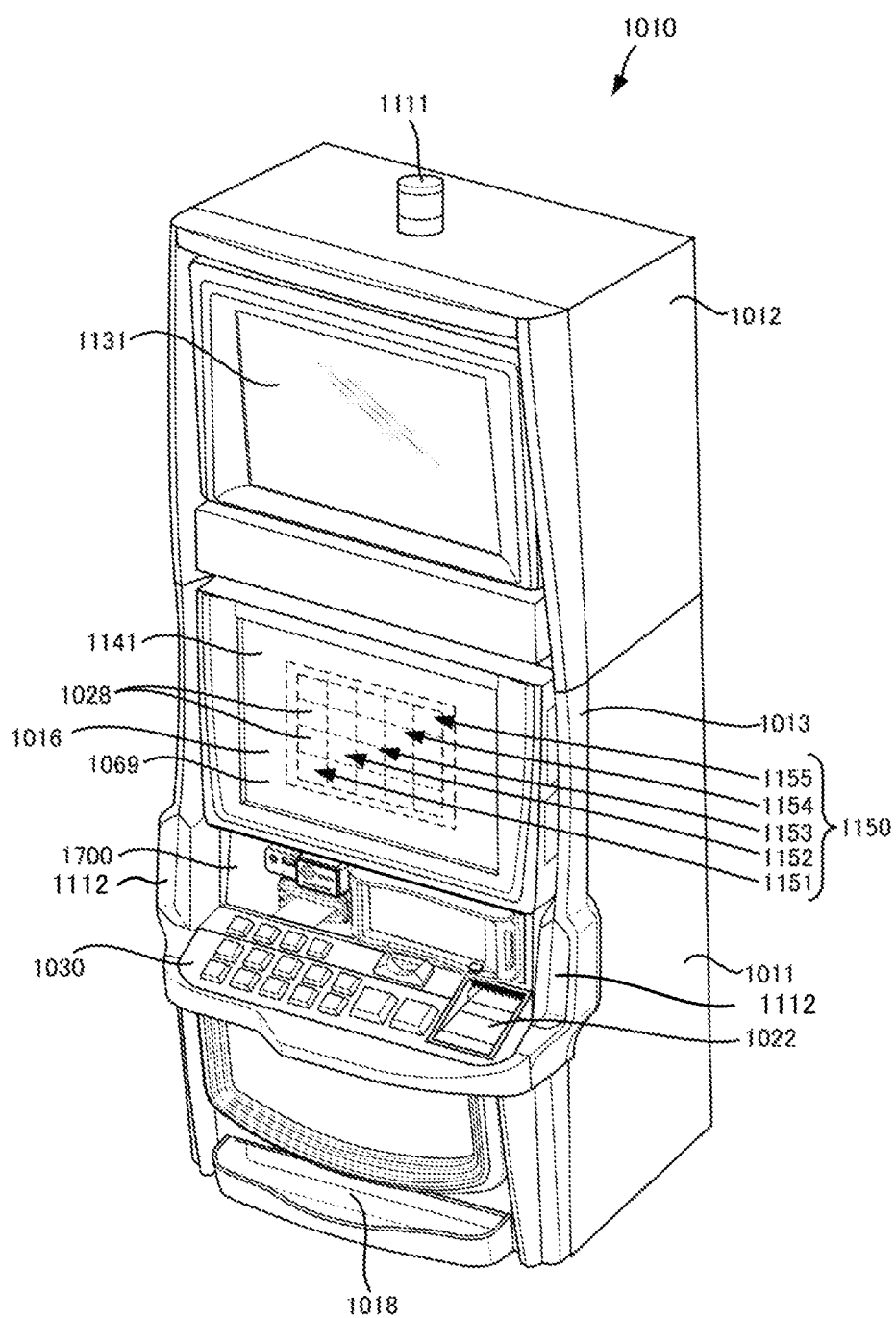
FIG. 4 is a view illustrating an overall structure of the slot machine according to the one embodiment of the present invention.

Next, with reference to FIG. 4, an overall structure of a slot machine 1010 will be described.

On the slot machine 1010, as game media, coins, bills, or electronic valuable information corresponding to these are used. In particular, in the present embodiment, credit-related data such as cash data stored in an IC card 1500 is used.

The slot machine 1010 includes: a cabinet 1011; a top box 1012 attached on an upper side of the cabinet 1011; and a main door 1013 provided on a front face of the cabinet 1011.

On the main door 1013, a symbol display device 1016 which is referred to as a lower image display panel 1141 is provided. The symbol display device 1016 is formed of a transparent liquid crystal panel. A screen which the symbol display device 1016 displays has a display window 1150 in the central portion thereof. The display window 1150 is constituted of 20 display blocks 1028 of 5 columns×4 rows. Four display blocks 1028 of each of the columns form each of pseudo reels 1151 to 1155 and are rotated in response to an operation by a player. The respective pseudo reels 1151 to 1155 allow rearrangement of symbols such that the four display blocks 1028 of each thereof are displayed in a downwardly moving manner while wholly changing a speed, thereby rotating symbols 1501 displayed in the respective display blocks 1028 in a longitudinal direction and thereafter, the rotation is stopped.

Here, the "rearrangement" means a state in which after the arrangement of the symbols 1501 has been released, the symbols 1501 are arranged again. "Arrangement" means a state in which the symbols 1501 can be visually confirmed by an external player. The slot machine 1010 executes the so-called slot game in which based on the state of the arrangement of the symbols 1501 on the pseudo reels 1151 to 1155 which have been rotated and thereafter stopped, a payout in accordance with a predetermined combination is awarded.

It is to be noted that although in the present embodiment, a case where the slot machine 1010 is the so-called video slot machine is described, on the slot machine 1010 according to the present invention, the so-called mechanical reels may be substituted for one part of the pseudo reels 1151 to 1155.

Further, on a front face of the symbol display device 1016, a touch panel 1069 is provided, and a player operates the touch panel 1069, thereby allowing a variety of instructions to be inputted. An input signal is transmitted from the touch panel 1069 to a main CPU 1071.

On a front face of the top box 1012, an upper image display panel 1131 is provided. The upper image display panel 1131 is constituted of a liquid crystal panel and configures a display. The upper image display panel 1131 displays images related to presentation and images showing introduction of contents of games and rules thereof.

In addition, above the display window 1150, a number-of-credits display part (not shown) is displayed and a current number of credits is displayed therein. Here, "credits" are virtual game media on a game, to be used when a player makes betting. It is to be noted that in the number-of-credits display part, a total number of credits which a player currently has is displayed.

In addition, below the number-of-credits display part, a fraction cash display part (not shown) is displayed. In the fraction cash display part, fraction cash is displayed. The "fraction cash" is cash which is not converted to a credit because an inputted money amount is insufficient.

When the IC card 1500 is inserted into the later-described PTS terminal 1700, a number of credits stored on the IC card is displayed on the number-of-credits display part, and fraction cash stored on the IC card is displayed on the fraction cash display part. It is to be noted that these numerical values are stored on the membership management server 13 so as to be associated with an identification code of the membership card.

Here, the IC card is, for example, a non-contact IC card and has incorporated thereon an IC (Integrated Circuit) for recording and computing a variety of pieces of data such as credits and enables short-range wireless communication using an RFID (Radio Frequency Identification) technology such as NFC (Near Field Communication), for example. By using the IC card 1500, a player can have the credit-related data and further, can freely carry this with him or her among different slot machines. A player inserts the IC card 1500 into the PTS terminal 1700 of the slot machine 1010 and thereby uses the credit-related data (money amount data) stored on the IC card 1500, thereby allowing a player to play a game such as a unit game on the slot machine 1010.

It is to be noted that it may be made possible for a player to deposit cash such as coins and bills as cash data on the IC card 1500 by using an apparatus installed in a hall.

In addition, below the lower image display panel 1141, the PTS terminal 1700 is incorporated into the cabinet 1011. Further, on right and left sides besides the PTS terminal 1700, speakers 1112 are provided, respectively. On an upper portion of the top box 1012, a lamp 1111 is provided. On the slot machine 1010, presentation in a unit game is executed through displaying of images by the upper image display panel 1131, outputting of sound by the speakers 1112, outputting of light by the lamp 1111, and the like.

[Configuration of PTS Terminal]

Figure 5:
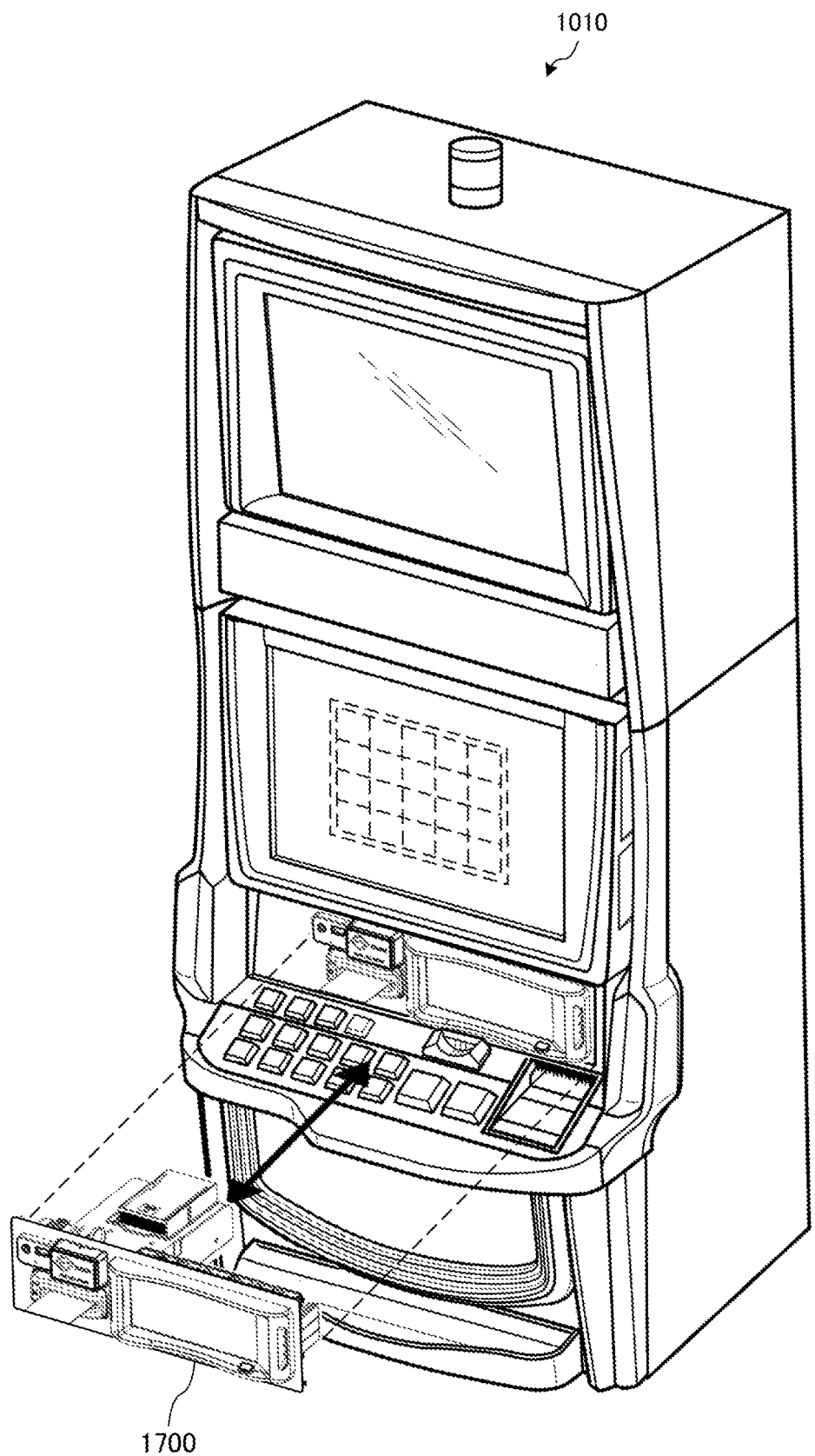
FIG. 5 is a view illustrating a PTS terminal which is incorporated into the slot machine according to the one embodiment of the present invention.

FIG. 5 is a diagram illustrating a PTS terminal 1700 incorporated into a slot machine 1010. The PTS terminal 1700 uses a data interface which is commonalized for gaming machines to communicate data and can be thereby incorporated into a variety of types of gaming machines manufactured by a variety of makers.

Figure 6:
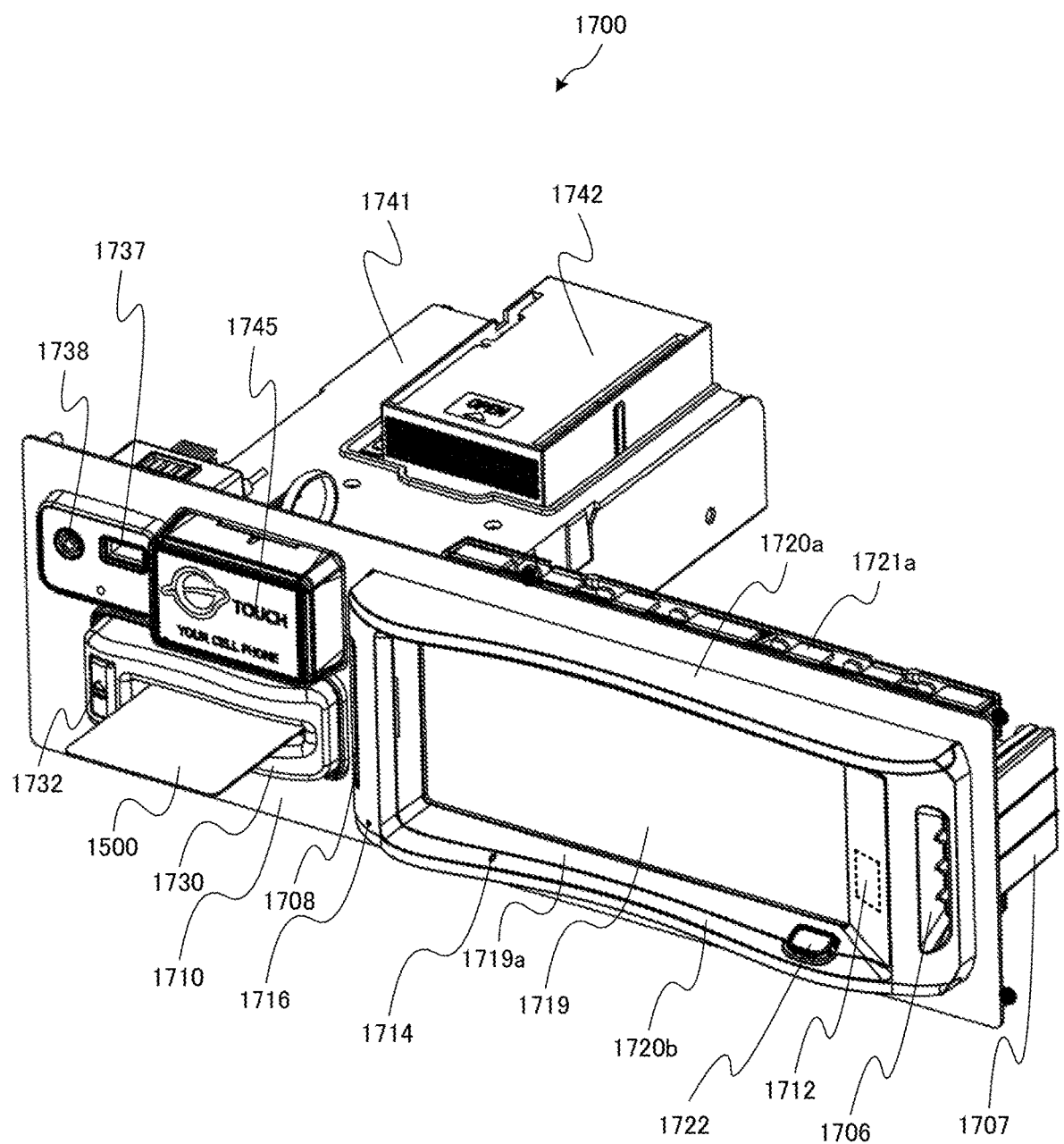
FIG. 6 is a view illustrating the PTS terminal according to the one embodiment of the present invention in an enlarged manner.

FIG. 6 is an enlarged view of the PTS terminal 1700 shown in FIG. 5. As shown in FIG. 6, the PTS terminal 1700 has a panel 1710, respective parts located on a front face of the panel 1710 are viewable by a player, and members located on a rear face of the panel 1710 are housed inside of the cabinet 1011 of the slot machine 1010 and are not viewable by a player.

On a right side of the front face of the panel 1710, an LCD 1719 having a touch panel function is provided. The LCD 1719 displays, for example, information related to members and information for members, and a size of a screen thereof is 6.2 inches (approximately 15.7 cm). In addition, around the LCD 1719, an LCD cover 1719a is provided. It is to be noted that although in this example, the LCD 1719 is configured to have the touch panel function, instructions issued by a player may be inputted with other input devices such as a keyboard and a mouse.

In addition, above the LCD 1719 and the LCD cover 1719a, a light emitting plate 1720a which is connected to LEDs and emits light is provided. The light emitting plate 1720a is formed of, for example, polycarbonate and is connected to a plurality of (for example, seven) full-color LEDs 1721a located on a rear side of the panel 1710 and emits light in accordance with light emitting of the full-color LEDs 1721a.

Below the LCD 1719 and the LCD cover 1719a, similarly, a light emitting plate 1720b which is connected to LEDs and emits light is provided. The light emitting plate 1720b is formed of, for example, polycarbonate and is connected to a plurality of (for example, seven) full-color LEDs 1721b (not shown) located on the rear side of the panel 1710 and emits light in accordance with light emitting of the full-color LEDs 1721b.

In addition, on a right side of the LCD 1719, an image pickup window 1712 is provided, and a human body detection camera 1713 (not shown) located inside of the LCD cover 1719a or on the rear side of the panel 1710 shoots an image of a player via this image pickup window 1712. The image pickup window 1712 may be also formed of, for example, a half mirror material which has undergone shield processing such as smoke processing.

In addition, at a position of the LCD cover 1719a, which is below the LCD 1719 and is on a right side, a home button 1722 is provided. The home button 1722 is a button to shift a screen displayed on the LCD 1719 to a predetermined upper level screen.

Further, at a position of the LCD cover 1719a, which is on the right side of the LCD 1719, a speaker duct 1706 is provided, and in a position on the rear side of the panel 1710, which corresponds to a position of the speaker duct 1706, a bass reflex type speaker 1707 is provided. Similarly, on a left side of the LCD 1719, a speaker duct 1708 is provided, and in a position on the rear side of the panel 1710, which corresponds to a position of the speaker duct 1708, a bass reflex type speaker 1709 (not shown) is provided. These speakers are speakers dedicated to the PTS terminal 1700 and are provided separately from the speakers 1112 for a slot machine game provided on the slot machine 1010. These speakers are capable of realizing linkage presentation and a phone call by voice and of outputting notification sound for notifying a player that an IC card 1500 is left unremoved. It is to be noted that since the configuration thereof is made such that sound from the speakers passes through the above-described speaker ducts 1706 and 1708 and is heard in front thereof (on a player side) in a stereophonic manner, the speakers can be installed on the rear side of the panel 1710 and as a result, space-saving of the PTS 1700 (panel face) can be realized.

In addition, at positions of the LCD cover 1719a, which are below the LCD 1719 and are on a left side, a microphone opening 1714 and a microphone opening 1716 are provided. In portions corresponding to the microphone opening 1714 and the microphone opening 1716 inside of the LCD cover 1719a, microphones 1715 and 1717 (not shown) are provided, respectively.

In a left lower portion of the front face of the panel 1710, a card insertion slot 1730 which allows an IC card 1500 to be inserted thereto and removed therefrom is provided. In a card insertion part of the card insertion slot 1730, full-color LEDs 1731 (not shown) are provided, which are lit up in a plurality of colors, thereby allowing the remaining number of IC cards 1500 stacked in the later-described card stacker 1742 to be notified. At the card insertion slot 1730, an eject button 1732 is provided, and in the vicinity of the eject button 1732, an LED 1733 (not shown) is provided, which is lit up in red, thereby allowing a position and a way of an ejection operation of the eject button 1732 to be found.

In addition, in positions on a rear side of the panel 1710, which correspond to the card insertion slot 1730, a card unit 1741 and the card stacker 1742 are provided, and the card insertion slot 1730 is configured as one part of the card unit 1741. In the card stacker 1742, approximately 30 IC cards 1500 can be retained, and when a player who has newly played a unit game makes settlement of credits, an IC card 1500 retained in the card stacker 1742 is taken out and ejected to the card insertion slot 1730.

For the IC card 1500 taken in from the card insertion slot 1730 and retained in the card unit 1741, upon the settlement of credits, credit information is updated by NFC or the like, and thereafter, the IC card 1500 is ejected from the card insertion slot 1730. While a player is playing a unit game, the IC card 1500 is completely housed inside of the card unit 1741.

In addition, in a case where upon the settlement of credits, in spite of the IC card 1500 left unremoved, absence of a player is detected by the human body detection camera or the like, the configuration may also be arranged such that the IC card 1500 can be retained in the card stacker 1742. Thus, for example, even in a case where a player has learned that the remaining number of credits is small and yet has left his or her seat with the IC card 1500 left unremoved or in a case where a player has simply forgotten to remove the IC card 1500 and has left his or her seat, it does not occur that the IC card 1500 is left retained in the card unit 1741 over a long period of time.

In positions on a left upper side of the front face of the panel 1710, a USB terminal 1737 and an audio terminal 1738 are provided. The USB terminal 1737 is configured to allow battery charge or the like by connecting a USB device thereto. In addition, the audio terminal 1738 is, for example, a four-pole terminal, and a headset is inserted thereto, thereby allowing a phone call with other person to be made with the headphones and the microphones. In addition, the audio terminal 1738 may be configured to be a two-pole or three-pole terminal, thereby allowing sound to be listened with the headphones.

On the front face of the panel 1710 and on the left side of the LCD 1719, a touch unit 1745 is provided. The touch unit 1745 includes an RFID module which can function as a writer to write data through data communication to an IC device including an IC chip (for example, a non-contact IC card, a mobile phone and a smartphone, each of which has a communication function by NFC, and the like) and which can function as a reader to read data through the data communication from said IC device. In addition, in four corners of the front face of the touch unit 1745, LEDs 1746 (not shown) are located, respectively. In addition, besides the touch unit 1745 or instead of the touch unit 1745, an information recording medium reading device for reading information stored in an information recording medium such as a magnetic card may be provided. In this case, instead of the IC card 1500, the magnetic card may be a membership card.

As described above, the PTS terminal 1700 according to the one embodiment of the present invention is formed such that the variety of devices having the microphone function, the camera function, the speaker function, the display function, and the like are integrated into one unit, thus realizing space-saving. This allows avoiding of inconvenience, for example, in that by mounting respectively single parts having the above-mentioned functions, if the LCD is mounted so as to face a player, the speakers cannot be mounted so as to face a player.

[Advantage of Mounting Both of Card Unit and Touch Unit]

In addition, the PTS terminal 1700 according to the one embodiment of the present invention is configured such that upon inserting an IC card 1500 into a card insertion slot 1730, contents of the IC card 1500 is read by a card unit 1741 and the whole IC card 1500 is taken in (inside of the PTS terminal 1700) and is held there inside. In addition thereto, a touch unit 1745 is provided and this allows data communication with another IC card, a mobile phone, and a smartphone.

By employing the above-described configuration of the PTS terminal 1700 according to the present invention, for example, in a case where while a player who is a member is playing a game on a gaming machine (at this time, a membership card is held in the card unit 1741), when some maintenance comes to be required, a staff member touches an IC card for maintenance onto this touch unit 1745, thereby enabling a screen for the maintenance to be displayed on an LCD 1719 of the PTS terminal 1700 and contents and a history of the maintenance to be transmitted to a server and stored thereon.

In addition, for example, in a case where maintenance for a plurality of gaming machines is simultaneously conducted or maintenance for a large number of gaming machines is continuously conducted, a staff member consecutively touches the card for maintenance onto these touch units 1745, thereby allowing operations of displaying the screen for maintenance, registering of contents of maintenance, and the like to be quickly performed.

On the other hand, if the PTS terminal 1700 is configured such that only the touch unit 1745 enables access to an IC card or the like, when after a player playing a game by initially touching an IC card 1500 thereonto has left a gaming machine, another player uses that gaming machine, the gaming machine cannot recognize switching of a player. Also in order to solve such inconvenience, the card unit 1741 which holds the IC card 1500 during a game is required. For example, if after a player playing a game by initially touching an IC card 1500 thereonto has left a gaming machine, another player plays a game on that gaming machine by inputting bills (without using any IC card) and makes settlement, credit-related data is stored on the IC card 1500 of the initial player.

[Configuration of Circuitry Included in Slot Machine]

Figure 7:
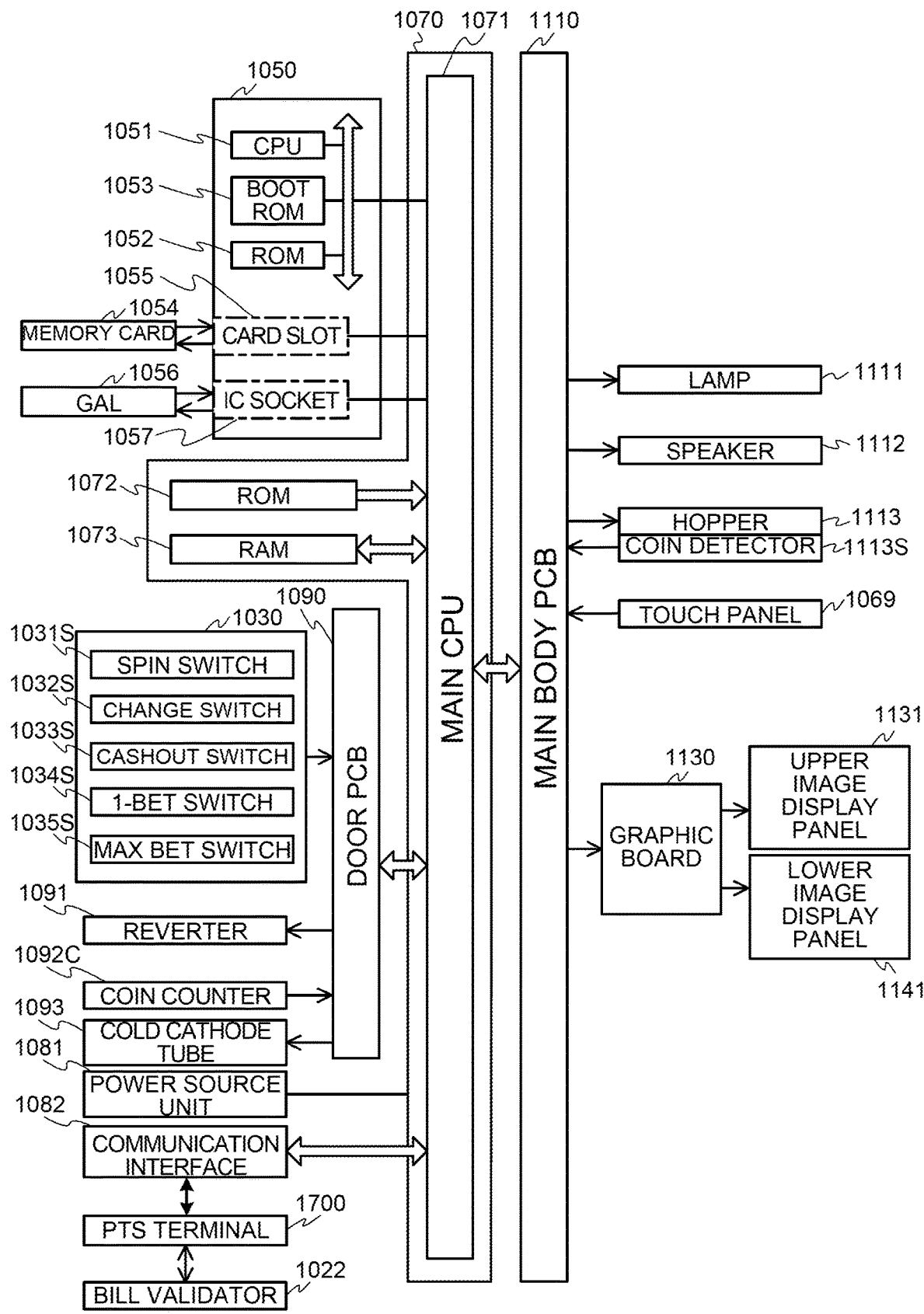
FIG. 7 is a diagram showing a circuitry configuration of the slot machine according to the one embodiment of the present invention.

Next, with reference to FIG. 7, a configuration of circuitry included in a slot machine 1010 will be described.

A gaming board 1050 is provided with: a CPU 1051, a ROM 1052, and a boot ROM 1053, which are mutually connected by an internal bus; a card slot 1055 corresponding to a memory card 1054; and an IC socket 1057 corresponding to a GAL (Generic Array Logic) 1056.

The memory card 1054 includes a non-volatile memory and stores a game program and a game system program. The game program includes a program related to game progression and a program for producing presentation by images and sounds. In addition, the above-mentioned game program includes a symbol determination program. The symbol determination program is a program for determining symbols to be rearranged in display blocks 1028.

In addition, the card slot 1055 is configured such that the memory card 1054 can be inserted thereinto and removed therefrom and is connected to a motherboard 1070 by an IDE bus. Accordingly, the memory card 1054 is pulled out from the card slot 1055, another game program is written into the memory card 1054, and that memory card 1054 is inserted into the card slot 1055, thereby allowing a kind and contents of a game played on the slot machine 1010 to be changed.

The GAL 1056 is a type of a PLD (Programmable Logic Device) having a fixed OR array structure. The GAL 1056 is provided with a plurality of input ports and output ports, and predetermined input into the input port causes output of the corresponding data from the output port.

In addition, the IC socket 1057 is configured such that the GAL 1056 can be inserted thereinto and removed therefrom and is connected to the motherboard 1070 by a PCI bus. The contents of the game to be played on the slot machine 1010 can be changed by replacing the memory card 1054 with another memory card 1054 having another program written therein or by rewriting the program written into the memory card 1054 as another program.

The CPU 1051, the ROM 1052, and the boot ROM 1053 mutually connected by the internal bus are connected to the motherboard 1070 by a PCI bus. The PCI bus enables a signal transmission between the motherboard 1070 and the gaming board 1050 and power supply from the motherboard 1070 to the gaming board 1050.

The ROM 1052 stores an authentication program. The boot ROM 1053 stores a pre-authentication program, a program (boot code) to be used by the CPU 1051 for activating the pre-authentication program, and the like.

The authentication program is a program (tamper check program) for authenticating the game program and the game system program. The pre-authentication program is a program for authenticating the above-mentioned authentication program. The authentication program and the pre-authentication program are written along a procedure (authentication procedure) for proving that the program to be the subject has not been tampered.

The mother board 1070 is configured by using a commercially available general-purpose mother board (printed circuit board having basic components of a personal computer mounted thereon) and includes a main CPU 1071, a ROM (Read Only Memory) 1072, a RAM (Random Access Memory) 1073, and a communication interface 1082. It is to be noted that the main CPU 1071 corresponds to a controller 1100 of the slot machine 1010.

The ROM 1072 includes a memory device such as a flash memory and stores a program such as BIOS (Basic Input/Output System) to be executed by the main CPU 1071 and permanent data. When the BIOS is executed by the main CPU 1071, processing for initializing predetermined peripheral devices is conducted; and further, through the gaming board 1050, processing of loading the game program and the game system program stored in the memory card 1054 is started. It is to be noted that in the present invention, the ROM 1072 may be a ROM in which contents are rewritable or a ROM in which contents are un-rewritable.

The RAM 1073 stores data and programs such as the symbol determination program which are used in operation of the main CPU 1071. For example, when the processing of loading the above-mentioned game program, game system program, or authentication program is conducted, the RAM 1073 can store the program. The RAM 1073 is provided with working areas used for operations in execution of these programs. Examples of the areas include: an area that stores counters for managing the number of games, the number of BETs, the number of payout, the number of credits, and the like; and an area that stores symbols (code numbers) determined by a drawing.

The communication interface 1082 is to control transmission and reception of data with the PTS terminal 1700. In addition, the motherboard 1070 is connected with the later-described door PCB (Printed Circuit Board) 1090 and a main body PCB 1110 by respective USBs. The motherboard 1070 is also connected with a power supply unit 1081.

When the power is supplied from the power supply unit 1081 to the motherboard 1070, the main CPU 1071 of the motherboard 1070 is activated, and then the power is supplied to the gaming board 1050 through the PCI bus so as to activate the CPU 1051.

The door PCB 1090 and the main PCB 1110 are connected with input devices such as switches and sensors and peripheral devices, the operations of which are controlled by the main CPU 1071.

The door PCB 1090 is connected with a control panel 1030, a reverter 1091, a coin counter 1092C, and a cold cathode tube 1093.

The control panel 1030 is provided with a spin switch 1031S, a change switch 1032S, a CASHOUT switch 1033S, a 1-BET switch 1034S, and a MAX-BET switch 1035S which correspond to the above-mentioned respective buttons. Each of the switches outputs a signal to the main CPU 1071 upon detection of pressing of the button corresponding thereto by a player.

Inside of a coin entry 1036, the reverter 1091 and the coin counter 1092C are provided. The reverter 1091 identifies whether or not coins inputted into the coin entry 1036 are authentic and discharges coins other than authentic coins from a coin payout outlet. In addition, the reverter 1091 detects authentic coins accepted by the coin counter 1092C and counts a number of the accepted authentic coins.

The reverter 1091 operates based on a control signal outputted from the main CPU 1071 and distributes authentic coins validated by the coin counter 1092C into a hopper 1113 or a cash box (not shown). That is, coins are distributed into the hopper 1113 when the hopper 1113 is not filled with coins, while coins are distributed into the cash box when the hopper 1113 is filled with coins.

The cold cathode tube 1093 functions as a backlight installed on the rear face sides of the upper image display panel 1131 and the lower image display panel 1141 and lights up based on a control signal outputted from the main CPU 1071.

The main body PCB 1110 is connected with the lamp 1111, the speaker 1112, the hopper 1113, a coin detecting part 1113S, a touch panel 1069, and a graphic board 1130. It is to be noted that although in this example, the bill validator 1022 is connected to the PTS terminal 1700, the bill validator 1022 may be configured to be connected to the slot machine 1010.

The lamp 1111 lights up based on a control signal outputted from the main CPU 1071. The speaker 1112 outputs sound such as BGM based on a control signal outputted from the main CPU 1071.

The hopper 1113 operates based on a control signal outputted from the main CPU 1071 and pays out the specified number of coins from the coin payout outlet to a coin tray 1018. The coin detecting part 1113S outputs a signal to the main CPU 1071 upon detection of coins paid out by the hopper 1113.

The touch panel 1069 detects a position on the lower image display panel 1141 touched by a player's finger or the like and outputs to the main CPU 1071 a signal corresponding to the detected position.

The bill validator 1022 identifies whether or not bills are authentic and accepts authentic bills into the cabinet 1011. An amount of the bills inputted into the cabinet 1011 is converted to a number of coins and a credit which is equivalent to the converted number of coins is added as a credit which a player has.

The graphic board 1130 controls display of images conducted by each of the respective upper image display panel 1131 and lower image display panel 1141 based on a control signal outputted from the main CPU 1071. The graphic board 1130 is provided with a VDP (Video Display Processor) generating image data, a video RAM storing the image data generated by the VDP, and the like. It is to be noted that the image data used in generation of image data by the VDP is included in the game program which has been read from the memory card 1054 and stored into the RAM 1073.

In addition, the graphic board 1130 is provided with the VDP (Video Display Processor) generating image data based on a control signal outputted from the main CPU 1071, the video RAM temporarily storing the image data generated by the VDP, and the like. It is to be noted that the image data used in generation of image data by the VDP is included in the game program that has been read from the memory card 1054 and stored into the RAM 1073.

[Circuitry Configuration of PTS Terminal]

Figure 8:
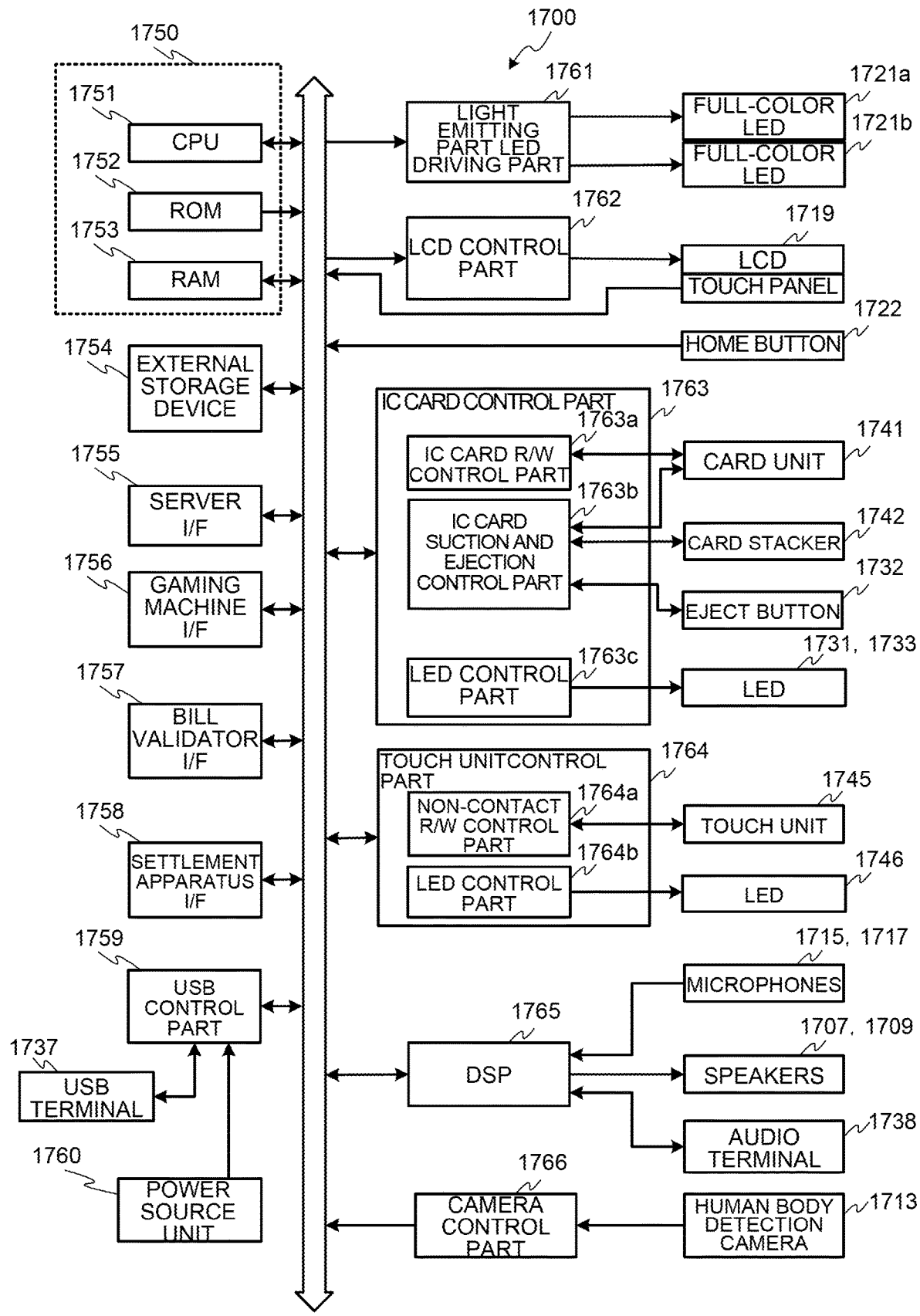
FIG. 8 is a diagram showing a circuitry configuration of the PTS terminal according to the one embodiment of the present invention.

Next, with reference to FIG. 8, a configuration of circuitry which a PTS terminal 1700 includes will be described.

A PTS controller 1750 for controlling the PTS terminal 1700 has a CPU 1751, a ROM 1752, and a RAM 1753.

The CPU 1751 controls execution of each component of the PTS terminal 1700, executes a variety of programs stored in the ROM 1752, and performs computation. For example, the CPU 1751 executes a credit updating program and updates credit-related data stored in an IC card 1500.

The ROM 1752 is constituted of a memory device such as a flash memory and has stored therein permanent data executed by the CPU 1751. For example, in the ROM 1752, a credit updating program for rewriting credit-related data stored in the IC card 1500, a linkage presentation control program executed in response to a request from a bonus server 11, and the like can be stored.

The RAM 1753 temporarily stores data required upon executing the variety of programs stored in the ROM 1752.

An external storage device 1754 is, for example, a storage device such as a hard disk device and stores the programs executed by the CPU 1751 and data which the programs executed by the CPU 1751 use.

A server I/F (interface) 1755 realizes data communication between servers such as a hall management server 10, the bonus server 11, and the like and the PTS terminal 1700. A gaming machine I/F (interface) 1756 realizes data communication between a controller 1100 of a slot machine 1010 and the PTS terminal 1700, and for said data communication, a prescribed protocol can be used.

Besides, the PTS terminal 1700 is connected to a bill validator 1022 via a bill validator I/F (interface) 1757 and connected to a settlement apparatus 1868 via a settlement apparatus I/F (interface) 1758 and is operable to perform transmission and reception of data as needed.

A USB control part 1759 determines whether on a USB terminal 1737, power is supplied from a power supply unit 1760 and when a predetermined condition is satisfied, enables the recharging on the USB terminal 1737. When the predetermined condition is satisfied, a player connects an electronic device to the USB terminal 1737, thereby allowing said electronic device to be recharged.

A light emitting part LED driving part 1761, in response to a linkage presentation start request from the bonus server 11, performs control such that in order to cause an upper light emitting plate 1720a of an LCD 1719 to emit light, full-color LEDs 1721a are lit up at predetermined timing and performs control such that in order to cause a lower light emitting plate 1720b of the LCD 1719 to emit light, full-color LEDs 1721b are lit up at predetermined timing.

An LCD control part 1762 performs control to cause the LCD 1719 to display information pertinent to members, information for the members, and the like and to display data read out from an IC card 1500 and data inputted by a player. In addition, the LCD 1719 has a touch panel function and when a touch panel is operated by a player, a predetermined signal is transmitted to the CPU 1751.

A home button 1722 is provided in the vicinity of the LCD 1719 and is a button for shifting a screen displayed on the LCD 1719 to a predetermined upper level screen. When the home button 1722 is pressed by a player, that operation by a player is transmitted to the CPU 1751, and the CPU 1751 transmits an instruction to the LCD control part 1762 to update the display on the LCD 1719 in accordance with said operation.

An IC card control part 1763 performs control for insertion and ejection of an IC card 1500, writing of credit data thereto, and the like. The IC card control part 1763 includes an IC card R/W (reader/writer) control part 1763a, an IC card suction and ejection control part 1763b, and an LED control part 1763c.

The IC card R/W control part 1763a controls a card unit 1741 to update credit-related data stored in an IC card 1500. In addition, when an IC card 1500 is newly issued, credit-related data corresponding a settled money amount is stored therein. The card unit 1741 has an antenna part for reading or writing data by NFC or the like from or to an IC card 1500.

Although the card unit 1741 has functions of an IC card reader for reading information stored in an IC card 1500 and an IC card writer for writing information to an IC card 1500, the card unit 1741 may have a function of either one of the IC card reader and the IC card writer as needed.

The IC card suction and ejection control part 1763b performs control for suction and ejection of an IC card 1500. When an IC card 1500 is inserted by a player into a card insertion slot 1730, the IC card suction and ejection control part 1763b performs control to retain the IC card while a player is executing a game. In addition, after the credit-related data has been written in the IC card 1500 upon the settlement, the IC card suction and ejection control part 1763b performs control to eject that IC card 1500. Further, when an eject button 1732 has been pressed, the IC card suction and ejection control part 1763b ejects the IC card 1500.

In addition, when an IC card 1500 is newly issued, the IC card suction and ejection control part 1763b newly takes out an IC card 1500 from a card stacker 1742 and in order to cause the IC card 1500 to store credit-related data, supplies the IC card 1500 to the card unit 1741.

The LED control part 1763c performs control to light up LEDs (full-color LEDs 1731) provided in the vicinity of the card insertion slot 1730 of the card unit 1741 and to light up an LED (red LED 1733) provided in the vicinity of the eject button 1732.

A touch unit control part 1764 controls data transmission and reception associated with a touch operation by an IC card 1500, a mobile phone, a smartphone, or the like. The touch unit control part 1764 includes a non-contact R/W (reader/writer) control part 1764a and an LED control part 1764b.

The non-contact R/W control part 1764a determines whether or not an IC card 1500 or a mobile phone comes within a predetermined distance close to a touch unit 1745 (for example, a touch operation has been conducted thereon) and when the IC card 1500 or the mobile phone has come within the predetermined distance close thereto, the non-contact R/W control part 1764a obtains a reading-out result from the touch unit 1745. The touch unit 1745 has an antenna part for performing data transmission and reception to and from the IC card 1500 or the mobile phone by the NFC or the like.

Although the touch unit 1745 has functions of an IC card reader for reading information stored in an IC card 1500 or a mobile phone and an IC card writer for writing information to the IC card 1500 or the mobile phone, the touch unit 1745 may have a function of either one thereof as needed.

The LED control part 1764*b* controls LEDs 1746 located in four corners of a front face of the touch unit 1745 to light up the LEDs 1746 at predetermined timing.

A DSP 1765 receives sound data obtained from microphones 1715 and 1717 and subjects the sound data to predetermined processing and thereafter, transmits the processed data to the CPU 1751. In addition, the DSP 1765 transmits the received sound data to speakers 1707 and 1709. Further, the DSP 1765 outputs, to an audio terminal connected with a headset, the received sound to headphones and processes the sound received from the microphones and transmits the processed sound to the CPU 1751. It is to be noted that here, the configuration of the outline is described and the description on an A/D converter, a D/A converter, an amplifier, and the like is omitted.

A camera control part 1766 obtains an image of a player or the like shot by a human body detection camera 1713, subjects the image to predetermined image processing as needed, and transmit the processed data to the CPU 1751. Said data is transmitted, for example, via the server I/F 1755 to the hall management server 10, a membership management server 13, and the like.

[Configuration of Symbol Combination Table]

Next, with reference to FIG. 9, a symbol combination table will be described.

The symbol combination table specifies combinations of drawn symbols related to winning and the numbers of payout. On the slot machine 1010, the scrolling of symbol arrays of five pseudo reels 1151 to 1155 (a first video reel to a fifth video reel) is stopped, and winning is established when the combination of symbols displayed along a winning line matches one of the combinations of symbols specified by the symbol combination table. According to the winning combination, a benefit such as payout of coins is awarded to a player. It is to be noted that winning is not established (i.e. the game is lost) when the combination of symbols displayed along the winning line does not match any of the combinations of symbols specified by the symbol combination table.

Basically, winning is established when all symbols displayed along the winning line by all of the five pseudo reels 1151 to 1155 are of one kind out of kinds of symbols "RED", "APPLE", "BLUE 7", "BELL", "CHERRY", "STRAWBERRY", "PLUM", and "ORANGE". However, with respect to the respective kinds of symbols "CHERRY" and "ORANGE", winning is also established when one or three symbols of either kind are displayed along the winning line by the pseudo reel or the pseudo reels.

For example, when all the symbols displayed along the winning line by all of the five pseudo reels 1151 to 1155 are the symbols "BLUE 7", the winning combination is a "BLUE" combination, and "10" is determined as the number of payout. Based on the determined number of payout, the payout of coins is conducted. The payout of coins is conducted, for example, such that the added credit is stored in the IC card 1500 and thereafter, the IC card 1500 is ejected from the card insertion slot 1730.

[Contents of Programs Executed on Slot Machine]

Next, with reference to FIG. 10 to FIG. 14, programs executed on a slot machine 1010 will be described.

<Main Control Process>

Figure 10:
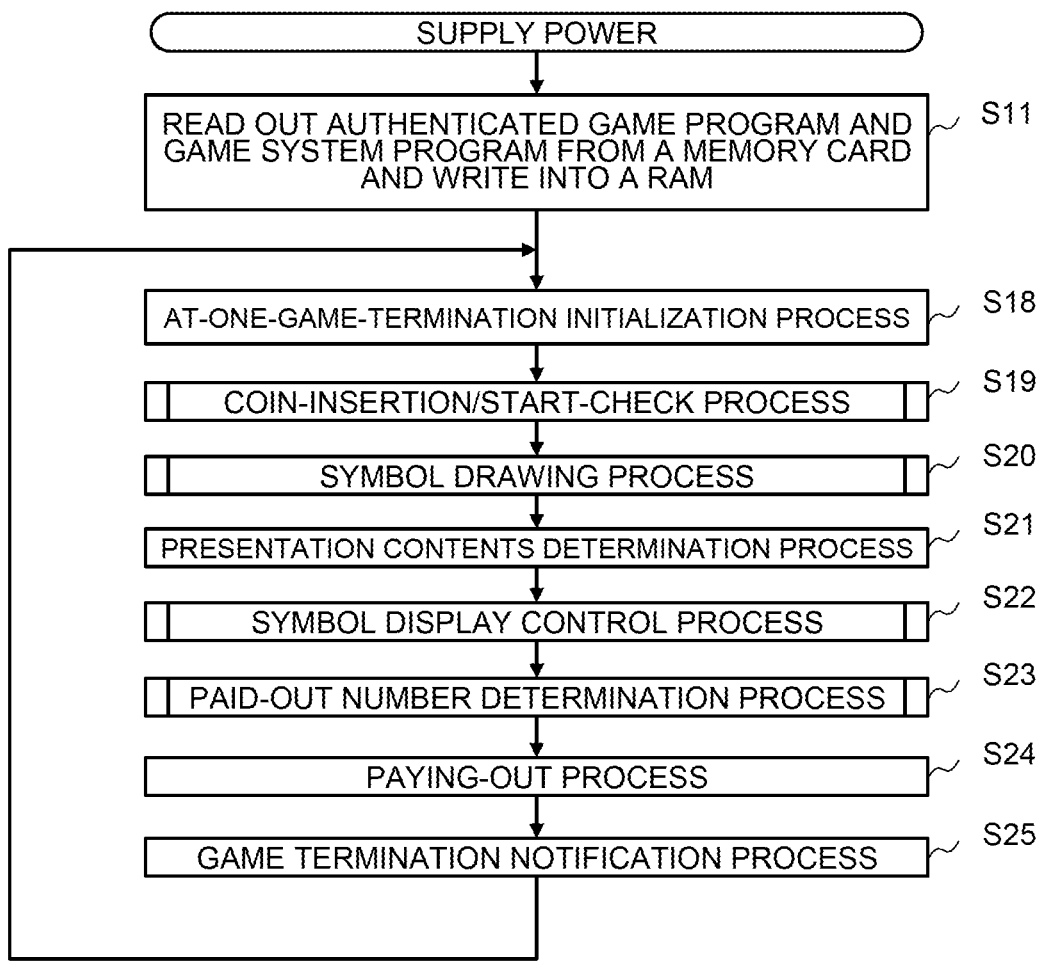
FIG. 10 is a flowchart showing a procedure of a main control process executed on the slot machine according to the one embodiment of the present invention.

First, with reference to FIG. 10, a main control process will be described. First, when the power is supplied to the slot machine 1010, a main CPU 1071 reads the authenticated game program and game system program from a memory card 1054 via a gaming board 1050 and writes the programs into a RAM 1073 (step (hereinafter, abbreviated to S) 11).

Next, the main CPU 1071 conducts an at-one-game-termination initialization process (S18). For example, data that becomes unnecessary after each game in working areas of the RAM 1073, such as the number of BETs and the symbols determined by a drawing, is cleared.

Next, the main CPU 1071 conducts a coin insertion/start-check process which is described later (S19). In this process, input from a BET switch and a spin switch is checked.

Next, the main CPU 1071 conducts a symbol drawing process which is described later (S20). In this process, to-be-stopped symbols are determined based on random number values for symbol determination.

Next, the main CPU 1071 conducts a presentation contents determination process (S21). The main CPU 1071 extracts a random number value for presentation and determines any of the presentation contents from a predetermined plurality of presentation contents by a drawing. The presentation contents can be determined in accordance with a winning combination and a state of a game on a slot machine 1010. For example, the configuration can be arranged such that in accordance with winning combinations and the states of the game on the slot machine 1010, drawing probabilities related to respective presentation contents are made different from one another.

Next, the main CPU 1071 conducts a symbol display control process which is described later (S22). In this process, the scrolling of five pseudo reels 1151 to 1155 (a first video reel to a fifth video reel) is started, and the to-be-stopped symbols determined in the symbol drawing process at S20 are stopped in predetermined positions (for example, in a display window 1150 of a lower image display panel 1141). In other words, with respect to each of the reels, four symbols including each of the to-be stopped symbols are displayed in the display window 1150. For example, when a to-be-stopped symbol is a symbol associated with a code number "10" and it is to be displayed in an upper region, symbols associated with respective code numbers "11", "12", and "13" are to be displayed in an upper central region, a lower central region, and a lower region in the display window 1150, respectively.

Next, the main CPU 1071 conducts a to-be-paid-out number determination process which is described later (S23). In this process, based on a combination of symbols displayed on a winning line L, a to-be-paid-out number is determined and stored in a to-be-paid-out number counter provided in the RAM 1073.

Next, the main CPU 1071 conducts a paying-out process (S24). The main CPU 1071 adds the value stored in the to-be-paid-out number counter to a value stored in a number-of-credits counter provided in the RAM 1073. Here, for example, when a player presses a CASHOUT button, a CASHOUT switch 1033S which has detected the pressing thereof outputs a signal to the main CPU 1071, and a number of credits stored in an IC card 1500 held in a card unit 1741 is updated to a value in the number-of-credits counter.

In addition, driving of a hopper 1113 may be controlled based on input from the CASHOUT switch 1033S, and coins corresponding to the value stored in the to-be-paid-out number counter may be discharged to a coin tray 1018.

Next, the main CPU 1071 conducts a game termination notification process (S25). In this process, data indicating that one unit game has been terminated (together with an identification code or the like of an IC card 1500 in a case where an IC card 1500 or the like has been inserted and a player can be thereby identified) is transmitted to the PTS terminal 1700. The PTS terminal 1700 transmits this data to a hall management server 10, and in response thereto, a bonus server 11 conducts a drawing for a bonus game. After finishing the processing at S25, the main CPU 1071 returns to the processing at S18 and the unit game is repeated.

<Coin-Insertion/Start-Check Process>

Figure 11:
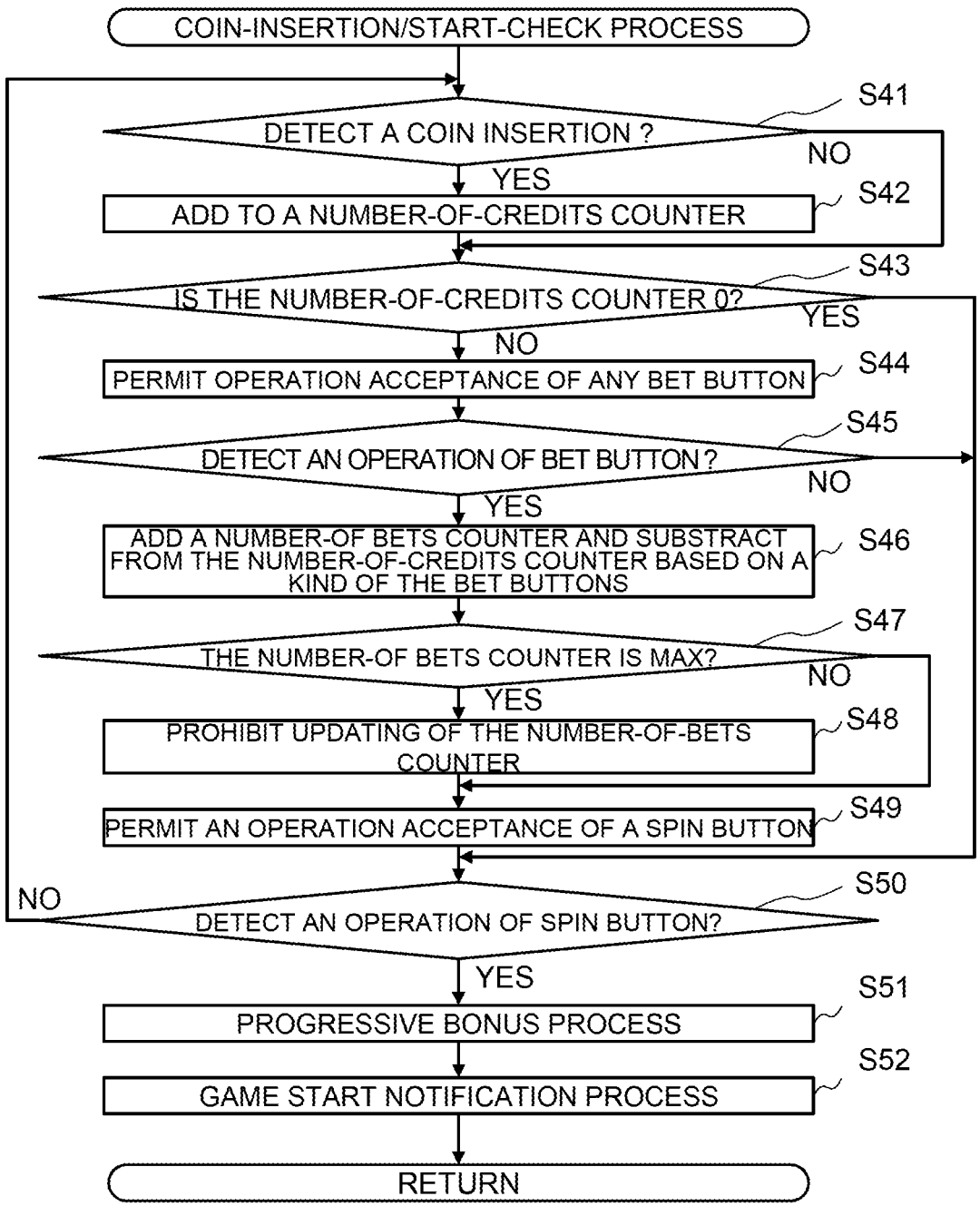
FIG. 11 is a flowchart showing a procedure of a coin-insertion/start-check process executed on the slot machine according to the one embodiment of the present invention.

Next, with reference to FIG. 11, a coin insertion/start-check process will be described. First, a main CPU 1071 determines whether or not insertion of a coin has been detected by a coin counter 1092C (S41). When determining that the insertion of a coin has been detected, the main CPU 71 makes an addition to a number-of-credits counter (S42). Furthermore, in addition to the insertion of a coin, the main CPU 71 determines whether or not insertion of a bill has been detected by a bill validator 1022, and when determining that the insertion of a bill has been detected, the main CPU 71 adds a value corresponding to the bill to the number-of-credits counter.

After the processing at S42 or when determining at S41 that the insertion of the coin or the like has not been detected, the main CPU 1071 determines whether or not a value stored in the number-of-credits counter is zero (S43). When the main CPU 71 determines that the value stored in the number-of-credits counter is not zero, the main CPU 71 permits operation acceptance of a BET button (S44).

Next, the main CPU 1071 determines whether or not operation of any of the BET buttons has been detected (S45). When the pressing of any BET button by a player has been detected by a BET switch, the main CPU 1071 performs addition to a number-of-BETs counter provided in the RAM 1073 and subtraction from the number-of-credits counter based on the kind of the BET button (S46).

Next, the main CPU 1071 determines whether or not a value stored in the number-of-BETs counter is at its maximum (S47). When the main CPU 1071 determines that the value stored in the number-of-BETs counter is at its maximum, the main CPU 1071 prohibits updating of the value stored in the number-of-BETs counter (S48). After S48 or when determining at S47 that the value stored in the number-of-BETs counter is not at its maximum, the main CPU 71 permits operation acceptance of a spin button (S49).

After S49 or when determining at S45 that the operation of any of the BET buttons has not been detected, or when determining at S43 that the value stored in the number-of-credits counter is zero, the main CPU 1071 determines whether or not operation of the spin button has been detected (S50). When the main CPU 1071 determines that the operation of the spin button has not been detected, the main CPU 1071 shifts the processing to S41.

When the main CPU 1071 determines that the operation of the spin button has been detected, the main CPU 1071 conducts a progressive bonus process. In this process, one part of the bet credit is paid out via a PTS terminal 1700 to a bonus server 11, for example, as a credit accumulated for a progressive bonus (S51).

Next, the main CPU 1071 conducts a game start notification process (S52). In this process, data indicating that one unit game is started (together with an identification code or the like of an IC card 1500 in a case where an IC card 1500 or the like has been inserted and a player can be thereby identified) is transmitted to the PTS terminal 1700. The PTS terminal 1700 transmits this data to a hall management server 10, and in response thereto, a bonus server 11 conducts a drawing for a bonus game. After the processing at S52 has been conducted, the coin insertion/start-check process is completed.

<Symbol Drawing Process>

Figure 12:
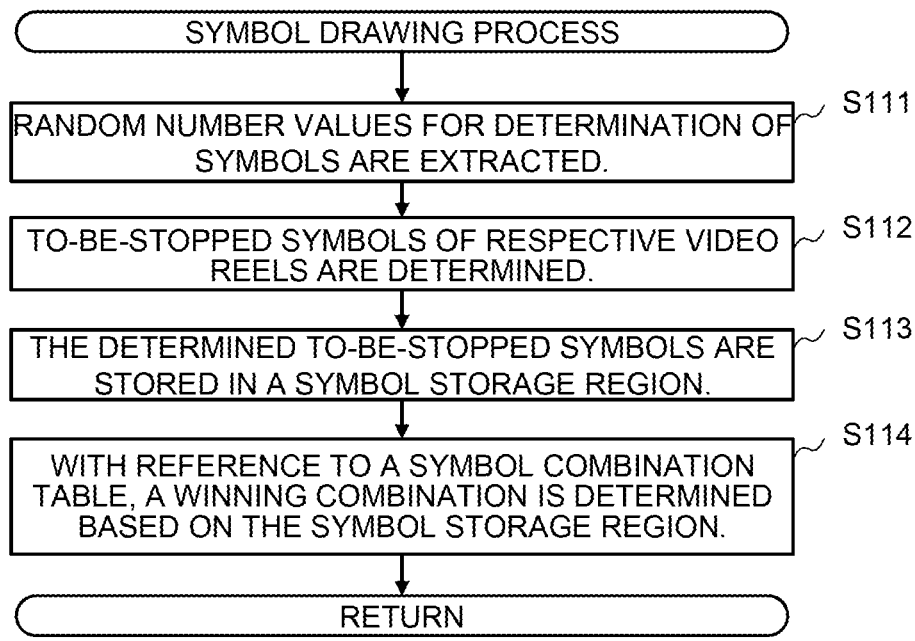
FIG. 12 is a flowchart showing a procedure of a symbol drawing process executed on the slot machine according to the one embodiment of the present invention.

Next, with reference to FIG. 12, a symbol drawing process will be described. First, the main CPU 1071 extracts random number values for symbol determination (S111). Next, the main CPU 1071 determines to-be stopped symbols for five pseudo reels 1151 to 1155 (a first video reel to a fifth video reel) by drawings (S112). The main CPU 1071 conducts a drawing for each of the video reels and determines any of 22 symbols (with code numbers "00" to "21") as to-be stopped symbols. At this time, each of the 22 symbols is determined at an equal probability (i.e. ½₂).

Next, the main CPU 1071 stores the determined to-be stopped symbols for the respective video reels in a symbol storage region provided in the RAM 1073 (S113). Next, the main CPU 1071 references a symbol combination table (FIG. 9) and determines a winning combination based on the symbol storage region (S114). The main CPU 71 determines whether or not the combination of symbols to be displayed along a winning line by the respective video reels matches any of combinations of symbols specified by the symbol combination table and determines the winning combination. After the process has been conducted, the symbol drawing process is completed.

<Symbol Display Control Process>

Figure 13:
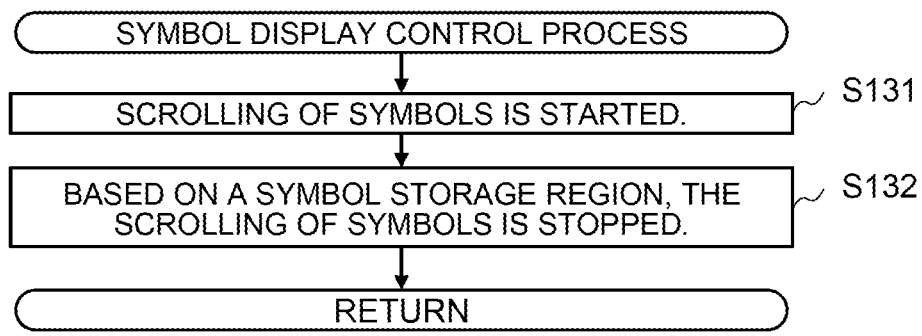
FIG. 13 is a flowchart showing a procedure of a symbol display control process executed on the slot machine according to the one embodiment of the present invention.

Next, with reference to FIG. 13, a symbol display control process will be described. First, a main CPU 1071 starts the scrolling of symbol arrays of respective video reels displayed in a display window 1150 of a lower image display panel 1141 (S131). Next, the main CPU 1071 stops the scrolling of the symbol arrays of the respective video reels based on the above-mentioned symbol storage region (S132). After the process has been conducted, the symbol display control process is completed.

It is to be noted that in accordance with timing of starting and stopping of the scrolling of the symbol arrays in the symbol display control process or other timing, the presentation determined in the presentation contents determination process (FIG. 10) is executed. For example, a moving image and a still image are displayed on an upper image display panel 1131 of the slot machine 1010, in synchronization therewith, sound is outputted from speakers 1112, and a lamp 1111 is lit up, thereby allowing said presentation to be executed.

<To-be-Paid-Out Number Determination Process>

Next, with reference to FIG. 14, a to-be-paid-out number determination process will be described. First, a main CPU 1071 determines a to-be-paid-out number corresponding to a winning combination (S151). For example, when the winning combination is a combination of symbols "BELL", the main CPU 1071 determines "8" as the to-be-paid-out number (refer to FIG. 9). It is to be noted that the main CPU 1071 determines "0" as the to-be-paid-out number in a case where a game is lost. Next, the main CPU 1071 stores the determined to-be-paid-out number in a to-be-paid-out number counter (S152). After the process has been conducted, the to-be-paid-out number determination process is completed.

It is to be noted that winning has occurred in a bonus game drawing by a bonus server 11, linkage presentation by PTS terminals 1700 is conducted over a plurality of slot machines

1010 including the slot machine 1010 on which the winning has occurred; in conjunction therewith, a bonus is paid out by a bonus server 11; and the bonus is added to, for example, the to-be-paid-out number counter.

[Description of Linkage Presentation]

Next, FIG. 15 to FIG. 22, linkage presentation according to one embodiment of the present invention will be described.

Figure 15:
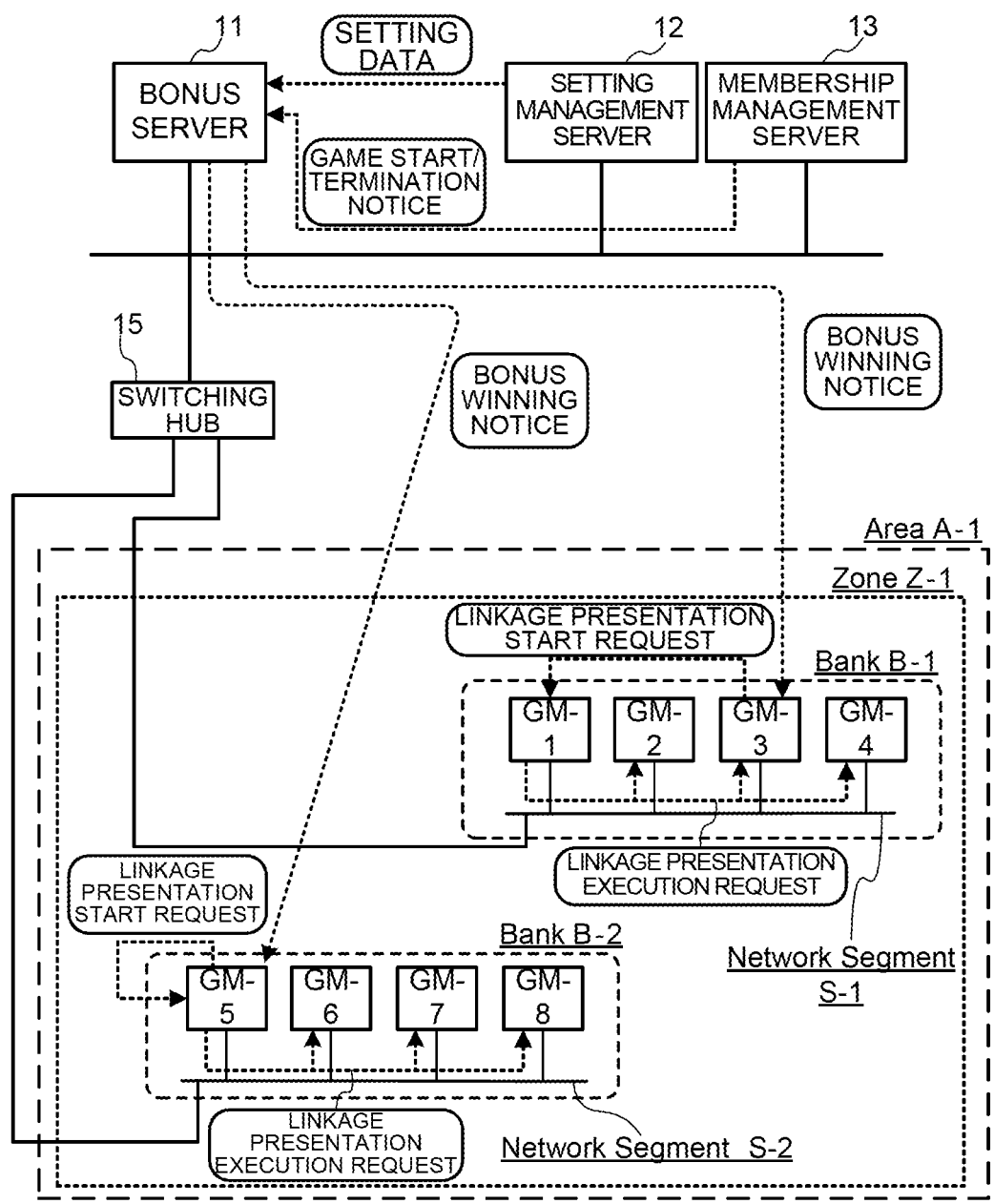
FIG. 15 is a diagram for describing a network configuration of the game system according to the one embodiment of the present invention and an outline of linkage presentation.

FIG. 15 is a diagram for describing a network configuration of a game system 1 and an outline of linkage presentation. In an example shown in FIG. 15, eight gaming machines (GM-1 to GM-8) installed in a zone Z-1 of an area A-1 are network-connected through a LAN constituted of Ethernet and are divided into two banks (B-1 and B-2) which are logical sets. In addition, in this example, in accordance with the division into the banks, the respective gaming machines are divided into two groups, and each of the groups is connected to one network segment, respectively.

Connected to a network segment S-1 corresponding to the bank B-1 are the gaming machines GM-1 to GM-4. Here, the gaming machines GM-1 to GM-4 correspond to, for example, the gaming machines T-11a to T-11d shown in FIG. 1. On the other hand, connected to a network segment S-2 corresponding to the bank B-2 are the gaming machines GM-5 to GM-8. Here, the gaming machines GM-5 to GM-8 correspond to, for example, the gaming machines T-11e to T-11h shown in FIG. 1.

It is to be noted that here, as identifiers for identifying the gaming machines installed in the zone Z-1 of the area A-1, GM-1 to GM-8 are used.

The network segment S-1 and the network segment S-2 are respectively connected to a switching hub 15, and via said switching hub 15, the respective gaming machines are connected to a hall management server 10 and a bonus server 11. It is to be noted that other necessary network connection devices such as a router and a hub are not shown.

When one unit game is started or terminated, each of the gaming machines transmits information pertinent to the start or the termination to the hall management server 10 via a PTS terminal 1700 and further, the information is provided for the bonus server 11 (game start/termination notification).

When the bonus server 11 has received the game start/termination notification, the bonus server 11 conducts a bonus drawing. When winning has occurred, the bonus server 11 transmits bonus winning notification to a PTS terminal 1700 of one gaming machine in a bank of gaming machines, on which the winning has occurred (in the example shown in FIG. 15, the gaming machine GM-3 in the bank B-1 and the gaming machine GM-5 in the bank B-2). Upon receiving the bonus winning notification, the PTS terminal 1700 of said one gaming machine in the bank transmits a linkage presentation start request to a PTS terminal 1700 of a gaming machine which operates as a presentation control server.

Upon receiving the linkage presentation start request, the PTS terminal 1700 which operates as the presentation control server (in the example shown in FIG. 15, a PTS terminal 1700 of the gaming machine GM-1 in the bank B-1 and a PTS terminal 1700 of the gaming machine GM-5 in the bank B-2) transmits a linkage presentation execution request to a PTS terminal 1700 of each of gaming machines which operate as presentation execution clients. This linkage presentation execution request is transmitted, for example, as a broadcast packet from the PTS terminal 1700 which operates as the presentation control server.

In the example shown in FIG. 15, the gaming machines which operate as the presentation execution clients in the bank B-1 are all of the gaming machines which belong to the bank B-1. Accordingly, the gaming machine GM-1 operates as the presentation control server as well as operates as the presentation execution client. In addition, the gaming machines which operate as the presentation execution clients in the bank B-2 are all of the gaming machines which belong to the bank B-2. Accordingly, the gaming machine GM-5 operates as the presentation control server as well as operates as the presentation execution client.

Upon receiving the linkage presentation execution request, the PTS terminal 1700 of each of the gaming machines which operate as the presentation execution clients causes full-color LEDs to emit light based on a specified presentation pattern, thereby causing light emitting plates 1720a and 1720b to emit light and outputting sound. The above-mentioned presentation is conducted in the gaming machines within the bank in a manner linked with one another, and at the end, the presentation is finished so as to allow the gaming machine which has won the bonus to be identified.

As patterns of the linkage presentation, that is, patterns of light emitting of the light emitting plates 1720a and 1720b, patterns of outputting of the sound, patterns of the relationship of presentation execution timing with other gaming machines, and the like, a variety of patterns are considered. For example, there are presentation in which light of a specific color is emitted sequentially by the light emitting plates of the neighboring gaming machines and said specific light is viewed so as to be moving within the bank; and presentation in which the light emitting plates 1720a and 1720b are caused to randomly emit light on the gaming machines within the bank and at the end, specific light is emitted on the gaming machine which has won (this presentation is linkage presentation in that the light is randomly emitted within the predetermined bank).

In addition, the PTS terminal 1700 of each of the gaming machines which operate as the presentation execution clients can be configured to execute the linkage presentation on all of the gaming machines within the bank, regardless of whether or not a membership card is held in a card unit 1741 of said PTS terminal 1700; to execute the linkage presentation only on gaming machines, on each of which the membership card is held in the card unit 1741 of said PTS terminal 1700, or only on gaming machines, on each of which the membership card is held therein and seating of a player is confirmed by a human body detection camera 1713; and further, to execute the linkage presentation only on gaming machines, on each of which the seating of a player is confirmed by the human body detection camera 1713, regardless of whether or not the membership card is held therein.

It is to be noted that although in the example shown in FIG. 15, the four gaming machines are configured to belong to one bank, this configuration is merely exemplification and for example, 10 or 50 gaming machines can also be managed so as to belong to one bank.

In addition, as in the example shown in FIG. 15, it is preferable that division of the network segments is made with a unit of each bank, which is a unit with which the linkage presentation is conducted. As described above, from the PTS terminal 1700 of each of the gaming machine which operate as the presentation execution clients, a message of the linkage presentation execution request is transmitted as the broadcast packet. Therefore, if any gaming machines in other bank, which have no relationship with the message, are present in the same network segment, the gaming machines in said other bank are influenced, thereby increasing the risks of delaying data transmission and reception and causing a packet loss due to congestion.

Accordingly, by making the division of the network segments for the respective banks as described above, a bandwidth of the network is assured and the risk of the congestion is reduced, thereby allowing the influence caused by the occurrence of the congestion, if any, to be localized. In addition, by setting the server and the clients in the above-described network configuration, a processing load for each of the gaming machines can be reduced, thereby enabling delay and variation in timing of the linkage presentation to be suppressed.

Further, the network segments as described above can be configured by using other network apparatus such as an L3 switch and can also be realized by network setting with VLAN or the like. In addition, although in the example shown in FIG. 15, the gaming machines which are different from one another are installed in each of the banks, setting can be made such that one part of the gaming machines are installed in a plurality of banks so as to (logically) overlap.

In addition, although in this example, groups of the gaming machines are managed in the hierarchical structure having three levels of areas, zones, and banks, the gaming machines may be grouped only by one concept such as banks or may be managed in a hierarchical structure having four or more levels.

Figure 17:
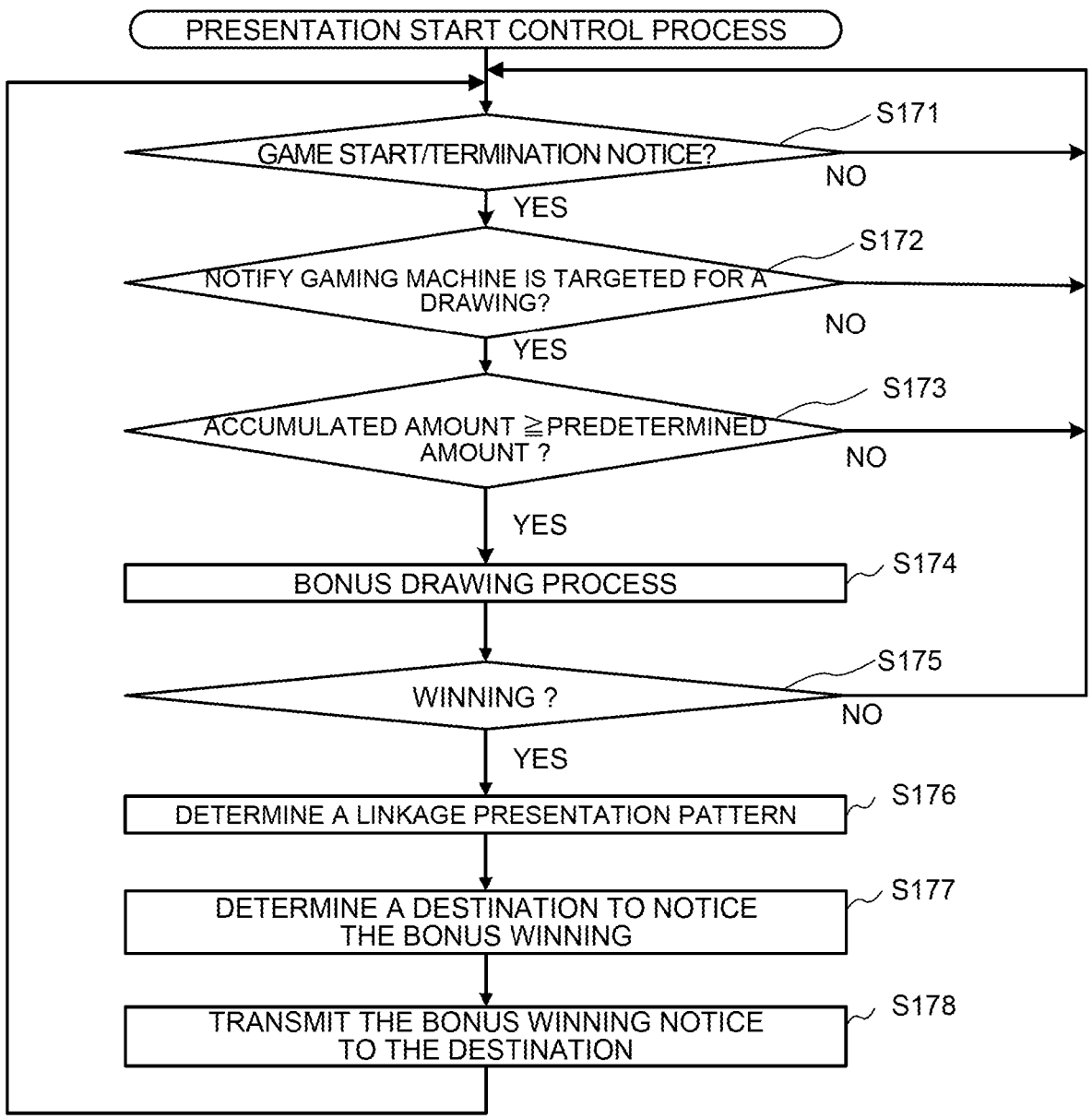
FIG. 17 is a flowchart showing a procedure of a presentation start control process executed on a bonus server according to the one embodiment of the present invention.

Next, with reference to FIG. 16 to FIG. 22, a flow of a linkage presentation process will be described. FIG. 16 shows respective kinds of setting tables stored in a setting management server 12. FIG. 17 is a flowchart showing a procedure of a presentation start control process executed on the bonus server 11.

Here, with reference to FIG. 17, the presentation start control process executed on the bonus server 11 will be described. First, the bonus server 11 determines whether or not there has been game start/termination notification indicating that one unit game executed on a gaming machine (slot machine 1010) is started or terminated (S171). Upon starting or terminating one unit game on the gaming machine, the game start/termination notification is transmitted via a PTS terminal 1700 to the hall management server 10, and by monitoring the game start/termination notification stored in the hall management server 10, the bonus server 11 conducts said determination process.

When there has been no new game start/termination notification (NO at S171), the bonus server 11 returns to S171 again and repeats this determination process. When there has been the game start/termination notification (YES at S171), the bonus server 11 determines whether or not a gaming machine which is a notification source of the game start/termination notification is targeted for a drawing for a bonus game (S172). In this determination process, first, with reference to a gaming machine setting table shown in FIG. 16B, pieces of information pertinent to an area, a zone, and a bank in which the gaming machine of the notification source is installed are obtained, and based on whether or not there is a combination of the area, the zone, and the bank in a bonus target setting table shown in FIG. 16A, the determination is made.

For example, in the configuration shown in FIG. 15, in a case where there has been the game start/termination notification from the gaming machine GM-2, it is confirmed from the gaming machine setting table shown in FIG. 16B that the area, the zone, and the bank in which the gaming machine GM-2 is installed is A-1, Z-1, and B-1, respectively. Here, by referencing the bonus target setting table shown in FIG. 16A, it is confirmed that the combination of A-1, Z-1, and B-1 is shown therein. Therefore, the gaming machine GM-2 is determined to be targeted for the drawing for the bonus game.

In addition, by accessing a membership management server 13 and determining whether or not an IC card 1500 held in a card unit of the gaming machine GM-2 is a membership card, and when the IC card 1500 is the membership card, the gaming machine GM-2 can also be determined to be targeted for the drawing for the bonus game. As described above, although only the members can be determined to be targeted for the drawing for the bonus game, further, on condition that other requirement is satisfied, a gaming machine can also be determined to be targeted for the drawing for the bonus game.

It is to be noted that although in this example, for the sake of convenience in the description, identifiers such as GM-2 shown in FIG. 15 are used in the tables shown in FIG. 16 to identify the gaming machines, other identifiers such as IP addresses and MAC addresses may be used.

When the gaming machine of the notification source is not targeted for the drawing (NO at S172), the bonus server 11 returns to S171 again and repeats the determination process on the game start/termination notification. When the gaming machine of the notification source is targeted for the drawing (YES at S172), the bonus server 11 determines whether or not credits accumulated as a progressive bonus come to be equal to or more than a predetermined amount (S173). This process is to adjust timing such that at timing when credits collected from each of the gaming machines have been accumulated to some degree, the bonus drawing is conducted.

When an amount of the accumulated credits is not equal to or more than the predetermined amount (NO at S173), the bonus server 11 returns to S171 again and repeats the determination process on the game start/termination notification. When the amount of the accumulated credits is equal to or more than the predetermined amount (YES at S173), the bonus server 11 conducts a bonus drawing process (S174). In this process, a random number for the bonus drawing is extracted, and based on the random number, presence or absence of winning in the bonus game is determined.

Next, whether or not an outcome of the bonus drawing is winning is determined (S175). When the outcome of the bonus drawing is not the winning (NO at S175), the bonus server 11 returns to S171 again and repeats the determination process on the game start/termination notification. In other words, only when the outcome of the bonus drawing is the winning, the linkage presentation is conducted. However, it can be configured that even when the outcome of the bonus drawing is not the winning, in a case where a predetermined condition is satisfied, the linkage presentation is conducted. In this case, in a bank targeted for the linkage presentation, as a result of the conducting of the linkage presentation, without the winning in the bonus game on all of the gaming machines in that bank, the bonus game is terminated.

When the outcome of the bonus drawing is the winning (YES at S175), a linkage presentation pattern is determined (S176). Here, for example, a random number for the linkage presentation is extracted, and based on the random number for the linkage presentation, the linkage presentation pattern is determined. The linkage presentation pattern can also be determined based on other condition.

The linkage presentation pattern is selected, for example, from among those with pattern NOs in a pattern setting table shown in FIG. 16C. The respective linkage presentation patterns define patterns of the presentation, in each of which light emitting of the light emitting plates, outputting of sound, and the like are performed with relevancy among the plurality of gaming machines within a bank.

Next, with reference to the bonus target setting table shown in FIG. 16A, the bonus server 11 determines a notification destination of the bonus winning notification (S177). In the above-mentioned example of the gaming machine GM-2 (in the area A-1, the zone Z-1, and the bank B-1) shown in FIG. 15, the notification destination is a gaming machine GM-3. It is to be noted that although here, the notification destinations are set in the bonus target setting table, the notification destination can also be fixed to a predetermined gaming machine within a bank.

Next, bonus server 11 transmits the bonus winning notification to the determined notification destination (S178). Here, the bonus winning notification is transmitted to a PTS terminal 1700 of the targeted gaming machine (slot machine 1010) by, for example, a protocol such as TCP/IP. After the processing at S178, the bonus server 11 returns to S171 and repeats the presentation start control process.

It is to be noted that although in this example, the presence of the game start notification or the game termination notification is a trigger for the drawing for the bonus game, either one of the game start notification or the game termination notification may be the trigger or other event may be the trigger.

Figure 18:
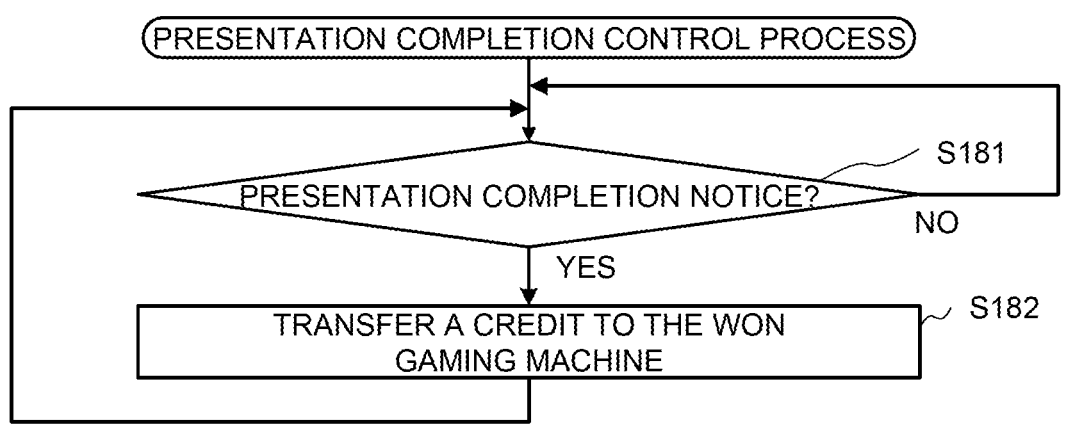
FIG. 18 is a flowchart showing a procedure of a presentation completion control process executed on the bonus server according to the one embodiment of the present invention.

Next, with reference to FIG. 18, a presentation completion control process executed on the bonus server 11 will be described. First, the bonus server 11 determines whether or not there has been presentation completion notification transmitted from the PTS terminal 1700 (presentation control server) of the gaming machine (S181). The presentation completion notification is a message transmitted from the PTS terminals 1700 when the linkage presentation has been completed on the PTS terminals 1700 of the gaming machines and indicates that the linkage presentation has been completed on the PTS terminals 1700.

When there has been no presentation completion notification (NO at S181), the bonus server 11 returns to S181 again and repeats this determination process. When there has been the presentation completion notification (YES at S181), the bonus server 11 transfers a credit to a gaming machine which has won in the bonus game at this time (S182). Thus, the gaming machine to which the credit has been transferred updates its number-of-credits counter provided in a RAM 1073. After the processing at S182, the bonus server 11 returns to S181 and repeats the presentation completion control process.

Figure 19:
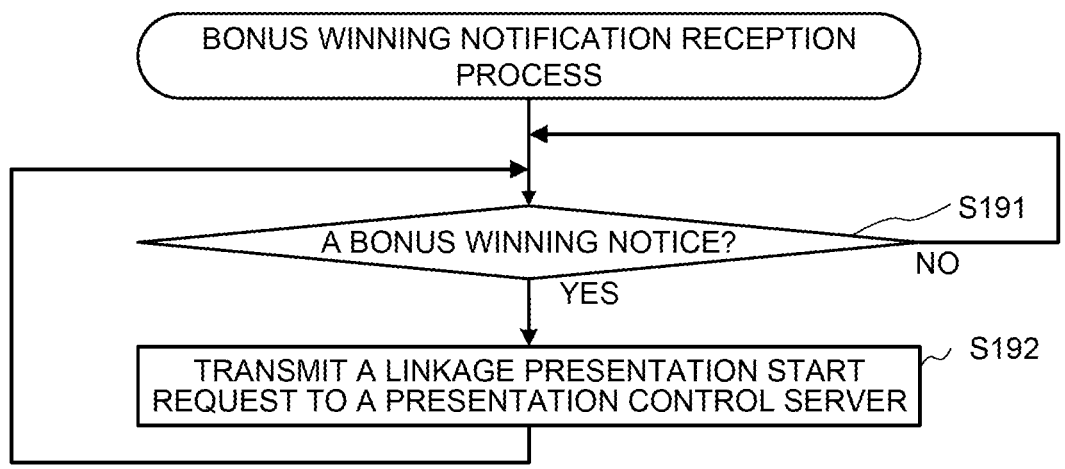
FIG. 19 is a flowchart showing a procedure of a bonus winning notification reception process executed on a PTS terminal of a gaming machine which has become a notification destination of bonus winning notification, according to the one embodiment of the present invention.

Next, with reference to FIG. 19, a bonus winning notification reception process executed on a PTS terminal 1700 of a gaming machine which has become the notification destination of the bonus winning notification will be described. First, the PTS terminal 1700 determines whether or not there has been the bonus winning notification transmitted from the bonus server 11 (S191). The bonus winning notification is a message transmitted to the PTS terminal 1700 of the gaming machine which is set as a notification destination in a bank to which the gaming machine having won belongs when a bonus game drawing conducted on the bonus server 11 has resulted in winning (refer to FIG. 16A).

When there has been no bonus winning notification (NO at S191), the PTS terminal 1700 returns to S191 again and repeats this determination process. When there has been the bonus winning notification (YES at S191), the PTS terminal 1700 transmits, to a PTS terminal 1700 which operates as a presentation control server, a linkage presentation start request which instructs the start of the linkage presentation (S192). As the PTS terminal 1700 which operates as the presentation control server, one gaming machine is present within the same bank, for example, such as a terminal having a specific identifier, a terminal located in a specific arrangement position, and a terminal which is separately set. Of course, there also is a case where the PTS terminal 1700 which has received the bonus winning notification is the PTS terminal 1700 which operates as the presentation control server.

Here, the linkage presentation start request is transmitted to a PTS terminal 1700 of one targeted gaming machine by the protocol such as TCP/IP. An address of the gaming machine of a transmission destination can be stored in, for example, an external storage device 1754 of the PTS terminal 1700 to which the linkage presentation start request is transmitted, a server which is accessible via a network, or the like. In addition, the address thereof can be configured to be included in the bonus winning notification. After the processing at S192, the PTS terminal 1700 returns to S191 and repeats the bonus winning notification reception process.

Figure 20:
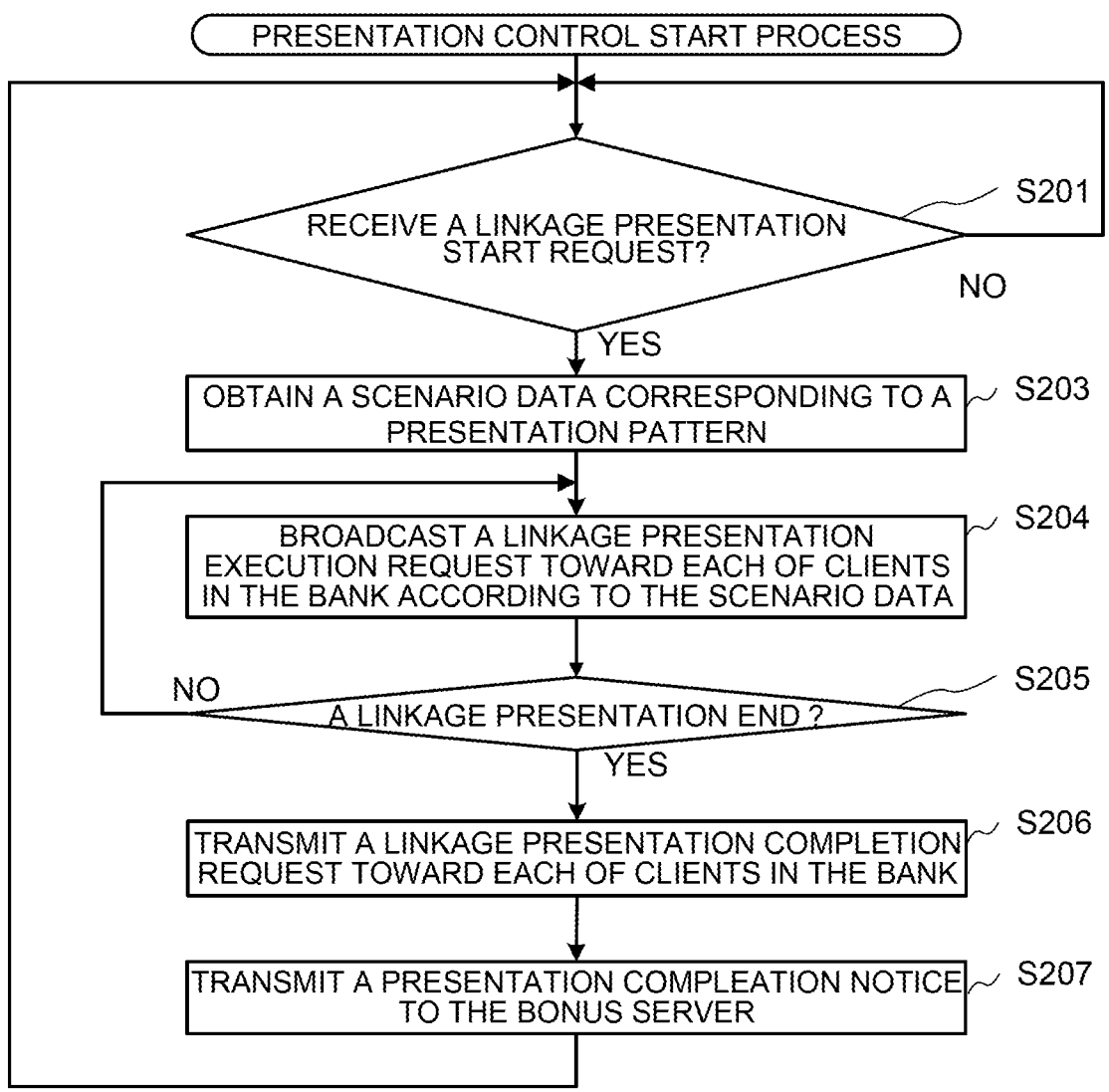
FIG. 20 is a flowchart showing a procedure of a presentation control start process executed on a PTS terminal which operates as a presentation control server, according to the one embodiment of the present invention.

Next, with reference to FIG. 20, a presentation control start process executed on the PTS terminal 1700 which operates as the presentation control server will be described. First, the PTS terminal 1700 determines whether or not there has been the linkage presentation start request transmitted from the PTS terminal 1700 of the gaming machine which has become the notification destination of the bonus winning notification (S201). The linkage presentation start request is transmitted from the PTS terminal 1700, which operates as the presentation control server, to PTS terminals 1700 in the same bank which operate as presentation execution clients. The PTS terminals 1700 which operate as the presentation execution clients are basically the PTS terminals 1700 of all of the gaming machines in said bank.

When there has been no linkage presentation start request (NO at S201), the PTS terminal 1700 which operates as the presentation control server returns to S201 again and repeats this determination process. When there has been the linkage presentation start request (YES at S201), the PTS terminal 1700 obtains scenario data corresponding to a presentation pattern (S203). The scenario data includes LED pattern file names related to light emitting of the LEDs and sound file names in time series for respective presentation patterns. In addition, the scenario data may be stored in the gaming machine of the PTS terminal 1700 which operates as the presentation control server or may be stored in a predetermined server.

Next, based on the scenario data, the PTS terminal 1700 broadcast-transmits the linkage presentation execution request to the PTS terminals 1700 of the gaming machines in the bank which function as the presentation execution clients (S204). This linkage presentation execution request is transmitted by, for example, a protocol such as UDP/IP, and the broadcast message transmitted by said protocol is received by the plurality of PTS terminals 1700 (which function as the presentation execution clients) which are present in the same network segment.

Although the above-mentioned protocol does not check transmission and reception and does not perform a retransmission process, accordingly, the protocol enables high-speed broadcast transmission and realizes synchronism of the linkage presentation at a high level, thereby suppressing delay and variation of the presentation among the gaming machines. In addition, since the gaming machines in the other bank are not present in the same network segment, exerting an overload on a bandwidth is avoided and the occurrence of congestion can be thereby suppressed, and if the congestion occurs, the influence of said congestion can be localized.

Next, the PTS terminal 1700 determines whether or not the linkage presentation has been completed (S205). When the linkage presentation has not been completed (No at S205), the PTS terminal 1700 proceeds to S204 and broadcasts the next linkage presentation execution request in accordance with the scenario data. When the linkage presentation has been completed (YES at S205), the PTS terminal 1700 transmits a linkage presentation completion request to the PTS terminals 1700 of the gaming machines in the bank which function as the presentation execution clients (S206). This linkage presentation completion request is transmitted by, for example, a protocol such as TCP/IP.

Next, the PTS terminal 1700 transmits presentation completion notification to the bonus server 11 (S207). Upon receiving this presentation completion notification, the bonus server 11 conducts the presentation completion control process (refer to FIG. 18). It is to be noted that this presentation completion notification is transmitted by, for example, the protocol such as TCP/IP.

Whether or not a PTS terminal 1700 itself is the PTS terminal 1700 which operates as the presentation control server can be determined by, for example, a flag which is stored in the external storage device 1754 of that PTS terminal 1700, a server which is accessible via a network, or the like. When the PTS terminal 1700 determines that the PTS terminal 1700 itself is the PTS terminal 1700 which operates as the presentation control server, the PTS terminal 1700 performs control so as to selectively execute a process for the presentation control server. In addition, a program for the presentation control server may be activated when the power is supplied.

Figure 21:
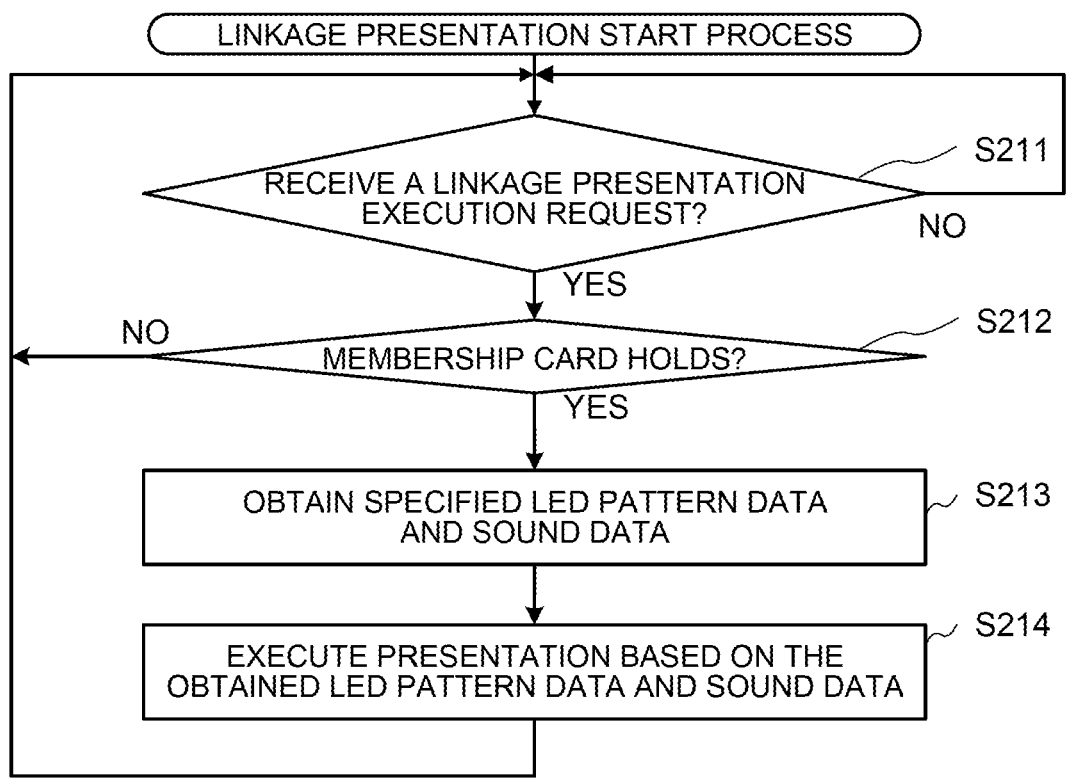
FIG. 21 is a flowchart showing a procedure of a linkage presentation start process executed on PTS terminals which function as presentation execution clients, according to the one embodiment of the present invention.

Next, with reference to FIG. 21, a linkage presentation start process executed on each of the PTS terminals 1700 which function as the presentation execution clients will be described. As described above, the linkage presentation start process is continuously executed through the transmission of the linkage presentation execution request based on the scenario data from the PTS terminal 1700 which functions as the presentation control server.

First, each of the PTS terminals 1700 determines whether or not each of the PTS terminals 1700 has received the linkage presentation execution request transmitted from the PTS terminal 1700 which functions as the presentation control server (S211). Data related to a process executed in accordance with the scenario data of the linkage presentation is specified by the linkage presentation execution request.

When each of the PTS terminals 1700 has not received the linkage presentation execution request (NO at S211), each of the PTS terminals 1700 returns to S211 again and repeats the determination process. When each of the PTS terminals 1700 has received the linkage presentation execution request (YES at S211), each of the PTS terminals 1700 determines whether or not the membership card is held in the card unit 1741 of each thereof (that is, a player who is a member is using this gaming machine) (S212). Whether or not the held IC card is a card of a member can be determined, for example, by referencing a table in the membership management server 13 based on an identification code read from the IC card and determining whether or not the read identification code is registered as an identification code of a member therein.

When the membership card is not held therein (NO at S212), each of the PTS terminals 1700 returns to S211 again and repeats the determination process on the reception of the linkage presentation execution request. In this example, on the gaming machine with no membership card being inserted into the card unit 1741, the linkage presentation is not executed. However, as described above, a range of gaming machines, on each of which the linkage presentation is executed, can be determined on various conditions. In addition, it is only required to confirm whether or not the held IC card is a card of a member at first one time, as long as holding the read card of the IC card is sustained.

When the membership card is held (YES at S212), each of the PTS terminals 1700 obtains specified LED pattern data and sound data from its RAM 1753 or external storage device 1754 (S213).

Next, each of the PTS terminals 1700 executes the presentation based on the obtained LED pattern data and sound data (S214). For example, each of the PTS terminals 1700 controls light emitting of the full-color LEDs 1721a and full-color LEDs 1721b based on the LED pattern data and causes the light emitting plates 1720a and 1720b to emit light and processes the sound data with a DSP 1765 and outputs sound from the speakers 1707 and 1709. The above-mentioned presentation with light and sound is conducted in a linked manner on the PTS terminals 1700 of the other gaming machines, resulting in the realization of the linkage presentation. After the processing at S214, each of the PTS terminals 1700 returns to S211 and repeats the linkage presentation start process.

Whether or not a PTS terminal 1700 itself is the PTS terminal 1700 which operates as the presentation execution client can be determined by, for example, a flag which is stored in the external storage device 1754 of that PTS terminal 1700, a server which is accessible via a network, or the like. When each of the PTS terminals 1700 determines that the PTS terminal 1700 itself is the PTS terminal 1700 which operates as the presentation execution client, the PTS terminal 1700 performs control so as to selectively execute a process for the presentation execution client. In addition, a program for the presentation execution client may be activated when the power is supplied.

Figure 22:
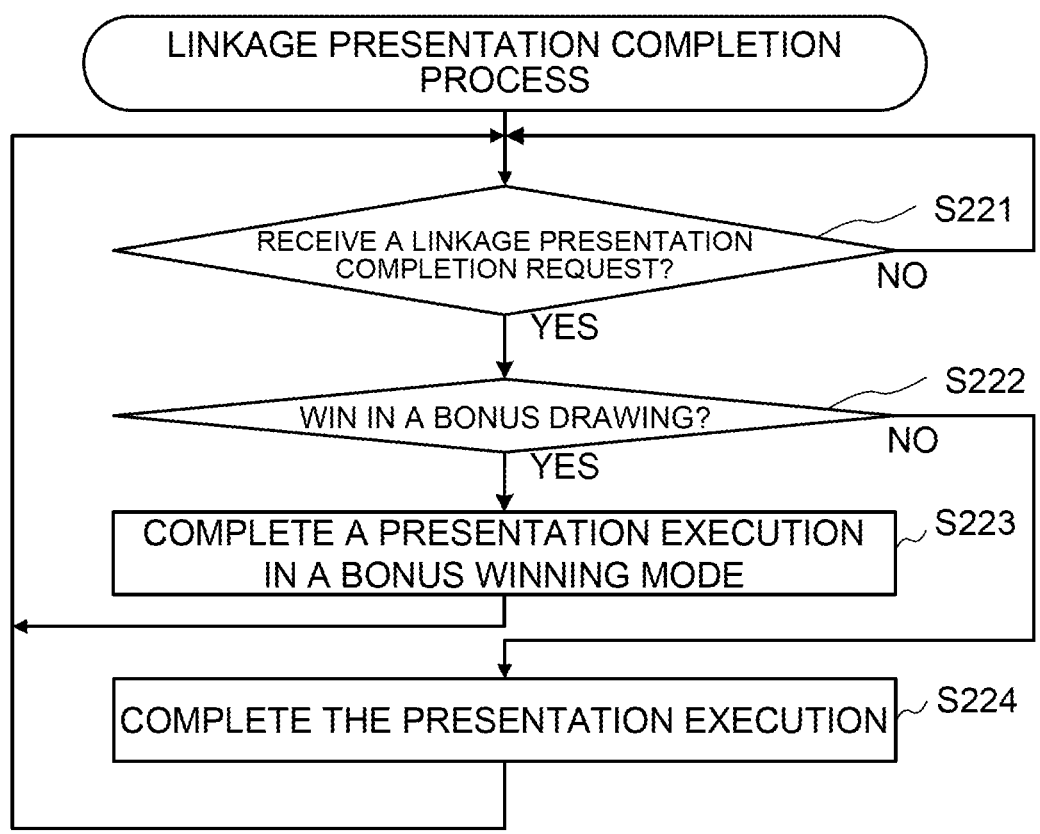
FIG. 22 is a flowchart showing a procedure of a linkage presentation completion process executed on the PTS terminals which function as the presentation execution clients, according to the one embodiment of the present invention.

Next, with reference to FIG. 22, a linkage presentation completion process executed on each of the PTS terminals 1700 which functions as the presentation execution client will be described.

First, each of the PTS terminals 1700 determines whether or not each of the PTS terminals 1700 has received the linkage presentation completion request transmitted from the PTS terminal 1700 which functions as the presentation control server (S221). The linkage presentation completion request is to instruct the completion of the linkage presentation.

When each of the PTS terminals 1700 has not received the linkage presentation completion request (NO at S221), each of the PTS terminals 1700 returns to S221 again and repeats this determination process. When each of the PTS terminals 1700 has received the linkage presentation completion request (YES at S221), each of the PTS terminals 1700 further determines whether or not this gaming machine has won in the bonus drawing, for example, by referencing contents or the like of the messages of the linkage presentation execution request and the linkage presentation completion request (S222).

When this gaming machine has not won in the bonus drawing (NO at S222), each of the PTS terminals 1700 conducts presentation in a mode in which no winning in the bonus drawing has occurred and completes the presentation process (S224). When this gaming machine has won in the bonus drawing (YES at S222), each of the PTS terminals 1700 conducts presentation in a mode in which the winning in the bonus drawing has occurred and completes the presentation process (S223). The presentation in the mode in which the winning in the bonus drawing has occurred is, for example, presentation in which immediately before completing the presentation, the full-color LEDs 1721*a* and 1721*b* are caused to emit light in a specific color, thereby making light emitting states of the light emit plates remarkably conspicuous, high-speed blinking is repeated, and larger sound than sound outputted from the other gaming machines is outputted.

In addition, the above-described presentation in which the winning in the bonus game is notified may be incorporated into the selected presentation pattern. After the processing at S223 and S224, each of the PTS terminals 1700 returns to S221 and repeats the linkage presentation completion process.

Although the winning may be caused to occur directly through the above-described presentation in which the light emitting and the sound outputting are performed by the PTS terminal 1700, a variety of other presentation can be considered. For example, the configuration can also be arranged such that after the light emitting and the sound outputting, the LCD 1719 of the PTS terminal 1700 is caused to display a challenge game using buttons or a scratch card, a roulette game, a flash game, or the like, thereby uplifting a sense of expectation of a player; thereafter, a player is allowed to execute such a game by operating the touch panel; and when a player has won in the game, a credit of the gaming machine is updated (the winning or losing in this game can be determined in real time in accordance with the operation made by a player at that time or can also be controlled based on an outcome which is previously determined by a drawing in the bonus game by the bonus server 11). In addition, in this case, the game displayed on the LCD 1719 of the PTS terminal 1700 can also be executed by displaying image data or the like stored in the bonus server 11 with a Web browser executed on the PTS terminal 1700.

As described above, since the PTS terminal 1700 executes the variety of processes corresponding to its roles, the programs are installed in accordance with the functions realized by the PTS terminal 1700. The configuration can also be arranged such that programs which are common in the respective PTS terminals 1700 are installed and processes needed in the respective PTS terminals 1700 are individually activated.

In addition, although as described above, irrespective of the game conducted on the gaming machine corresponding to the PTS terminal 1700, the PTS terminal 1700 executes the linkage presentation, it can also be arranged that the game conducted on the gaming machine is once interrupted, and then, the linkage presentation is executed by the PTS terminal 1700. By arranging the above-mentioned configuration, the player's attention is focused on the PTS terminal 1700.

Here, the embodiment in which the game conducted on the gaming machine is once interrupted and the linkage presentation is executed by the PTS terminal 1700 will be described with reference to flowcharts. Processes related to parts which are different from those in the above-described flowcharts shown in FIG. 10 to FIG. 14 and FIG. 17 to FIG. 22 (that is, the main control process (FIG. 10) on the gaming machine; the linkage presentation start process (FIG. 21) executed on the PTS terminals 1700 which function as the presentation execution clients; and the linkage presentation completion process (FIG. 22) executed on the PTS terminals 1700 which function as the presentation execution clients) will be described.

Figure 23:
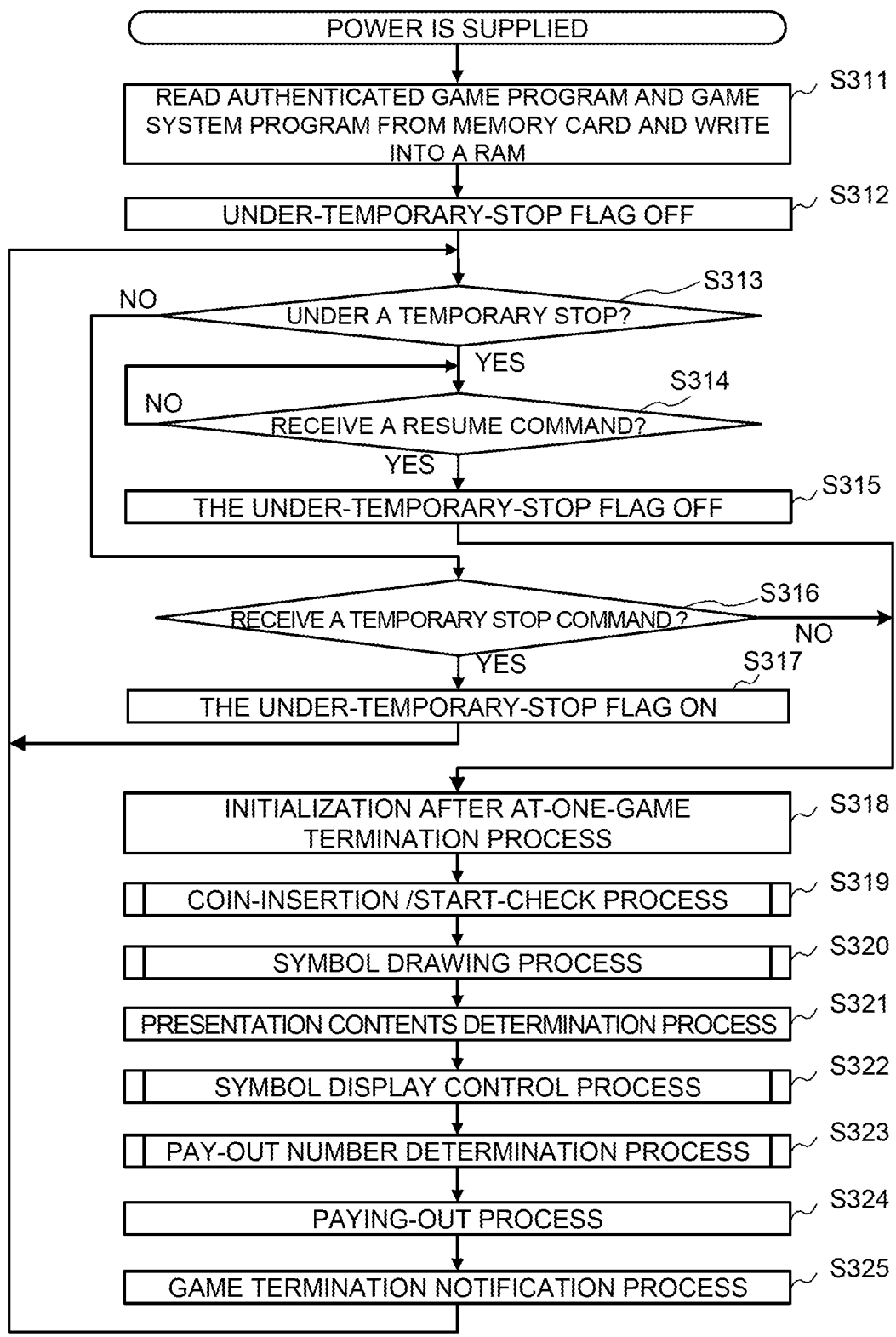
FIG. 23 is a flowchart showing a procedure of a main control process executed on the slot machine, according to another embodiment of the present invention.

First, with reference to FIG. 23, a main control process on the gaming machine will be described. First, when the power is supplied to the slot machine 1010, a main CPU 1071 reads the authenticated game program and game system program from a memory card 1054 via a gaming board 1050 and writes the programs into a RAM 1073 (S311).

Next, in a case where the linkage presentation is conducted, the main CPU 1071 initializes (turns off) an under-temporary-stop flag for determining whether or not the execution of a unit game on the slot machine 1010 is temporarily stopped (S312).

Next, the main CPU 1071 determines contents of the under-temporary-stop flag and thereby determines whether or not a current state is under a temporary stop state (S313). For example, when the under-temporary-stop flag is turned off, the main CPU 1071 determines that the current state is not under the temporary stop state but is under a state in which the normal unit game is continuously executed. When the under-temporary-stop flag is turned on, the main CPU 1071 determines that the current state is under the state in which the unit game is temporarily stopped because the linkage presentation is being conducted on the PTS terminals 1700.

When the under-temporary-stop flag is turned off (NO at S313), that is, when the current state is not under the temporary stop state, the main CPU 1071 proceeds to S316 and determines whether or not a temporary stop command has been received. On the other hand, when the under-temporary-stop flag is turned on (YES at S313), that is, when the current state is under the temporary stop state, the main CPU 1071 determines whether or not a resume command, which instructs the resumption of the unit game on the slot machine 1010, has been received from each of the PTS terminals 1700 (S314).

When determining that the resume command has not been received (NO at S314), the main CPU 1071 executes S314 again and repeats the determination at S314 until the resume command is received. When determining that the resume command has been received (YES at S314), the main CPU 1071 updates the under-temporary-stop flag so as to be turned off (S315) and thereafter, proceeds to processing at S318.

When determining that the under-temporary-stop flag is turned off (NO at S313), the main CPU 1071 determines whether or not the temporary stop command, which temporarily stops the unit game on the slot machine 1010, has been received from each of the PTS terminals 1700 (S316). When determining that the temporary stop command has not been received (NO at S316), the main CPU 1071 proceeds to processing at S318. When determining that the temporary stop command has been received (YES at S316), the main CPU 1071 updates the under-temporary-stop flag so as to be turned on (S317) and thereafter, returns to the processing at S313.

When the temporary stop command has been received from each of the PTS terminal 1700 through the above-described processing at S313 to S317, the slot machine 1010 is controlled to temporarily stop the execution of the unit game, and thereafter, when the resume command has been received from each of the PTS terminals 1700, the slot machine 1010 is controlled to resume the execution of the unit game.

Next, the main CPU 1071 conducts an at-one-game-termination initialization process (S318). The subsequent processing is the same as that shown in FIG. 10. The main CPU 1071 conducts a game termination notification process (S325), and after completing this process, returns to the processing at S313 and repeats the unit game.

Figure 24:
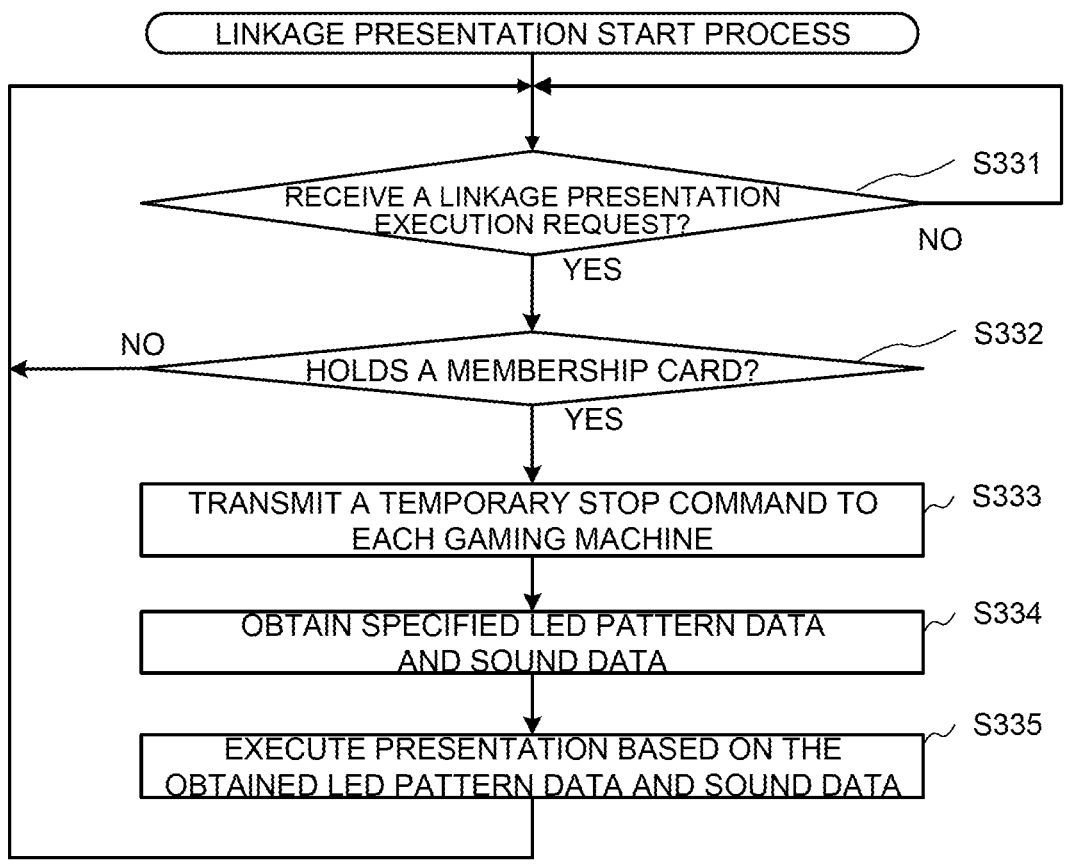
FIG. 24 is a flowchart showing a procedure of a linkage presentation start process executed on the PTS terminals which function as the presentation execution clients, according to the another embodiment of the present invention.

Next, with reference to FIG. 24, a linkage presentation start process executed on each of the PTS terminals 1700 which function as the presentation execution clients will be described. As described above, the linkage presentation start process is continuously executed through the transmission of the linkage presentation execution request based on the scenario data from the PTS terminal 1700 which functions as the presentation control server.

First, each of the PTS terminals 1700 determines whether or not each of the PTS terminals 1700 has received the linkage presentation execution request transmitted from the PTS terminal 1700 which functions as the presentation control server (S331). Data related to a process executed in accordance with the scenario data of the linkage presentation is specified by the linkage presentation execution request.

When each of the PTS terminals 1700 has not received the linkage presentation execution request (NO at S331), each of the PTS terminals 1700 returns to S331 again and repeats this determination process. When each of the PTS terminals 1700 has received the linkage presentation execution request (YES at S331), each of the PTS terminals 1700 determines whether or not the membership card is held in the card unit 1741 of each thereof (that is, a player who is a member is using this gaming machine) (S332). Whether or not the held IC card is a card of a member can be determined, for example, by referencing a table in the membership management server 13 based on an identification code read from the IC card and determining whether or not the read identification code is registered as an identification code of a member therein.

When the membership card is not held therein (NO at S332), each of the PTS terminals 1700 returns to S331 again and repeats the determination process on the reception of the linkage presentation execution request. In this example, on the gaming machine with no membership card being inserted into the card unit 1741, the linkage presentation is not executed. However, as described above, a range of gaming machines, on each of which the linkage presentation is executed, can be determined on various conditions. In addition, it is only required to confirm whether or not the held IC card is a card of a member at first one time, as long as holding the read card of the IC card is sustained.

When the membership card is held (YES at S332), the PTS terminal 1700 transmits the temporary stop command, which temporarily stops the game being conducted on the gaming machine, to each of the gaming machines in which each of the PTS terminals 1700 is housed (S333). Next, each of the PTS terminals 1700 obtains specified LED pattern data and sound data from its RAM 1753 or external storage device 1754 (S334).

Next, each of the PTS terminals 1700 executes the presentation based on the obtained LED pattern data and sound data (S335). For example, each of the PTS terminals 1700 controls light emitting of the full-color LEDs 1721*a* and full-color LEDs 1721*b* based on the LED pattern data and causes the light emitting plates 1720*a* and 1720*b* to emit light and processes the sound data with a DSP 1765 and outputs sound from the speakers 1707 and 1709. The above-mentioned presentation with light and sound is conducted in a linked manner on the PTS terminals 1700 of the other gaming machines, resulting in the realization of the linkage presentation. After the processing at S335, each of the PTS terminals 1700 returns to S331 and repeats the linkage presentation start process.

Whether or not a PTS terminal 1700 itself is the PTS terminal 1700 which operates as the presentation execution client can be determined by, for example, a flag which is stored in the external storage device 1754 of that PTS terminal 1700, a server which is accessible via a network, or the like. When each of the PTS terminals 1700 determines that the PTS terminal 1700 itself is the PTS terminal 1700 which operates as the presentation execution client, the PTS terminal 1700 performs control so as to selectively execute a process for the presentation execution client. In addition, a program for the presentation execution client may be activated when the power is supplied.

Figure 25:
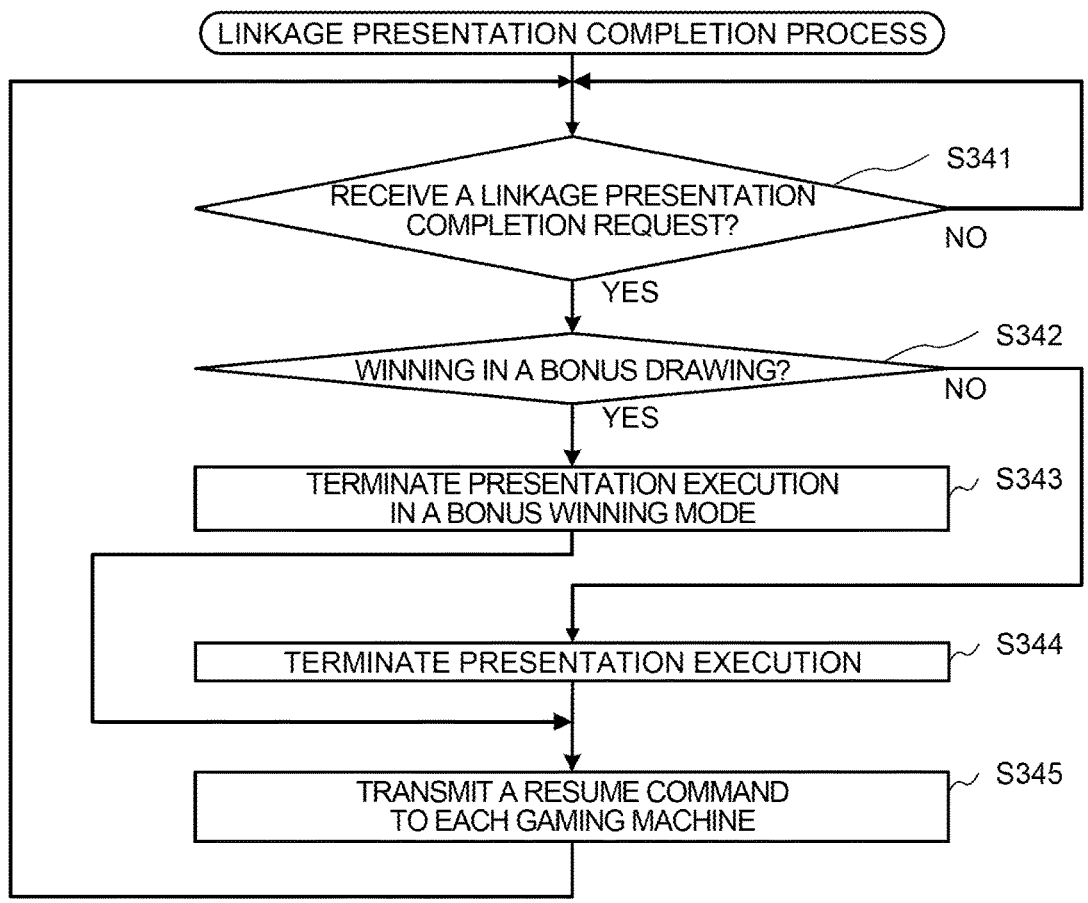
FIG. 25 is a flowchart showing a procedure of a linkage presentation completion process executed on the PTS terminals which function as the presentation execution clients, according to the another embodiment of the present invention.

Next, with reference to FIG. 25, a linkage presentation completion process executed on each of the PTS terminals 1700 which functions as the presentation execution client will be described.

First, each of the PTS terminals 1700 determines whether or not each of the PTS terminals 1700 has received the linkage presentation completion request transmitted from the PTS terminal 1700 which functions as the presentation control server (S341). The linkage presentation completion request is to instruct the completion of the linkage presentation.

When each of the PTS terminals 1700 has not received the linkage presentation completion request (NO at S341), each of the PTS terminals 1700 returns to S341 again and repeats this determination process. When each of the PTS terminals 1700 has received the linkage presentation completion request (YES at S341), each of the PTS terminals 1700 further determines whether or not this gaming machine has won in the bonus drawing, for example, by referencing contents or the like of the messages of the linkage presentation execution request and the linkage presentation completion request (S342).

When this gaming machine has not won in the bonus drawing (NO at S342), each of the PTS terminals 1700 conducts presentation in a mode in which no winning in the bonus drawing has occurred and completes the presentation process (S344). When this gaming machine has won in the bonus drawing (YES at S342), each of the PTS terminals 1700 conducts presentation in a mode in which the winning in the bonus drawing has occurred and completes the presentation process (S343). The presentation in the mode in which the winning in the bonus drawing has occurred is, for example, presentation in which immediately before completing the presentation, the full-color LEDs 1721*a* and 1721*b* are caused to emit light in a specific color, thereby making light emitting states of the light emit plates remarkably conspicuous, high-speed blinking is repeated, and larger sound than sound outputted from the other gaming machines is outputted.

In addition, the above-described presentation in which the winning in the bonus game is notified may be incorporated into the selected presentation pattern.

After completing the presentation through the processing at S343 or S344, the PTS terminal 1700 transmits the resume command for resuming the game being temporarily stopped on each of the gaming machines to each of the corresponding gaming machines (S345). After the processing at S345, each of the PTS terminals 1700 returns to S341 and repeats the linkage presentation completion process.

Although the winning may be caused to occur directly through the above-described presentation in which the light emitting and the sound outputting are performed by the PTS terminal 1700, a variety of other presentation can be considered. For example, the configuration can also be arranged such that after the light emitting and the sound outputting, the LCD 1719 of the PTS terminal 1700 is caused to display a challenge game using buttons or a scratch card, a roulette game, a flash game, or the like, thereby uplifting a sense of expectation of a player; thereafter, a player is allowed to execute such a game by operating the touch panel; and when a player has won in the game, a credit of the gaming machine is updated (the winning or losing in this game can be determined in real time in accordance with the operation made by a player at that time or can also be controlled based on an outcome which is previously determined by a drawing in the bonus game by the bonus server 11). In addition, in this case, the game displayed on the LCD 1719 of the PTS terminal 1700 can also be executed by displaying image data or the like stored in the bonus server 11 with a Web browser executed on the PTS terminal 1700.

As described above, since the PTS terminal 1700 executes the variety of processes corresponding to its roles, the programs are installed in accordance with the functions realized by the PTS terminal 1700. The configuration can also be arranged such that programs which are common in the respective PTS terminals 1700 are installed and processes needed in the respective PTS terminals 1700 are individually activated.

As described above, in accordance with the temporary stop command and the resume command transmitted from each of the PTS terminals 1700, the temporal stop and the resumption of the game on each of the corresponding gaming machines are controlled. However, it is also made possible to continue the game without temporarily stopping the game or to change the timing of the temporal stop, depending on the state of executing the game and the timing. In addition, it is also made possible for a player himself or herself to select a method of such temporal stop. By employing the above-mentioned configuration, for example, even when the linkage presentation by each of the PTS terminal 1700 is being conducted, it is made possible to continue the presentation or the like in the game conducted on each of the gaming machines without temporarily stopping the presentation or the like.

FIG. 26 is a diagram showing one example of the linkage presentation by the light emitting plates 1720*a* and 1720*b*, executed on the PTS terminals 1700 of the four gaming machine (GM-1 to GM-4). In FIG. 26, a view in which the light emitting state of the light emitting plates 1720*a* and 1720*b* of each of the PTS terminals 1700 is shifted over time is shown in FIG. 26A to FIG. 26E.

Figure 26A:
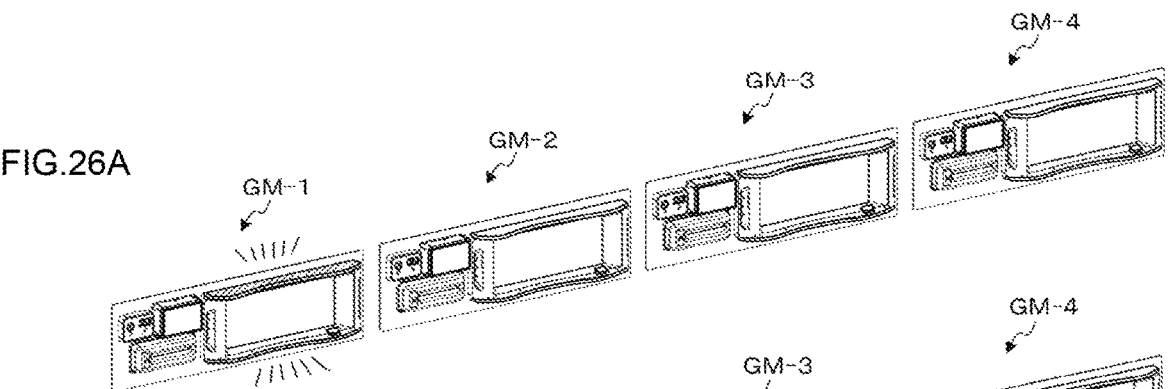
FIGS. 26A to 26E are diagrams for describing one example of the linkage presentation executed on the PTS terminals.
Figure 26B:
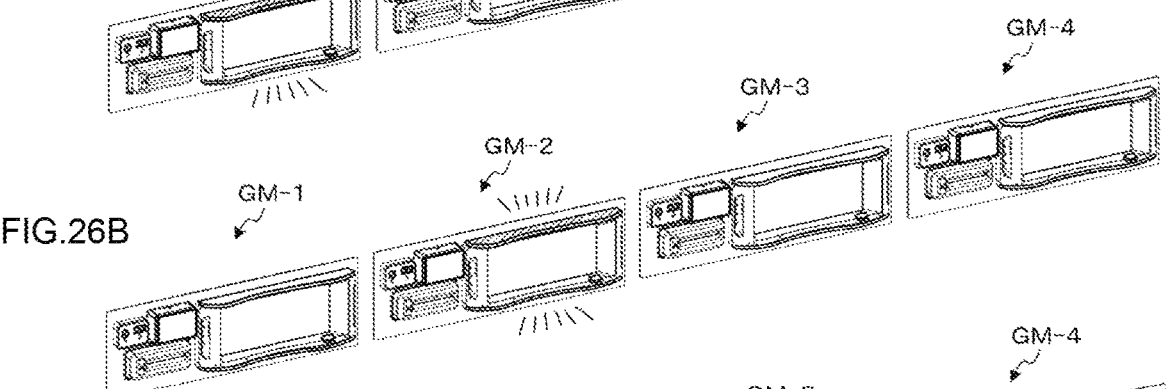

As shown in FIG. 26A, in the linkage presentation, initially, an upper light emitting plate 1720*a* and a lower light emitting plate 1720*b* which the PTS terminal 1700 of the gaming machine GM-1 includes are controlled to emit light in an emphasis color (for example, red), and the other light emitting plates 1720*a* and 1720*b* are controlled to emit light in a background color (for example, white) which is different from said emphasis color. Next, as shown in FIG. 26B, light emitting plates 1720*a* and 1720*b* which the PTS terminal 1700 of the gaming machine GM-2 on the right-hand side of the gaming machine GM-1 includes are controlled to emit light in the emphasis color, and the other light emitting plates 1720*a* and 1720*b* of the other PTS terminals 1700 are controlled to emit light in the background color which is different from said emphasis color. Here, the light in red emitted from the light emitting plates 1720*a* and 1720*b* of the PTS terminal 1700 of the gaming machine GM-1 is changed to the light in white.

Figure 26C:
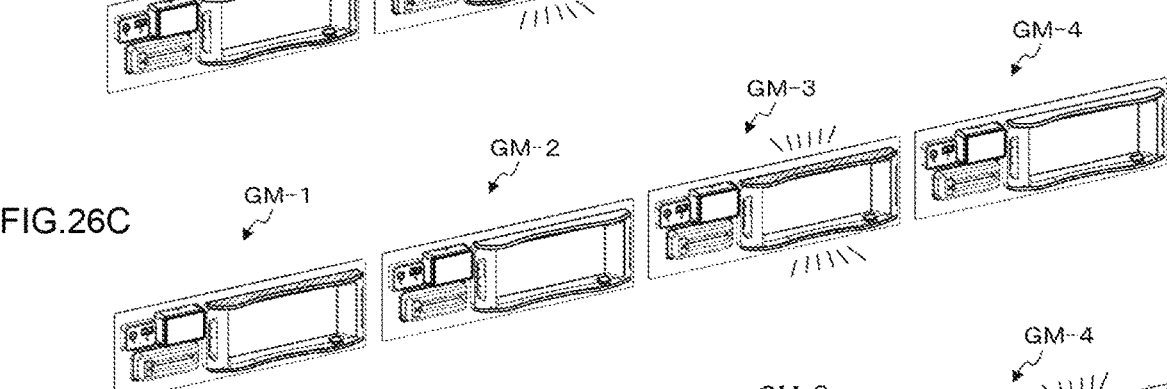
Figure 26D:
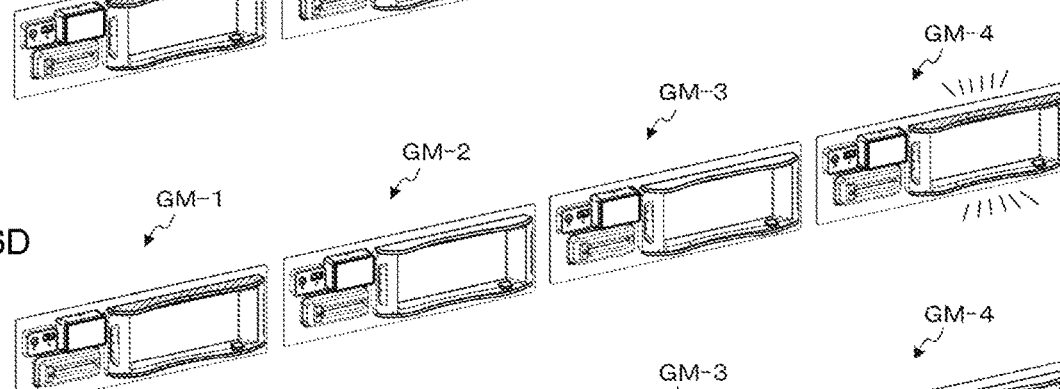

Next, as shown in FIG. 26C, light emitting plates 1720*a* and 1720*b* which the PTS terminal 1700 of the gaming machine GM-3 on the right-hand side of the gaming machine GM-2 includes are controlled to emit light in the emphasis color, and the other light emitting plates 1720*a* and 1720*b* of the other PTS terminals 1700 are controlled to emit light in the background color which is different from said emphasis color. Here, the light in red emitted from the light emitting plates 1720*a* and 1720*b* of the PTS terminal 1700 of the gaming machine GM-2 is changed to the light in white. Similarly, as shown in FIG. 26D, light emitting plates 1720*a* and 1720*b* which the PTS terminal 1700 of the gaming machine GM-4 on the right-hand side of the gaming machine GM-3 includes are controlled to emit light in the emphasis color, and the other light emitting plates 1720*a* and 1720*b* of the other PTS terminals 1700 are controlled to emit light in the background color which is different from said emphasis color. Here, the light in red emitted from the light emitting plates 1720*a* and 1720*b* of the PTS terminal 1700 of the gaming machine GM-3 is changed to the light in white.

Figure 26E:
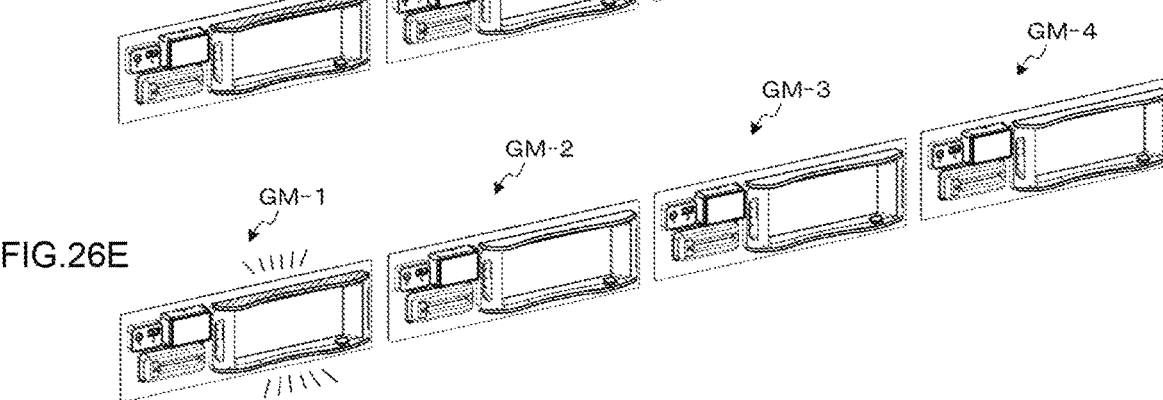

Next, as shown in FIG. 26E, as in the initial state in the linkage presentation, the upper light emitting plate 1720*a* and the lower light emitting plate 1720*b* which the PTS terminal 1700 of the gaming machine GM-1 includes are controlled to emit light in the emphasis color, and the other light emitting plates 1720*a* and 1720*b* are controlled to emit light in the background color which is different from said emphasis color. Here, the light in red emitted from the light emitting plates 1720*a* and 1720*b* of the PTS terminal 1700 of the gaming machine GM-4 is changed to the light in white.

As described above, in the example of the above-described linkage presentation, the light in red which is the emphasis color is emitted from the light emitting plates of each of the PTS terminals 1700 in the bank so as to be sequentially shifted to the neighboring PTS terminal 1700, and the presentation is repeated many times.

It is to be noted that although in this example, the light from the upper light emitting plate 1720*a* and the light from the lower light emitting plate 1720*b* are controlled to be emitted in the same color at the same timing, these light emitting plates can be controlled to emit light in a different light emitting mode.

For the presentation as described above, the LED pattern data which specifies the timing at which, periods of time during which, the specific colors in which the full-color LEDs are caused to emit light is specified to each of the PTS terminals 1700 by the PTS terminal 1700 which functions as the presentation control server. It is to be noted that although in this example, the presentation in which the light emitting plates 1720*a* and 1720*b* of each of the PTS terminals 1700 are controlled in conjunction with each other is described, concurrently, the presentation can also be controlled such that sound (which is linked on each of the PTS terminals 1700) is outputted from the speakers 1707 and 1709.

FIG. 27 shows an example in which in the linkage presentation executed by the light emitting plates 1720*a* and 1720*b* on the PTS terminals 1700 of the four gaming machine (GM-1 to GM-4) shown in FIG. 26, each of the PTS terminals 1700 emits light in a mode which is different from the mode shown in FIG. 26.

In the example shown in FIG. 27, a light emitting mode of one PTS terminal 1700 is shown, and here, the light emitting plates 1720*a* and 1720*b* are configured such that light is emitted from seven full-color LEDs (1721*a* and

1721*b*), respectively. Therefore, said full-color LEDs are controlled to emit light (for example, in an emphasis color) sequentially one by one.

In FIG. 27, a view in which the light emitting mode of the light emitting plates 1720*a* and 1720*b* of one PTS terminal 1700 is shifted over time is shown in FIG. 27A to FIG. 27H.

Figure 27A:
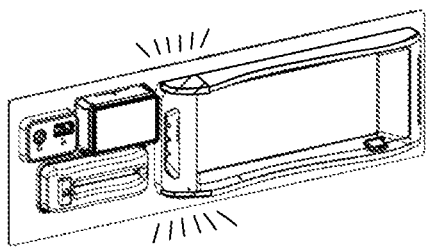
FIGS. 27A to 27H are diagrams for describing one example of the linkage presentation executed on the PTS terminals.
Figure 27E:
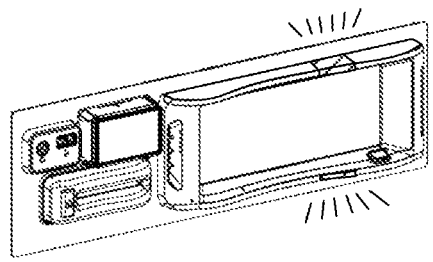
Figure 27B:
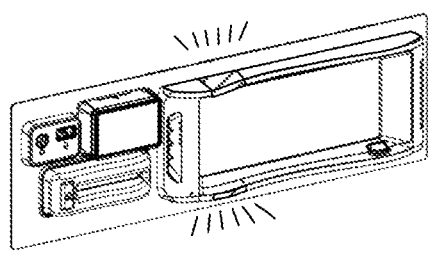
Figure 27F:
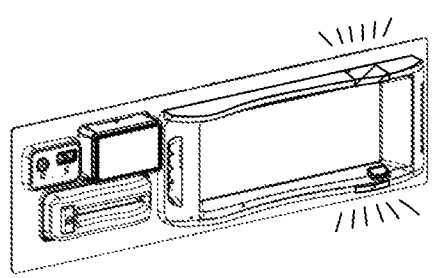

As shown in FIG. 27A, in the linkage presentation, initially, the upper light emitting plate 1720*a* and the lower light emitting plate 1720*b* which the PTS terminal 1700 includes are controlled to emit light partially in the emphasis color (for example, red) by first full-color LEDs, and the other full-color LEDs are controlled to emit light in a background color (for example, white) which is different from said emphasis color. Next, as shown in FIG. 27B, the light emitting plates 1720*a* and 1720*b* of the PTS terminal 1700 are controlled to emit light partially in the emphasis color by second full-color LEDs, and the other full-color LEDs are controlled to emit light in the background color (for example, white) which is different from said emphasis color. Here, the light in red emitted from the first full-color LEDs is changed to the light in white.

Figure 27C:
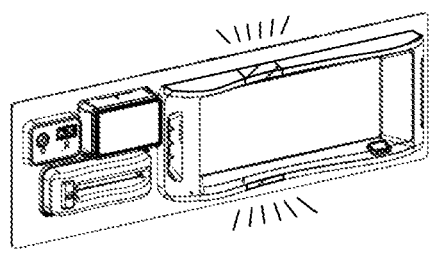
Figure 27G:
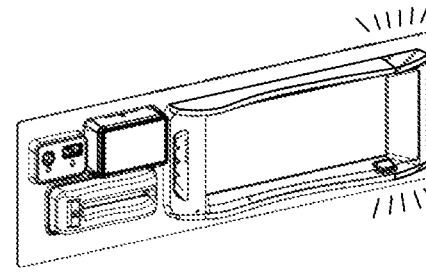
Figure 27D:
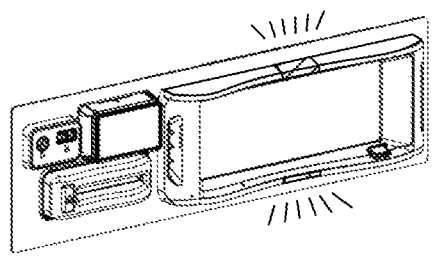

Next, as shown in FIG. 27C, the light emitting plate 1720*a* and the lower light emitting plate 1720*b* of the PTS terminal 1700 are controlled to emit light partially in the emphasis color (for example, red) by third full-color LEDs, and the other full-color LEDs are controlled to emit light in the background color (for example, white) which is different from said emphasis color. Subsequently, similarly, as shown in FIG. 27D to FIG. 27G, the light emitting plates 1720*a* and 1720*b* of the PTS terminal 1700 are controlled such that the light partially in the emphasis color is emitted by the respective full-color LEDs on the right-hand side and the other full-color LEDs are controlled to emit light in the background color (for example, white) which is different from said emphasis color, respectively.

Figure 14:
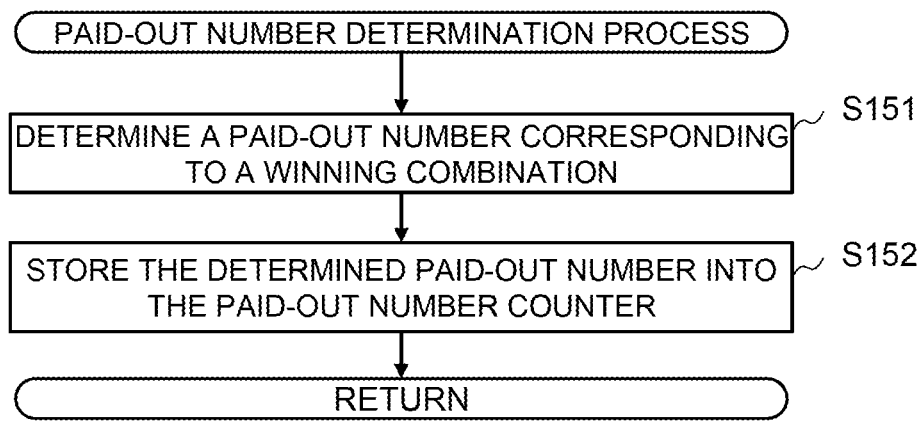
FIG. 14 is a flowchart showing a procedure of a to-be-paid-out number determination process executed on the slot machine according to the one embodiment of the present invention.
Figure 27H:
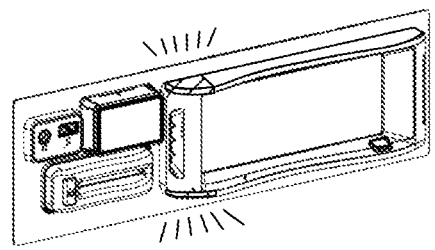

FIG. 27H shows a view in which one round of light emitting in the emphasis color by the first full-color LEDs to the seventh first full-color LEDs has been made and the light emitting state is returned to the initial state as shown in FIG. 14 (A).

As described above, in the example of the above linkage presentation, on the light emitting plates of each of the PTS terminals 1700 in a bank, one part of the light emitting plates can be caused to emit light in the specific color, and such presentation can be performed on the plurality of PTS terminals 1700 in the bank in a manner linked with one another. For example, presentation can be arranged such that the light emitting plates 1720*a* and 1720*b* of one PTS terminal 1700 are caused to emit light partially (in the specific color) sequentially at seven timings, and further, taking over the partial light emitting, light emitting plates 1720*a* and 1720*b* of the neighboring PTS terminal 1700 are caused to emit light.

It is to be noted that although FIG. 27 shows a view in which in accordance with light emitting by one full-color LED, one part of each of the light emitting plates is caused to emit light, normally, light emitted from the full-color LEDs on the light emitting plates is diffused, and around the boundary with a part of the neighboring light emitting plates, the boundary between the mutual light emitting parts appears in gradation.

Hereinabove, the example in which the light emitting and the sound outputting in the linkage presentation are performed on each of the PTS terminals 1700 in the bank in the sequentially shifted manner is described. However, the linkage presentation can also be arranged such that first, the linkage presentation is performed over a plurality of banks one bank by one bank, and thereafter, the linkage presentation is performed in one bank. For example, for a case where first, one bank is configured to win in a drawing, and thereafter, one gaming machine in the bank which has won is configured to win therein, thereby conducting drawings in two stages, the above-described presentation can be considered. At this time, processing in which 10 times as many points as those normally provided are awarded to the gaming machine in the bank, which has won (in accordance with a bet credit), can also be arranged.

In addition, although hereinabove, it is described that the credit is provided for the gaming machine which has won in the bonus game, some benefit (including points) other than the credit can also be provided. In addition, it is also made possible for a plurality of gaming machines to win therein, instead of one gaming machine.

[Configuration of Signage]

Figure 28:
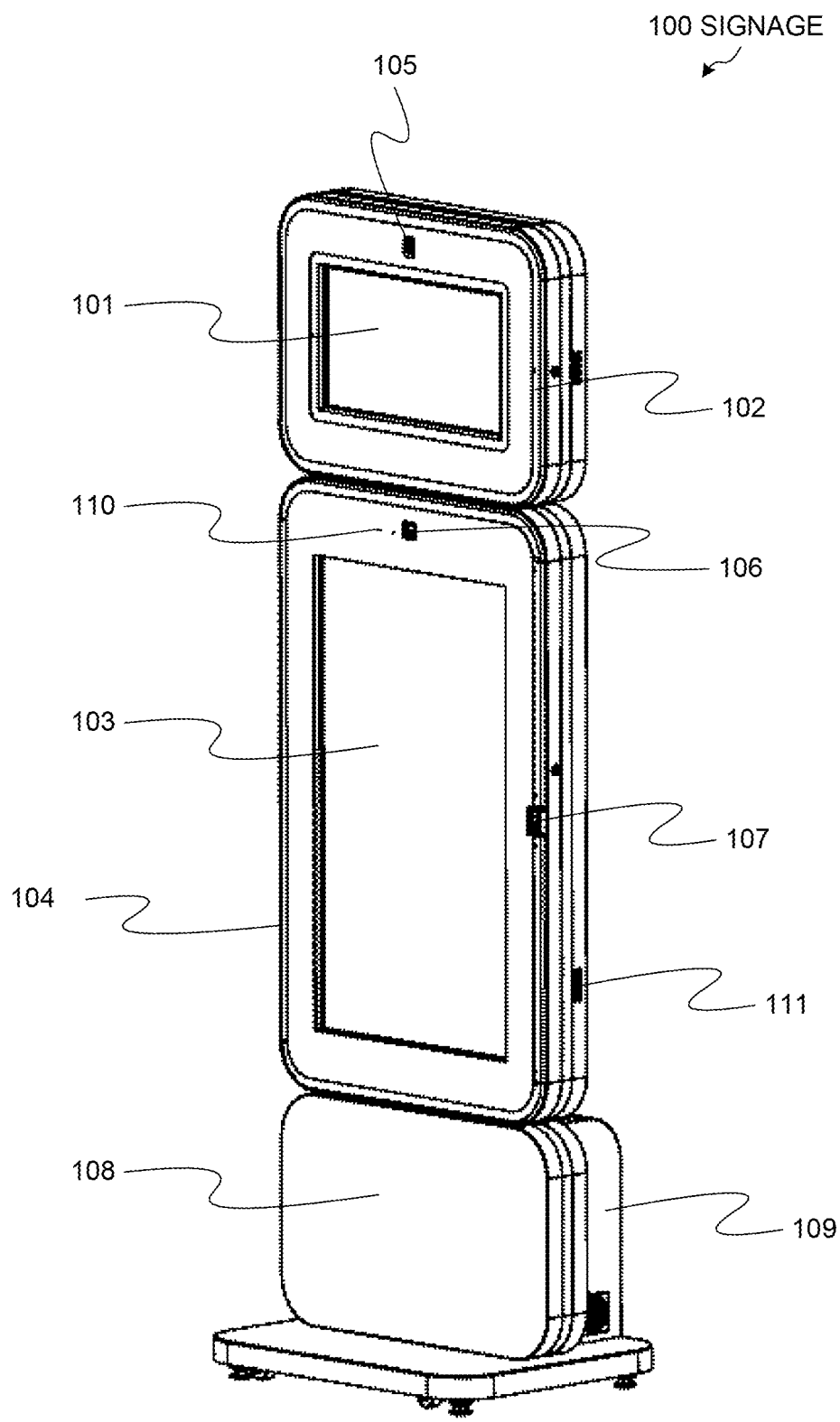
FIG. 28 is a view illustrating an overall structure of a signage according to the one embodiment of the present invention.

FIG. 28 shows a signage 100 which can be used in a game system 1 according to one embodiment of the present invention. The signage 100 is an information display device used to display shop advertisement (including advertisement signboards), a floor guide of a hall, and the like and can be connected to a server (for example, a bonus server 11 or a membership management server 13) of the game system 1 via a network.

The signage 100 includes an LCD 101 and an LCD 103 having a touch panel function. The LCD 101 is, for example, a 24-inch (approximately 60.96 cm) liquid crystal display device and the LCD 103 is, for example, a 46-inch (approximately 116.84 cm) liquid crystal display device, and on these LCDs, as described above, the advertisement information, the guide information, and the like are displayed. In addition, the touch panel function which the LCD 103 has is performed by, for example, a touch panel using an infrared ray system. It is to be noted that although in this example, the LCD 103 is configured to have the touch panel function, the LCD 103 may be configured such that other input devices such as a keyboard and a mouse are used to input instructions thereto.

The LCD 101 and the LCD 103 are housed in respective cabinets, and on peripheral parts of said cabinet front faces, presentation LEDs 102 and 104 for presentation are provided, respectively. The presentation LEDs 102 and 104 are, for example, tape-shaped LED lights.

Further, the signage 100 includes motion sensors 105 and 106 in the cabinet of the LCD 101 and the cabinet of the LCD 103, respectively. The motion sensors 105 and 106 are, for example, cameras, and images shot by the motion sensors 105 and 106 are used to analyze behavior of a user of the signage 100 and customers passing along passages.

The signage 100 also includes a touch unit 107 including an RFID module which is operable to perform data communication with a non-contact IC card, and a mobile phone and a smartphone, each of which has a communication function by NFC. A member holds a membership card (IC card) associated with the member over the touch unit 107, can thereby log therein, and can display a menu screen for a member and information related to the member on the LCD 101 or the LCD 103. The information related to a member is obtained from, for example, a membership management server 13.

In addition, a staff member of a hall holds an IC card of the staff member thereover, can thereby log therein and can display a menu screen for a staff member or the like on the LCD 101 or the LCD 103.

The signage 100 has no card unit for holding an IC card 1500, as compared with a PTS terminal 1700 and only includes the touch unit 107. However, the signage 100 is arranged such that even when after a user has touched with the IC card, the user has left without logging off, the information of a member displayed on the LCD 103 or the like through the touching comes not to be displayed after the elapse of a predetermined time period and the logging off is automatically made.

Further, the signage 100 includes a microphone 133 for obtaining sound into the cabinet of the LCD 103. In the cabinet of the LCD 103, a microphone opening 110 whose position corresponding to a position where the microphone is provided is provided. In FIG. 28, beside the motion sensor 106, this microphone opening 110 is shown.

In addition, the signage 100 includes speakers 134 and 135 for outputting sound into the cabinet of the LCD 103. In the cabinet of the LCD 103, speaker ducts whose positions correspond to positions where the speakers are provided are provided. In FIG. 28, the speaker duct 111 which corresponds to one of the speakers is shown.

In addition thereto, the signage 100 includes a base unit 108 for supporting the cabinet of the LCD 101 and the cabinet of the LCD 103 and a control unit 109 in which a control part for controlling the respective LCDs, LEDs, and the like is housed.

[Configuration of Circuitry of Signage]

Figure 29:
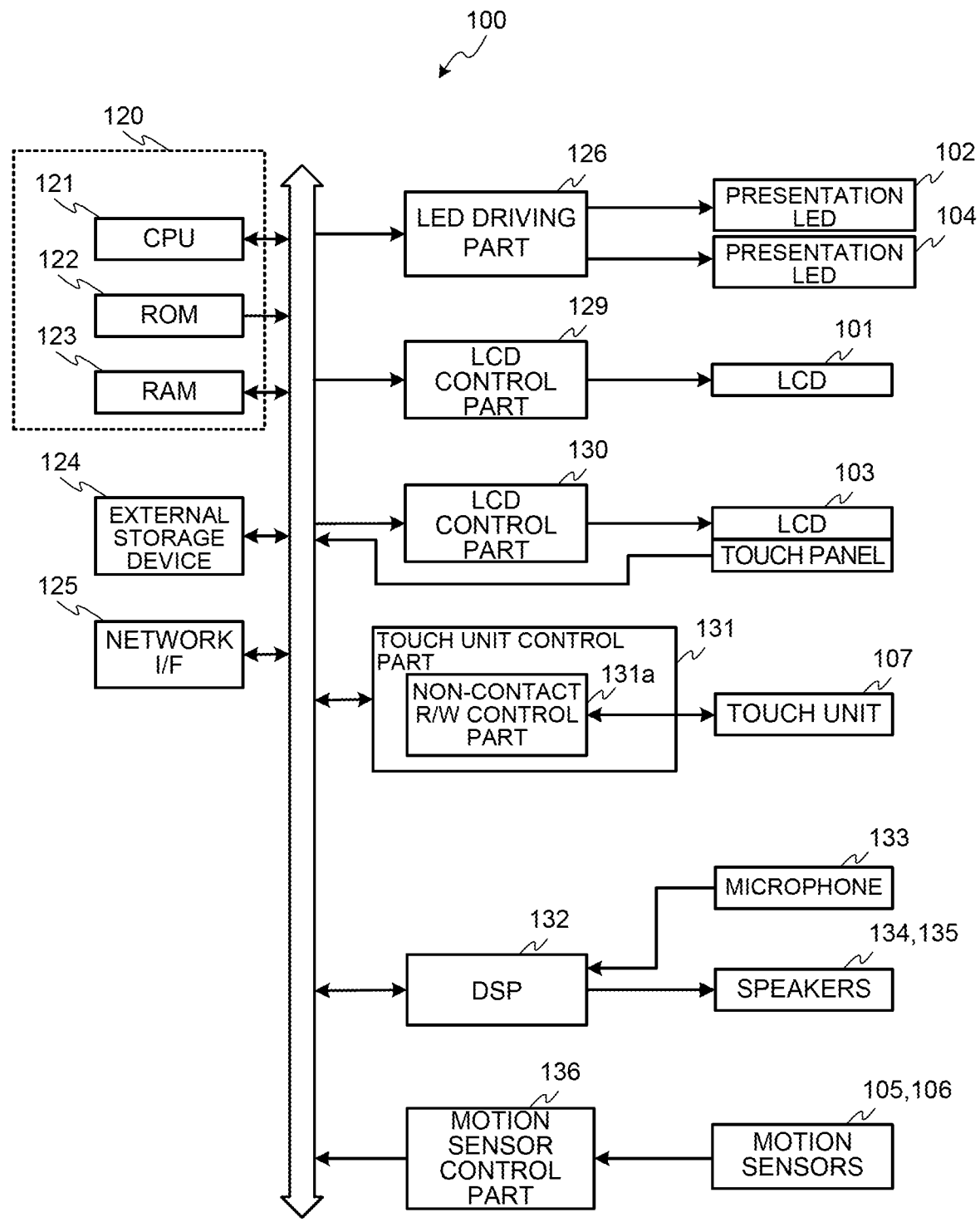
FIG. 29 is a diagram showing a circuitry configuration of the signage according to the one embodiment of the present invention.

Next, with reference to FIG. 29, a configuration of circuitry which the signage 100 includes will be described.

A signage controller 120 which controls the signage 100 has a CPU 121, a ROM 122, and a RAM 123.

The CPU 121 performs execution control of the respective components of the signage, executes various kinds of programs stored in the ROM 122, and performs computation therefor.

The ROM 122 is constituted of a memory device such as a flash memory, and permanent data used for the execution by the CPU 121 is stored therein. For example, a linkage presentation control program and the like executed in response to a request from a bonus server 11 can be stored therein.

The RAM 123 temporarily stores data required upon executing the various kinds of programs stored in the ROM 122.

An external storage device 124 is, for example, a storage device such as a hard click device and stores programs executed in the CPU 121 and data which the programs executed in the CPU 121 use.

A network I/F (interface) 125 realizes data communication with servers such as the bonus server 11 and a membership management server 13 and a PTS terminal 1700.

An LED driving part 126, in response to a linkage presentation start request from the bonus server 11, controls presentation LEDs 102 and 104 to light up at predetermined timing. In addition, the LED driving part 126 can also cause the presentation LEDs 102 and 104 to emit light in synchronization with display of advertisement information, display of guide information, display of member information based on an operation by a member, and the like.

An LCD control part 129 controls the above-described pieces of information such as the advertisement information to be displayed on an LCD 101.

An LCD control part 130 controls the above-described pieces of information such as the advertisement information to be displayed on an LCD 103. In addition, the LCD 103 includes a touch panel function, with which an operation from a user is transmitted to the CPU 121.

A touch unit control part 131 controls data transmission and reception in association with a touch operation of an IC card or a mobile phone on a touch unit 107. The touch unit control part 131 includes a non-contact R/W (reader/writer) control part 131A.

The non-contact R/W control part 131A determines whether or not there has been the touch operation of an IC card or a mobile phone on the touch unit 107 and when there has been the touch operation, obtains a read result or the like from the touch unit 107. The touch unit 107 has an antenna part for performing data transmission and reception with an IC card or a mobile phone through NFC or the like.

When the CPU 121 has obtained an identification code of a membership card (IC card) from the touch unit 107, the CPU 121 obtains information of a member associated with the identification code from a membership management server 13 and displays the information on the LCD 101 and the LCD 103. In addition, the CPU 121 can also cause an operation menu for the member to be displayed on the LCD 103 and cause advertisement information suited for the member to be displayed on the LCD 101 and the LCD 103.

A DSP 132 receives sound data obtained from a microphone 133, subjects the received sound data to predetermined processing, and thereafter, transmits the processed data to the CPU 121. In addition, in order to output the received sound data, the DSP 132 transmits this data to speakers 134 and 135.

A motion sensor control part 136 obtains images of a user and the like received from motion sensors (for example, cameras) 105 and 106, subjects the images to predetermined image processing as needed, and transmits the processed data to the CPU 121.

[Linkage Presentation on Gaming Machines Including Signage]

FIG. 30 is a layout diagram of a hall in which a plurality of gaming machines (slot machines 1010) and a signage are installed. In FIG. 30, a layout of an area A-1 in the hall is shown.

In this example, in the area A-1, two zones (Z-1 and Z-2) are included, and in the zone Z-1, four banks (B-1 to B-4) are included. In addition, in the zone Z-2, four banks (B-1 to B-4) are included.

Here, with a look at the bank B-2 in the zone Z-1, in the bank B-2, eight gaming machines (GM-109 to GM-116) are included, and these gaming machines are installed adjacently side by side. In addition, also in the bank B-1, eight gaming machines (GM-101 to GM-108) are included, and the eight gaming machines in the bank B-1 and the gaming machines in the bank B-2 are installed back to back.

In the above-described installation state, when one of the gaming machines in the bank B-2 has won in a bonus game, linkage presentation by a PTS terminal 1700 is performed on all of the gaming machines in the bank B-2 (here, members are playing on all of the gaming machines), and for example, light emitting in red of light emitting plates of the PTS terminal 1700 is shifted sequentially from GM-109 to GM-116 as indicated by an arrow 21 (refer to FIG. 26). The light emitting presentation of the light emitting plates may repeat this shifting at several times, or the light emitting presentation may be arranged such that after the light emitting in red has reached the gaming machine in the end position, the light emitting in red is shifted conversely from there toward the gaming machine in a position which is opposite to the end position and this shifting is alternately repeated. After the above-described presentation has been repeated at several times, presentation in which the light emitting in red finally stops on the gaming machine which has won in the bonus game and the winning is notified is performed.

Next, with a look at the bank B-4 in the zone Z-1, in the bank B-4, eight gaming machines (GM-121 to GM-124 and GM-129 to GM-132) are included, and these four gaming machines and these four gaming machines are installed back to back, respectively.

In the above-described installation state, when one of the gaming machines in the bank B-4 has won in a bonus game, linkage presentation by a PTS terminal 1700 is performed on all of the gaming machines in the bank B-4 (here, members are playing on all of the gaming machines), and for example, the light emitting in red of light emitting plates of the PTS terminal 1700 is shifted sequentially from GM-124 to GM-121; thereafter, is shifted sequentially from GM-129 to GM-132; thereafter, is further shifted sequentially again from GM-124 to GM-121; and the shifting in such a loop-like manner is conducted sequentially as indicated by an arrow 22. After the above-described presentation has been repeated at several times, the presentation in which the light emitting in red finally stops on the gaming machine which has won in the bonus game and the winning is notified is performed.

In addition, with a look at the bank B-2 in the zone Z-2, in the bank B-2, 16 gaming machines (GM-217 to GM-224 and GM-216 to GM-209) are included, and these eight gaming machines and these eight gaming machines are installed face to face, respectively. Players who play here are seated back to back.

In the above-described installation state, when one of the gaming machines in the bank B-2 has won in a bonus game, the linkage presentation by a PTS terminal 1700 is performed on all of the gaming machines in the bank B-2 (here, members are playing on all of the gaming machines), and for example, the light emitting in red of light emitting plates of the PTS terminal 1700 is shifted sequentially from GM-217 to GM-224; thereafter, is shifted sequentially from GM-216 to GM-209; thereafter, is further shifted sequentially again from GM-217 to GM-224; and the shifting in such a loop-like manner is conducted sequentially as indicated by an arrow 23. After the above-described presentation has been repeated at several times, the presentation in which the light emitting in red finally stops on the gaming machine which has won in the bonus game and the winning is notified is performed.

Further, with a look at the bank B-4 in the zone Z-2, in the bank B-4, 16 gaming machines gaming machine (GM-240 to GM-233 and GM-241 to GM-248) are included, and these eight gaming machines and these eight gaming machines are installed back to back, respectively. Further, in this example, a signage SG-1 is also included.

In the above-described installation state, when one of the gaming machines in the bank B-4 has won in a bonus game, the linkage presentation by a PTS terminal 1700 is performed on all of the gaming machines in the bank B-4 (here, members are playing on all of the gaming machines), and further, the signage SG-1 installed at the end of the bank is also involved in the linkage presentation.

For example, the light emitting in red of light emitting plates of the PTS terminal 1700 is shifted from GM-240 to GM-233; next, LEDs of the signage SG-1 emit light in synchronization with this linkage presentation; thereafter, the light emitting in red is shifted from GM-241 to GM-248; thereafter, the light emitting in red is further shifted again from GM-240 to GM-233; and the shifting in such a loop-like manner is conducted sequentially as indicated by an arrow 24. After the above-described presentation has been repeated at several times, the presentation in which the light emitting in red finally stops on the gaming machine which has won in the bonus game and the winning is notified is performed.

Although with reference to FIG. 30, the linkage presentation is described, the above-described linkage presentation is merely one example. By making various settings of banks in a layout of a hall, on gaming machines in said banks, a signage, and other information apparatuses, a variety of presentation (presentation including the order, timing, and shifting of light emitting as well as outputting of sound, etc.) can be considered.

[Configuration of Kiosk Terminal]

Figure 31:
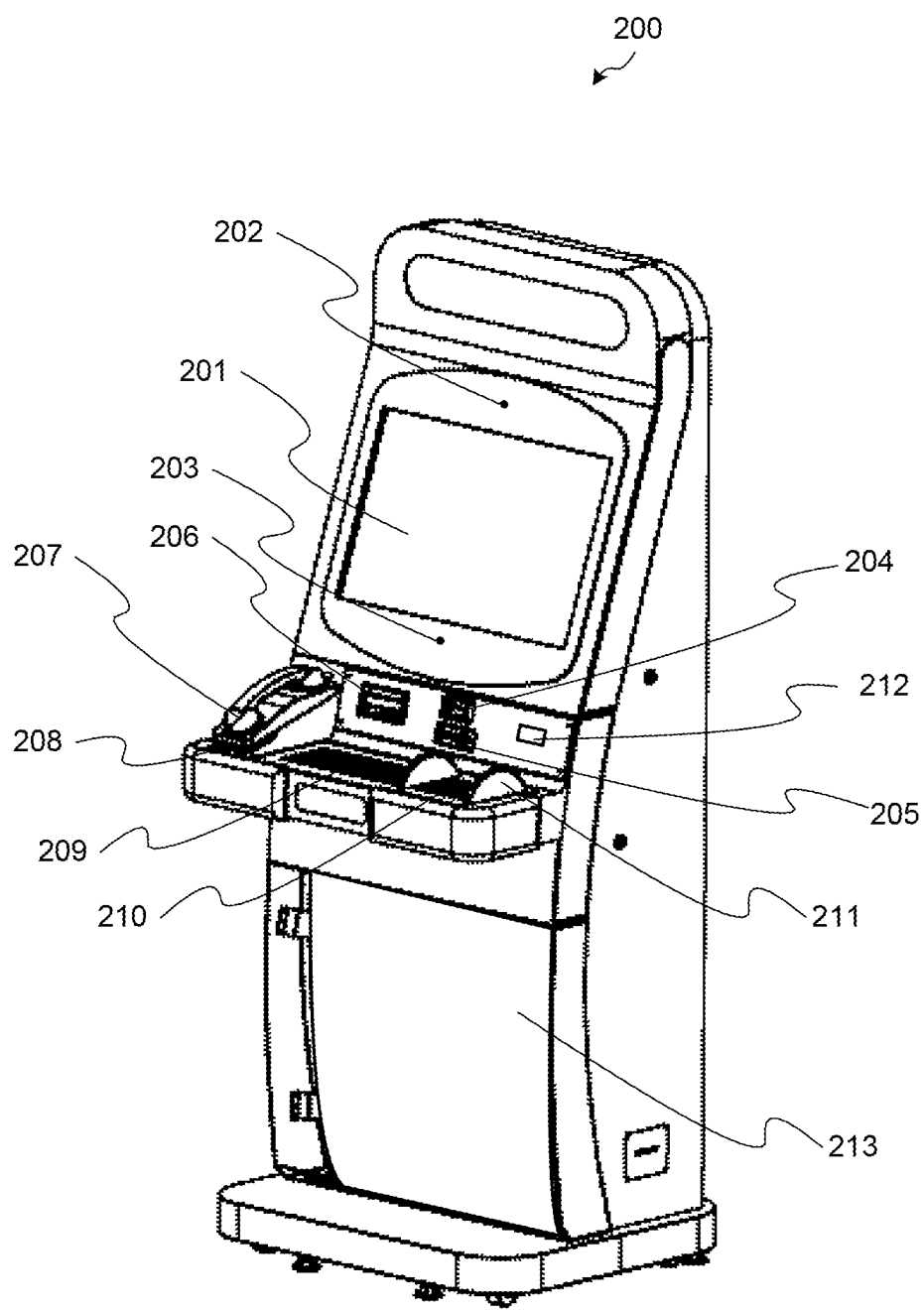
FIG. 31 is a view illustrating an overall structure of a kiosk terminal according to the one embodiment of the present invention.

FIG. 31 shows a kiosk (KIOSK) terminal 200 which can be used in a game system 1 according to one embodiment of the present invention. The kiosk terminal 200 is an information display device used to display information pertinent to games conducted in a hall, for example, information pertinent to the start of a bonus game conducted on a bonus server 11, a countdown upon said start, today's winning ranking, popular machine ranking, and the like and is connected via a network to servers (for example, the bonus server 11 and a membership management server 13) of the game system 1.

The kiosk terminal 200 includes an LCD 201 having a touch panel function. The LCD 201 is, for example, a 24-inch (approximately 60.96 cm) liquid crystal display device, and as mentioned above, the information pertinent to the games conducted in a hall and the like are displayed on this LCD. It is to be noted that although in this example, the LCD 201 is configured to have the touch panel function, instructions may be inputted by using other input devices such as a keyboard and a mouse.

Further, the kiosk terminal 200 includes motion sensors 202 and 203 above and below the LCD 201, respectively. The motion sensors 202 and 203 are, for example, cameras, and images shot by the motion sensors 202 and 203 are used to analyze behavior of a user of the kiosk terminal 200 and customers passing along passages.

In addition, the kiosk terminal 200 includes a touch unit 204 including an RFID module which is operable to perform data communication with a non-contact IC card, and a mobile phone and a smartphone, each of which has a communication function by NFC. A member holds a membership card (IC card) associated with the member over the touch unit 204, can thereby log therein, and can display a menu screen for a member and information related to the member on the LCD 201. The information related to a member is obtained from, for example, the membership management server 13. In addition, besides the touch unit 204 or instead of the touch unit 204, the kiosk terminal 200 may include an information recording medium reading device for reading information stored in an information recording medium such as a magnetic card. In this case, instead of the IC card 1500, the magnetic card can be used as a membership card.

In addition, a staff member of a hall holds an IC card of the staff member thereover, can thereby log therein, and can display a menu screen for a staff member or the like on the LCD 201.

Further, the kiosk terminal 200 is provided with a card insertion slot 205 to and from which an IC card 1500 can be inserted and ejected. The card insertion slot 205 is provided with an eject button. In addition, in an inside of a kiosk housing, whose position corresponds to a position of the card insertion slot 205, a card unit 230 is provided. The card insertion slot 205 is configured as one part of the card unit 230.

When a membership card is inserted from the card insertion slot 205, a menu screen for a member and information related to the member can be displayed on the LCD 201. In addition, the card unit 230 is operable to issue and collect a limited card and a rewards card.

In addition, the kiosk terminal 200 includes a ticket printer 206. The ticket printer 206 is operable to issue and collect a ticket and a coupon and can also be configured to have a function as a bill validator.

Further, the kiosk terminal 200 includes a phone receiver 207 used in a phone call by VoIP. Via the phone receiver 207, a user of the kiosk terminal 200 can have conversation with a user of other kiosk terminal 200 or a player of a gaming machine. In addition, an incoming LED 208 is controlled to emit light upon incoming of a phone call by the VoIP.

In addition, the kiosk terminal 200 includes a keyboard 209 and a numeric keypad 210 used when a user inputs data (in member registration and text chatting) and further, is provided with LED plates 211 for peep prevention on both sides of the numeric keypad 210.

Further, the kiosk terminal 200 is provided with a QR code scanner 212 for reading a QR code (registered trademark), which is caused to read a QR code attached to an email addressed to a mobile phone or the like.

In addition thereto, the kiosk terminal 200 includes a storage part 213 having stored therein control parts for controlling the LCD, the LED, and the like.

[Configuration of Circuitry of Kiosk Terminal]

Next, with reference to FIG. 32, a configuration of circuitry which a kiosk terminal 200 includes will be described.

A kiosk terminal controller 220 which controls the kiosk terminal 200 has a CPU 221, a ROM 222, and a RAM 223.

The CPU 221 performs execution control of the respective components of the signage, executes various kinds of programs stored in the ROM 222, and performs computation therefor.

The ROM 222 is constituted of a memory device such as a flash memory, and permanent data used for the execution by the CPU 221 is stored therein. For example, a communication control program by the VoIP and the like can be stored therein.

The RAM 223 temporarily stores data required upon executing the various kinds of programs stored in the ROM 222.

An external storage device 224 is, for example, a storage device such as a hard disk device and stores programs executed in the CPU 221 and data which the programs executed in the CPU 221 use.

A network I/F (interface) 225 realizes data communication with servers such as a bonus server 11 and a membership management server 13 and a PTS terminal 1700.

An LCD control part 226 controls displaying of the above-mentioned information such as the game information on the LCD 201. In addition, the LCD 201 includes a touch panel function, and an operation from a user is transmitted to the CPU 221.

A motion sensor control part 227 obtains images of a user and the like received from motion sensors (for example, cameras) 202 and 203, subjects the images to predetermined image processing, and transmits the processed data to the CPU 221.

A touch unit control part 228 controls data transmission and reception in association with a touch operation of an IC card or a mobile phone on a touch unit 204. The touch unit control part 228 includes a non-contact R/W (reader/writer) control part 228A.

The non-contact R/W control part 228A determines whether or not there has been the touch operation of an IC card or a mobile phone on the touch unit 204 and when there has been the touch operation, obtains a read result or the like from the touch unit 204. The touch unit 204 has an antenna part for performing data transmission and reception with an IC card or a mobile phone through NFC or the like.

In addition, an IC card control part 229 controls insertion and ejection of an IC card 1500, reading of data, and the like. The IC card control part 229 includes an IC card R/W (reader/writer) control part 229A and an IC card suction ejection control part 229B.

The IC card R/W control part 229A controls a card unit 230 to read an identification code or the like stored in an IC card 1500. The card unit 230 has an antenna part for writing data by NFC or the like into an IC card 1500.

The IC card suction ejection control part 229B controls suction and ejection of an IC card 1500. When an IC card 1500 is inserted into a card insertion slot 205 by a user, the IC card suction ejection control part 229B controls holding of the IC card in the card unit 230 until the user logs off. In addition, when an eject button is pressed, the IC card suction ejection control part 229B ejects the IC card 1500.

A ticket printer control part 231 controls a ticket printer/bill validator 232, for example, to issue and collect a ticket and a coupon and identifies a bill. The ticket printer control part 231 has a printer control part 231A and a bill validator control part 231B.

A sound control part 233 inputs and outputs sound by using a speaker 235 and a microphone 234 included in a phone receiver 207. The sound control part 233 includes a DSP 233A and an LED control part 233B. The DSP 233A performs predetermined sound signal processing for sound inputted from the microphone 234 and sound outputted from the speaker 235, thereby performing the control. The LED control part 233B controls an incoming LED 208 to emit light based on an incoming signal by a phone call by VoIP or the like.

An input control part 236 converts input on an keyboard 209 and input on a numeric keypad 210 from a user to signals and transmits the signals to the CPU 221.

[Housing Specification Including Kiosk Terminal]

Figure 32:
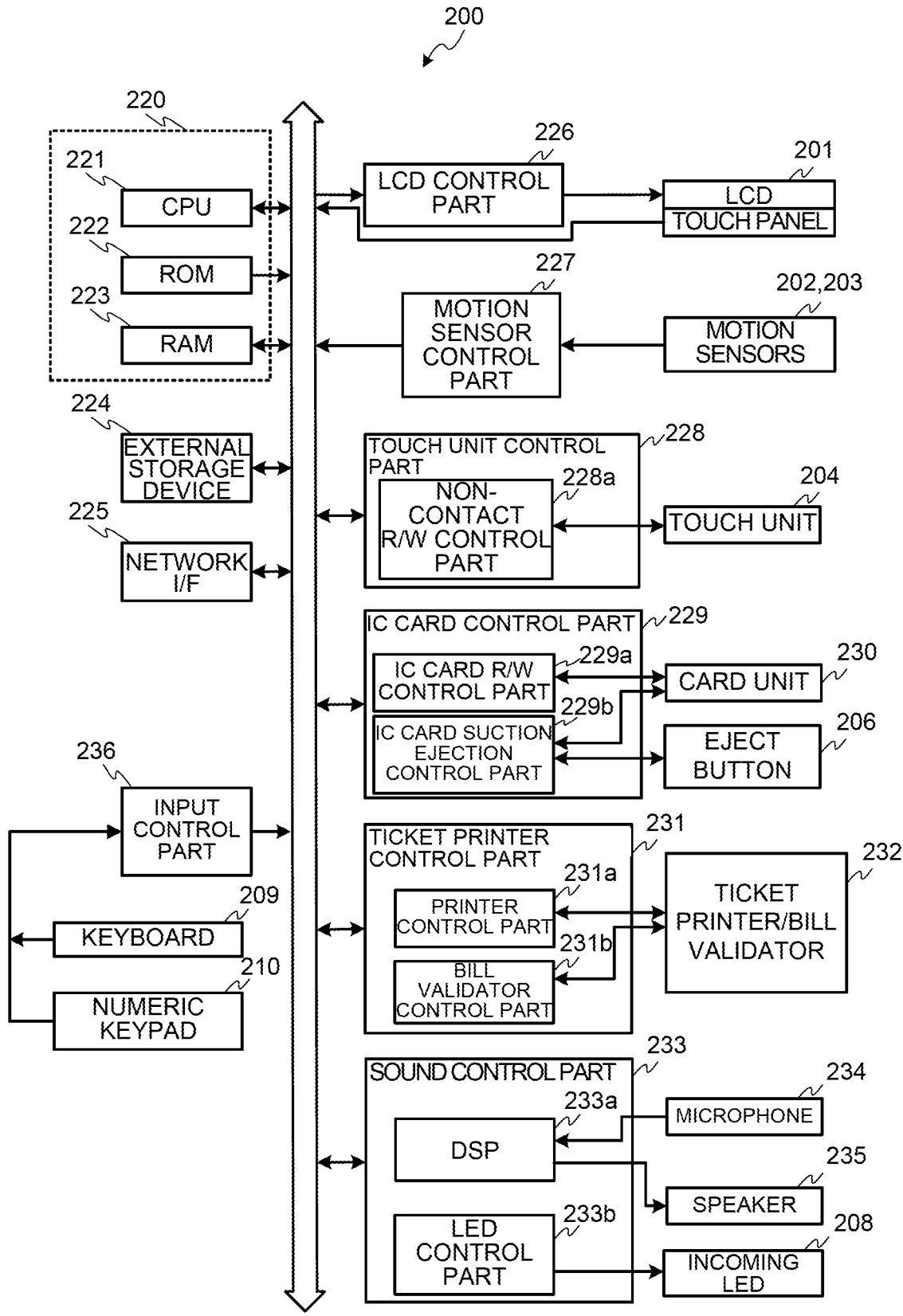
FIG. 32 is a diagram showing a circuitry configuration of the kiosk terminal according to the one embodiment of the present invention.

Although a kiosk terminal 200 is basically configured by a housing shown in FIG. 32, this apparatus is combined with other media in a various manner, thereby allowing kiosk terminals 200 having various configurations to be arranged.

Here, with reference to FIG. 33, examples having a variety of housing specifications, each of which includes a kiosk terminal or kiosk terminals will be described. A configuration shown in FIG. 33A is the same as that of the kiosk terminal 200 shown in FIG. 32. A configuration shown in FIG. 33B is a configuration in which on an upper part of the kiosk terminal 200 shown in FIG. 32, an information board 250 is mounted. Here, the information board 250 is, for example, an advertisement display board formed of paper or the like, which is an information board for displaying non-electronic information whose display contents do not electronically change. The above-mentioned information board 250 can be replaced with other information board manually by a staff member in a hall or the like.

A configuration shown in FIG. 33C is a configuration in which on the upper part of the kiosk terminal 200 shown in FIG. 32, a 24-inch LCD 251 is mounted. The LCD 251 may be, for example, an LCD which is a component of a signage 100. On the LCD 251, a variety of pieces of information are displayed as needed. In addition, the LCD 251 may be connected to the kiosk terminal 200 and a game system 1, thereby allowing information pertinent to a member, information pertinent to a hall and games, and the like to be displayed.

A configuration shown in FIG. 33D is a configuration in which on the upper part of the kiosk terminal 200 having the configuration shown in FIG. 33B, further, a 24-inch LCD 251 is mounted.

A configuration shown in FIG. 33E is a configuration in which two kiosk terminals 200 each having the configuration shown in FIG. 33A are arranged, on the upper parts thereof, a 46-inch LCD 252 is mounted. The LCD 252 may be, for example, an LCD which is a component of the signage 100, which includes a touch unit operable to perform reading of an IC card. On the LCD 252, a variety of pieces of information are displayed as needed. In addition, the LCD 252 may be connected to the kiosk terminal 200 and the game system 1, thereby allowing information pertinent to a member, information pertinent to a hall and games, and the like to be displayed.

A configuration shown in FIG. 33F is a configuration in which two configurations each shown in FIG. 33B are arranged, and a 46-inch LCD 252 is mounted thereon. Although in this configuration, the LCD 252 which is a large-size liquid crystal display device is arranged on the comparatively light-weight information boards 250, for example, a frame for supporting the LCD 252 is arranged in the rear thereof, thereby allowing the LCD 252 to be appropriately supported.

As described above, one or a plurality of parts of the kiosk terminal 200, the information board 250, the LCD 251, and the LCD 252 is or are combined, thereby allowing many variations as the housing specifications to be prepared. Thus, in accordance with a scale of a hall, a ceiling height, and an installation space, housing specifications of introduced apparatuses can be selected.

REFERENCE SIGNS LIST 1 game system
1010 slot machine
1011 cabinet
1016 symbol display device
1030 control panel
1700 PTS terminal
1720a and 1720b light emitting plates
1721a and 1721b full-color LEDs
1706 and 1708 speaker ducts
1707 and 1709 speakers
1750 PTS controller

The invention claimed is:

1. A game system comprising:
a player tracking device having an input part and an output part, the input part including an IC (integrated circuit) device reader which accepts an IC device storing identification information for identifying a player and reads the identification information from the IC device, and information being outputted from the output part;
a plurality of gaming machines each including the player tracking device and each providing a game play for the identified player; and
an external server being connected to a plurality of the player tracking devices via a network,
with a request from the external server as a starting point, information being outputted by causing the output parts of two or more of the plurality of the player tracking devices to operate in a manner linked with one another according to a linkage presentation pattern, irrespective of the game play being conducted on each of the plurality of gaming machines,
wherein the linkage presentation pattern defines a pattern of presentations conducted in the two or more player tracking devices, and the output parts of the two or more player tracking devices output the information for conducting the presentations according to the linkage presentation pattern in the manner linked with one another, thereby realizing a linkage presentation over the two or more player tracking devices,
wherein the plurality of gaming machines are grouped into a plurality of groups,
wherein the external server transmits a predetermined notification to one gaming machine belonging to a predetermined group among the plurality of groups when outputting the information by causing the output parts of the player tracking devices of two or more gaming machines belonging to the predetermined group to operate in the manner linked with one another,
wherein the player tracking device of the gaming machine that receives the predetermined notification transmits a linkage presentation execution request to a gaming machine operating as a server within the predetermined group, and
wherein the player tracking device of the gaming machine that receives the linkage presentation execution request transmits the linkage presentation execution request to all of other gaming machines within the predetermined group.

2. The game system according to claim 1, wherein the gaming machines are connected to network segments, each of the groups being connected to each of the network segments being different from one another, respectively, and
wherein the linkage presentation execution request is transmitted as a broadcast message to each of the network segments.

3. The game system according to claim 1, wherein the controller of each of the player tracking devices executes processes described below:
a process (C) in which based on the identification information read from the IC device, whether or not the player is a member is determined; and
a process (D) in which when the player tracking devices in each of the groups of the gaming machines operate as the clients which output the information to the output parts, based on a result of the determination, whether or not the information is outputted to the output parts is determined.

4. The game system according to claim 1, wherein the output part includes light emitting diodes, and
wherein the linkage presentation pattern defines a light emitting pattern of the light emitting diodes in each of the two or more player tracking devices, and the linkage presentation is realized by at least the light emitting patterns of the two or more player tracking devices.

5. The game system according to claim 1, wherein the output part includes a speaker, and
wherein the linkage presentation pattern defines a sound pattern outputted from the speaker in each of the two or more player tracking devices, and the linkage presentation is realized by at least the sound patterns of the two or more player tracking devices.

6. A player tracking device having an input part and an output part, the input part including an IC device reader which accepts an IC device storing identification information for identifying a player and reading the identification information from the IC device, and information being outputted from the output part, the player tracking device being integrated into a gaming machine which provides a game play for the identified player, the player tracking device being connected via a network to an external server, with a request from the external server as a starting point, irrespective of the game play on the gaming machine, a linkage presentation performed over two or more gaming machines being executed individually by outputting the information to the output parts of a plurality of the player tracking devices respectively integrated into the two or more gaming machines according to a linkage presentation pattern, wherein the linkage presentation pattern defines a pattern of presentations conducted in the player tracking devices, and the output parts of the plurality of player tracking devices output the information for conducting the presentations according to the linkage presentation pattern in a manner linked with one another, thereby realizing the linkage presentation over the two or more gaming machines, wherein a plurality of gaming machines are grouped into a plurality of groups, wherein the external server transmits a predetermined notification to one gaming machine belonging to a predetermined group among the plurality of groups when outputting the information by causing the output parts of the player tracking devices of two or more gaming machines belonging to the predetermined group to operate in the manner linked with one another, wherein the player tracking device, upon receiving the predetermined notification, transmits a linkage presentation execution request to a gaming machine operating as a server within the predetermined group, and wherein the player tracking device, upon receiving the linkage presentation execution request, transmits the linkage presentation execution request to all of other gaming machines within the predetermined group.

7. A gaming machine on which based on rearranged symbols, a payout is awarded, comprising:
a display device for displaying a plurality of reels, each of the reels having a plurality of symbols depicted on an external surface;
a cabinet for internally housing the display device;
a controller for rotating and stopping the plurality of reels and controlling the symbols depicted on the plurality of reels to be rearranged; and
the player tracking device according to claim 6 which is incorporated into the cabinet.

8. The player tracking device to claim 6, wherein the output part includes light emitting diodes, and
wherein the linkage presentation pattern defines a light emitting pattern of the light emitting diodes in each of the two or more player tracking devices, and the linkage presentation is realized by at least the light emitting patterns of the plurality of gaming machines.

9. The player tracking device according to claim 6, wherein the output part includes a speaker, and
wherein the linkage presentation pattern defines a sound pattern outputted from the speaker in each of the two or more player tracking devices, and the linkage presentation is realized by at least the sound patterns of the plurality of gaming machines.

10. A program being executed on a player tracking device, the player tracking device having an input part and an output part, the input part including an IC device reader which accepts an IC device storing identification information for identifying a player and reading the identification information from the IC device, information being outputted from the output part, the player tracking device being integrated into a gaming machine which provides a game play for the identified player, the player tracking device being connected via a network to an external server, the program performing control such that with a request from the external server as a starting point, irrespective of the game play on the gaming machine, linkage presentation performed over two or more gaming machines is executed individually by outputting the information to the output parts of a plurality of the player tracking devices respectively integrated into the two or more gaming machines according to a linkage presentation pattern, wherein the linkage presentation pattern defines a pattern of presentations conducted in the player tracking devices, and the output parts of the plurality of player tracking devices output the information for conducting the presentations according to the linkage presentation pattern in a manner linked with one another, thereby realizing the linkage presentation over the two or more gaming machines, wherein a plurality of gaming machines are grouped into a plurality of groups, wherein the external server transmits a predetermined notification to one gaming machine belonging to a predetermined group among the plurality of groups when outputting the information by causing the output parts of the player tracking devices of two or more gaming machines belonging to the predetermined group to operate in the manner linked with one another, wherein the program, upon receiving the predetermined notification, transmits a linkage presentation execution request to a gaming machine operating as a server within the predetermined group, and wherein the program, upon receiving the linkage presentation execution request, transmits the linkage presentation execution request to all of other gaming machines within the predetermined group.

11. The program to claim 10, wherein the output part includes light emitting diodes, and
wherein the linkage presentation pattern defines a light emitting pattern of the light emitting diodes in each of the two or more player tracking devices, and the linkage presentation is realized by at least the light emitting patterns of the plurality of gaming machines.

12. The program according to claim 10, wherein the output part includes a speaker, and
wherein the linkage presentation pattern defines a sound pattern outputted from the speaker in each of the two or more player tracking devices, and the linkage presentation is realized by at least the sound patterns of the plurality of gaming machines.

* * * * *